(12) United States Patent
Dong et al.

(10) Patent No.: US 12,542,839 B2
(45) Date of Patent: Feb. 3, 2026

(54) INTEGRALLY FORMED FOLDABLE MECHANISM AND FOLDABLE TERMINAL

(71) Applicant: Honor Device Co., Ltd., Shenzhen (CN)

(72) Inventors: Shaohong Dong, Shenzhen (CN); Ruihao Chen, Shenzhen (CN); Shuai Su, Shenzhen (CN); Gaofeng Peng, Shenzhen (CN); Kaifang Jin, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 378 days.

(21) Appl. No.: 18/249,817

(22) PCT Filed: Dec. 27, 2022

(86) PCT No.: PCT/CN2022/142341
§ 371 (c)(1),
(2) Date: Apr. 20, 2023

(87) PCT Pub. No.: WO2023/185145
PCT Pub. Date: Oct. 5, 2023

(65) Prior Publication Data
US 2024/0129389 A1    Apr. 18, 2024

(30) Foreign Application Priority Data
Mar. 31, 2022  (CN) .......................... 202210336293.5

(51) Int. Cl.
*H04M 1/00* (2006.01)
*G06F 1/16* (2006.01)
*H04M 1/02* (2006.01)

(52) U.S. Cl.
CPC .......... *H04M 1/022* (2013.01); *H04M 1/0268* (2013.01)

(58) Field of Classification Search
CPC .. G06F 1/1652; G06F 1/1681; H04M 1/0216; H05K 5/0017; H05K 5/0217
See application file for complete search history.

(56) References Cited

U.S. PATENT DOCUMENTS 11,336,759 B2 *  5/2022  Liao ...................... H04M 1/022
11,359,425 B2 *  6/2022  Chang ...................... E05D 3/18
(Continued)

FOREIGN PATENT DOCUMENTS

CN        105979032 A      9/2016
CN        207601679 U      7/2018
(Continued)

*Primary Examiner* — Rockshana D Chowdhury
(74) *Attorney, Agent, or Firm* — Conley Rose, P.C.

(57) ABSTRACT

A foldable mechanism and a foldable terminal. The foldable terminal includes the foldable mechanism. The foldable mechanism is conducive to a lightweight design of the foldable terminal. The foldable mechanism includes a base and a pressing plate assembly. The pressing plate assembly is mounted on the base. The pressing plate assembly includes a first pressing plate and a first pressing plate swing arm. The first pressing plate is an integrally formed structural member. A sliding portion of the first pressing plate swing arm is slidably connected to the first pressing plate, to implement slidable connection between the first pressing plate swing arm and the first pressing plate. A rotating portion of the first pressing plate swing arm is rotatably connected to the base, to implement rotatable connection between the first pressing plate swing arm and the base.

18 Claims, 24 Drawing Sheets

(56) References Cited

U.S. PATENT DOCUMENTS

| | | | |
|---|---|---|---|
| 11,706,886 B2* | 7/2023 | Wu | H05K 5/0217 |
| | | | 361/807 |
| 11,825,617 B2* | 11/2023 | Hou | G06F 1/1681 |
| 11,924,987 B2* | 3/2024 | Lee | H04M 1/022 |
| 11,933,351 B2* | 3/2024 | Jiang | F16C 11/04 |
| 11,983,047 B2* | 5/2024 | Park | G06F 1/1624 |
| 12,010,254 B2* | 6/2024 | Liu | H04M 1/022 |
| 12,047,521 B2* | 7/2024 | Liao | G06F 1/1652 |
| 12,069,825 B2* | 8/2024 | Feng | G06F 1/1652 |
| 12,069,826 B2* | 8/2024 | Cheng | H05K 5/0226 |
| 12,163,554 B2* | 12/2024 | Yu | G06F 1/1616 |
| 12,174,669 B2* | 12/2024 | You | G06F 1/1681 |
| 12,267,446 B2* | 4/2025 | Kang | F16C 11/04 |
| 12,314,091 B2* | 5/2025 | Cheng | H04M 1/022 |
| 2016/0198838 A1 | 7/2016 | Abreu | |
| 2017/0308126 A1* | 10/2017 | Yang | G06F 1/1652 |
| 2018/0309861 A1 | 10/2018 | Lin et al. | |
| 2020/0032952 A1 | 1/2020 | Han et al. | |
| 2020/0081494 A1 | 3/2020 | Lin | |
| 2020/0081502 A1 | 3/2020 | Lin et al. | |
| 2020/0084305 A1* | 3/2020 | Lin | H04M 1/0268 |
| 2020/0225711 A1* | 7/2020 | Pelissier | G06F 1/1624 |
| 2021/0026407 A1 | 1/2021 | Park et al. | |
| 2021/0135151 A1* | 5/2021 | Baek | H04M 1/0237 |
| 2021/0165465 A1* | 6/2021 | Huang | F15B 11/22 |
| 2022/0019261 A1* | 1/2022 | Kang | G06F 1/1658 |
| 2022/0116489 A1 | 4/2022 | Nagai et al. | |
| 2022/0212096 A1* | 7/2022 | Delaporte | G06F 1/1652 |
| 2022/0303371 A1 | 9/2022 | Liao et al. | |
| 2022/0321683 A1* | 10/2022 | Luo | H04M 1/0268 |
| 2023/0075646 A1 | 3/2023 | Niu et al. | |
| 2023/0145655 A1* | 5/2023 | Shin | H04M 1/026 |
| | | | 361/807 |
| 2023/0152859 A1* | 5/2023 | Kang | G09F 9/301 |
| | | | 361/679.01 |
| 2023/0164253 A1* | 5/2023 | Xu | G06F 1/1641 |
| | | | 455/566 |
| 2023/0176615 A1* | 6/2023 | Choi | G06F 1/1686 |
| | | | 361/679.55 |
| 2023/0229189 A1 | 7/2023 | Li et al. | |
| 2023/0308532 A1* | 9/2023 | Kim | G06F 3/14 |
| 2024/0004430 A1 | 1/2024 | Zhao et al. | |
| 2024/0007553 A1* | 1/2024 | Cheng | H04M 1/0268 |
| 2024/0028084 A1 | 1/2024 | Feng et al. | |
| 2024/0129389 A1* | 4/2024 | Dong | G06F 1/1681 |
| 2024/0251515 A1* | 7/2024 | Zhan | F16C 11/04 |
| 2024/0263669 A1* | 8/2024 | Zhang | F16C 11/04 |
| 2024/0357025 A1 | 10/2024 | Zhang et al. | |
| 2025/0013260 A1* | 1/2025 | Niu | G06F 1/1624 |

FOREIGN PATENT DOCUMENTS

| | | |
|---|---|---|
| CN | 208421694 U | 1/2019 |
| CN | 209372611 U | 9/2019 |
| CN | 112153178 A | 12/2020 |
| CN | 113067923 A | 7/2021 |
| CN | 113067924 A | 7/2021 |
| CN | 113141426 A | 7/2021 |
| CN | 113194183 A | 7/2021 |
| CN | 113225412 A | 8/2021 |
| CN | 113669357 A | 11/2021 |
| CN | 113805646 A | 12/2021 |
| CN | 114079683 A | 2/2022 |
| CN | 114095592 A | 2/2022 |
| CN | 113795683 B | 12/2022 |
| CN | 218041429 U | 12/2022 |
| JP | 2006336801 A | 12/2006 |
| JP | 2020027246 A | 2/2020 |
| KR | 20210089769 A | 7/2021 |
| WO | 2021115462 A1 | 6/2021 |
| WO | 2021208998 A1 | 10/2021 |
| WO | 2021259340 A1 | 12/2021 |
| WO | 2022001769 A1 | 1/2022 |

* cited by examiner

INTEGRALLY FORMED FOLDABLE MECHANISM AND FOLDABLE TERMINAL

CROSS-REFERENCE TO RELATED APPLICATIONS

This application is a U.S. National Stage of International Application No. PCT/CN2022/142341 filed on Dec. 27, 2022, which claims priority to Chinese Patent Application No. 202210336293.5, filed with the China National Intellectual Property Administration on Mar. 31, 2022, both of which are incorporated herein by reference in their entireties.

TECHNICAL FIELD

This application relates to the field of foldable terminals, and in particular, to a foldable mechanism and a foldable terminal.

BACKGROUND

With the advancement of science and technology, an era of large-screen intelligent terminals is coming, and foldable terminals are favored by users because of their advantages such as large screens and portability. Currently, a foldable terminal usually implements folding and unfolding by using a foldable mechanism. However, an existing foldable mechanism usually needs a large quantity of components to implement folding and unfolding, and consequently the foldable mechanism has a complex structure, which is not conducive to a lightweight design of a foldable terminal.

SUMMARY

This application provides a foldable mechanism and a foldable terminal, to simplify a structure of the foldable mechanism and implement a lightweight design of the foldable terminal.

According to a first aspect, this application provides a foldable mechanism, including a base and a pressing plate assembly. The pressing plate assembly is mounted on the base. The pressing plate assembly includes a first pressing plate and a first pressing plate swing arm. The first pressing plate is an integrally formed structural member. A sliding portion of the first pressing plate swing arm is slidably connected to the first pressing plate, to implement slidable connection between the first pressing plate swing arm and the first pressing plate. A rotating portion of the first pressing plate swing arm is rotatably connected to the base, to implement rotatable connection between the first pressing plate swing arm and the base.

In the foldable mechanism shown in this application, the first pressing plate is an integrally formed structural member. This not only can improve overall strength of the first pressing plate to ensure structural stability of the first pressing plate, but also can reduce components of the pressing plate assembly to facilitate assembling of the foldable mechanism, thereby helping improve assembly precision between the pressing plate assembly and another component, and helping implement a lightweight design of the foldable mechanism.

In an implementation, the first pressing plate includes a support portion and an auxiliary portion. The auxiliary portion is fixedly connected to a bottom surface of the support portion, and the auxiliary portion is provided with a sliding hole, or the auxiliary portion and the support portion form a sliding hole through enclosing. The sliding portion of the first pressing plate swing arm penetrates through the sliding hole, and can slide with respect to the first pressing plate in the sliding hole, to implement slidable connection between the sliding portion of the first pressing plate swing arm and the first pressing plate.

The support portion and the auxiliary portion are integrally formed.

In an implementation, the first pressing plate further includes a guide slider. The guide slider is fixedly connected to the bottom surface of the support portion, and is spaced apart from the auxiliary portion.

The foldable mechanism further includes a connecting assembly. The connecting assembly is mounted on the base, and is connected to the pressing plate assembly. The connecting assembly includes a first fastening bracket. The first fastening bracket is slidably and rotatably connected to the first pressing plate.

The first fastening bracket is provided with a guide groove. The guide slider is mounted in the guide groove, and can slide and rotate with respect to the first fastening bracket in the guide groove, to implement slidable and rotatable connection between the first pressing plate and the first fastening bracket.

In an implementation, the pressing plate assembly in the foldable mechanism further includes a second pressing plate and a second pressing plate swing arm. The second pressing plate is an integrally formed structural member. A sliding portion of the second pressing plate swing arm is slidably connected to the second pressing plate, to implement slidable connection between the second pressing plate swing arm and the second pressing plate. A rotating portion of the second pressing plate swing arm is rotatably connected to the base, to implement slidable connection between the second pressing plate swing arm and the base.

In the foldable mechanism shown in this application, the second pressing plate is an integrally formed structural member. This not only can improve overall strength of the second pressing plate to ensure structural stability of the second pressing plate, but also can reduce components of the pressing plate assembly to facilitate assembling of the foldable mechanism, thereby helping improve assembly precision between the pressing plate assembly and another component, and helping implement a lightweight design of the foldable mechanism.

In an implementation, the second pressing plate includes a support portion and an auxiliary portion. The auxiliary portion is fixedly connected to a bottom surface of the support portion, and the auxiliary portion is provided with a sliding hole, or the auxiliary portion and the support portion form a sliding hole through enclosing. The sliding portion of the second pressing plate swing arm penetrates through the sliding hole, and can slide with respect to the second pressing plate in the sliding hole, to implement slidable connection between the sliding portion of the second pressing plate swing arm and the second pressing plate.

The support portion and the auxiliary portion are integrally formed.

In an implementation, the foldable mechanism further includes a flexible support plate, and the flexible support plate is mounted on the pressing plate assembly. The flexible support plate is mounted on the first pressing plate swing arm and the second pressing plate swing arm, and can be bent under the driving of the first pressing plate swing arm and/or the second pressing plate swing arm. A bending direction of the flexible support plate is parallel to rotation centers of the first pressing plate swing arm and the second pressing plate swing arm with respect to the base.

When the foldable mechanism is in an unfolded state, the first pressing plate and the second pressing plate are respectively located on two opposite sides of the base, and a top surface of the flexible support plate, a top surface of the first pressing plate, and a top surface of the second pressing plate are flush with each other, and jointly form a support surface.

When the foldable mechanism is applied to a foldable terminal, the support surface can support a foldable part of a display screen. This not only can ensure good display of the display screen, but also can ensure that when the foldable part is touched, the foldable part is not likely to be damaged or dented due to an external force touch, thereby improving reliability of using the display screen. In addition, the flexible support plate is not designed with a hole, and the top surface of the flexible support plate is a complete plane. Therefore, the support surface has a relatively large area, and can better support the foldable part, to improve an effect of supporting the foldable part by the flexible support plate.

In an implementation, a connecting portion of the first pressing plate swing arm is provided with an assembly hole, and a connecting portion of the second pressing plate swing arm is provided with an assembly hole.

The flexible support plate includes a flexible support portion, a first fastening portion, and a second fastening portion. Both the first fastening portion and the second fastening portion are fixedly connected to a bottom surface of the flexible support portion, and are spaced apart from each other. The first fastening portion is mounted in the assembly hole on the first pressing plate swing arm, and the second fastening portion is mounted in the assembly hole on the second pressing plate swing arm, to implement assembling between the flexible support plate and the pressing plate assembly.

In an implementation, the flexible support portion is provided with a plurality of strip-shaped grooves, and the plurality of strip-shaped grooves are arranged in parallel and spaced apart from each other. An extension direction of each strip-shaped groove is parallel to the bending direction of the flexible support plate, to ensure flexibility of the flexible support plate.

In an implementation, openings of all of the plurality of strip-shaped grooves are located on a bottom surface of the flexible support plate, to ensure integrity of the top surface of the flexible support plate. The strip-shaped groove is recessed from the bottom surface of the flexible support plate in a direction far away from the top surface, and runs through a front end face and a rear end face of the flexible support plate. The strip-shaped groove is spaced apart from both the first fastening portion and the second fastening portion.

In an implementation, the rotating portion of the first pressing plate swing arm is slidably and rotatably connected to the base, and the rotating portion of the second pressing plate swing arm is slidably and rotatably connected to the base.

When rotating with respect to the base, each of the first pressing plate swing arm and the second pressing plate swing arm produces displacement with the base, and the displacement produced by each of the first pressing plate swing arm and the second pressing plate swing arm matches a size change caused by bending of the flexible support plate, to ensure flatness of the flexible support plate and prevent the flexible support plate from being pleated.

In an implementation, the connecting assembly in the foldable mechanism further includes a second fastening bracket, and the second fastening bracket is slidably and rotatably connected to the second pressing plate.

When the foldable mechanism is in a folded state, the first pressing plate and the second pressing plate are disposed opposite to each other, the first pressing plate, the second pressing plate, the first fastening bracket, the second fastening bracket, and the flexible support plate form avoidance space through enclosing, and the avoidance space is in a water drop shape.

When the foldable mechanism is applied to the foldable terminal, the avoidance space can avoid an R angle formed when the foldable part is bent, so that the foldable part is not greatly bent, to avoid a poor phenomenon such as a crease on the display screen, and help prolong a service life of the display screen.

In an implementation, the base is provided with an avoidance groove, and when the foldable mechanism is in the folded state, the avoidance groove is used to avoid a bottom of the flexible support plate, so that interference between the base and the flexible support plate can be avoided, to help form the avoidance space in the water drop shape.

In an implementation, the second pressing plate further includes a guide slider. The guide slider is fixedly connected to the bottom surface of the support portion, and is spaced apart from the auxiliary portion.

The second fastening bracket is provided with a guide groove. The guide slider is mounted in the guide groove, and can slide and rotate with respect to the second fastening bracket in the guide groove, to implement slidable and rotatable connection between the second pressing plate and the second fastening bracket.

In an implementation, the connecting assembly in the foldable mechanism further includes a first primary swing arm and a second primary swing arm. A rotating portion of the first primary swing arm is rotatably connected to the first fastening bracket, to implement rotatable connection between the first primary swing arm and the first fastening bracket. A sliding portion of the first primary swing arm is slidably and rotatably connected to the base, to implement slidable and rotatable connection between the first primary swing arm and the base. A rotating portion of the second primary swing arm is rotatably connected to the second fastening bracket, to implement rotatable connection between the second primary swing arm and the second fastening bracket. A sliding portion of the second primary swing arm is slidably and rotatably connected to the base, to implement slidable and rotatable connection between the second primary swing arm and the base.

In an implementation, the flexible support portion is further provided with a first avoidance groove and a second avoidance groove, and openings of both the first avoidance groove and the second avoidance groove are located on the bottom surface of the flexible support portion.

When the foldable mechanism is in the unfolded state, the first avoidance groove is used to avoid the sliding portion of the first primary swing arm, and the second avoidance groove is used to avoid the sliding portion of the second primary swing arm, to avoid interference between the flexible support plate and each of the first primary swing arm and the second primary swing arm, so that the flexible support portion does not abut against the first primary swing arm or the second primary swing arm, and does not protrude with respect to the top surface of the first pressing plate and the top surface of the second pressing plate, to ensure that the top surface of the flexible support plate is flush with the top surface of the first pressing plate and the top surface of the second pressing plate.

Each of the first avoidance groove and the second avoidance groove communicates with one or more strip-shaped grooves.

In an implementation, the connecting assembly in the foldable mechanism further includes a first secondary swing arm and a second secondary swing arm. A sliding portion of the first secondary swing arm is slidably connected to the first fastening bracket, to implement slidable connection between the first secondary swing arm and the first fastening bracket. A rotating portion of the first secondary swing arm is rotatably connected to the base, to implement rotatable connection between the first secondary swing arm and the base. A sliding portion of the second secondary swing arm is slidably connected to the second fastening bracket, to implement slidable connection between the second secondary swing arm and the second fastening bracket. A rotating portion of the second secondary swing arm is rotatably connected to the base, to implement rotatable connection between the second secondary swing arm and the base.

In an implementation, the flexible support portion is further provided with a third avoidance groove and a fourth avoidance groove, and openings of both the third avoidance groove and the fourth avoidance groove are located on the bottom surface of the flexible support portion. When the foldable mechanism is in the unfolded state, the third avoidance groove is used to avoid the rotating portion of the first secondary swing arm, and the fourth avoidance groove is used to avoid the rotating portion of the second secondary swing arm, to avoid interference between the flexible support plate and each of the first secondary swing arm and the second secondary swing arm, so that the flexible support portion does not abut against the first secondary swing arm or the second secondary swing arm, and does not protrude with respect to the top surface of the first pressing plate and the top surface of the second pressing plate, to ensure that the top surface of the flexible support plate is flush with the top surface of the first pressing plate and the top surface of the second pressing plate.

Each of the third avoidance groove and the fourth avoidance groove communicates with one or more strip-shaped grooves.

In an implementation, the foldable mechanism further includes a damping assembly, and the damping assembly is mounted on the connecting assembly. The damping assembly can provide damping force during folding or unfolding of the connecting assembly with respect to the base.

The damping assembly includes a first damping member and a second damping member. The first damping member is mounted on the first fastening bracket, is fixedly connected to the first secondary swing arm, and can slide with respect to the first fastening bracket under the driving of the first secondary swing arm. The second damping member is mounted on the second fastening bracket, is fixedly connected to the second secondary swing arm, and can slide with respect to the second fastening bracket under the driving of the second secondary swing arm.

When the foldable mechanism is applied to the foldable terminal, in a process of using the foldable terminal by a user, for example, when the foldable terminal is in a folded state or an unfolded state and the foldable terminal is switched between the folded state and the unfolded state, the user can obviously feel the damping force provided by the damping assembly, and the user can experience a relatively good hand feeling, thereby improving user experience.

In an implementation, the foldable mechanism further includes a synchronization part, and the synchronization part is mounted on the base, and is slidably connected to the connecting assembly. The synchronization part is slidably connected to the first secondary swing arm and the second secondary swing arm, so that the first secondary swing arm and the second secondary swing arm synchronously rotate with respect to the base.

In an implementation, the rotating portion of the first secondary swing arm is provided with a first spiral groove, and the rotating portion of the second secondary swing arm is provided with a second spiral groove.

A synchronization assembly includes a fastening post and a synchronization slider. The fastening post is mounted on the base. The synchronization slider is mounted on the fastening post, and can slide with respect to the fastening post. A first cam of the synchronization slider is mounted in the first spiral groove, and can slide with respect to the rotating portion of the first secondary swing arm in the first spiral groove. A second cam of the synchronization slider is mounted in the second spiral groove, and can slide with respect to the rotating portion of the second secondary swing arm in the second spiral groove.

When the first secondary swing arm rotates with respect to the base, the first cam slides with respect to the rotating portion of the first secondary swing arm in the first spiral groove, to drive the slider to slide with respect to the fastening post, and drive the second cam to slide with respect to the rotating portion of the second secondary swing arm in the second spiral groove, so as to drive the second secondary swing arm to rotate with respect to the base, thereby implementing synchronous rotation between the first secondary swing arm and the second secondary swing arm.

Similarly, when the second secondary swing arm rotates with respect to the base, the synchronization part can drive the first secondary swing arm to rotate with respect to the base, thereby implementing synchronous rotation between the first secondary swing arm and the second secondary swing arm.

According to a second aspect, this application provides a foldable terminal, including a first housing, a second housing, and any one of the foregoing foldable mechanisms. The foldable mechanism is connected between the first housing and the second housing.

In the foldable mechanism used in the foldable terminal shown in this application, a first pressing plate is an integrally formed structural member. This not only can improve overall strength of the first pressing plate to ensure structural stability of the first pressing plate, but also can reduce components of a pressing plate assembly to facilitate assembling of the foldable mechanism, thereby helping improve assembly precision between the pressing plate assembly and another component, and helping implement a lightweight design of the foldable terminal.

BRIEF DESCRIPTION OF DRAWINGS

To describe technical solutions in embodiments of this application more clearly, the following describes accompanying drawings required in embodiments of this application.

FIG. 6 is a schematic diagram of an exploded structure of the foldable mechanism shown in FIG. 5a;

DESCRIPTION OF EMBODIMENTS

The following clearly and fully describes the technical solutions in embodiments of this application with reference to the accompanying drawings in embodiments of this application.

Figure 1:
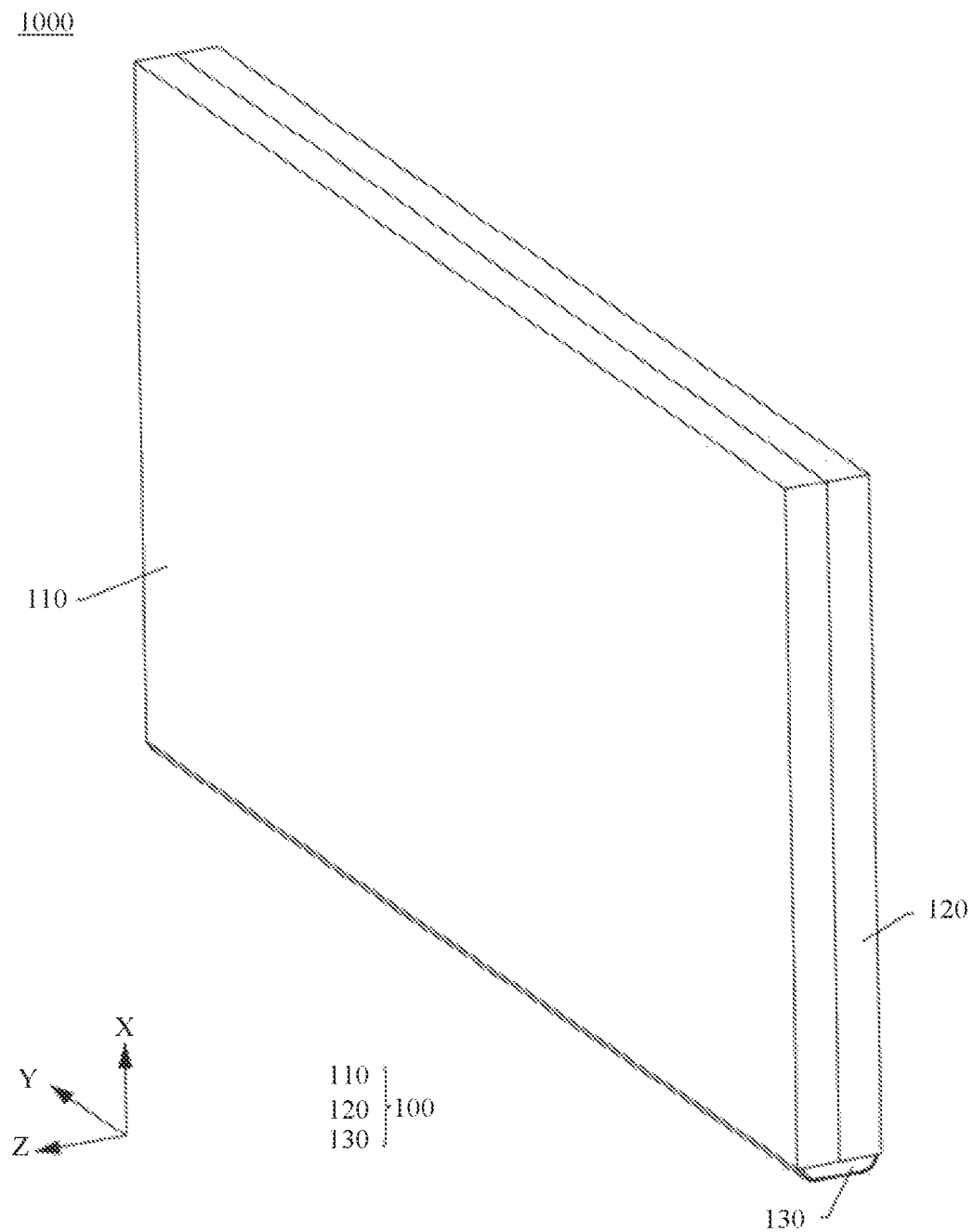
FIG. 1 is a schematic diagram of a structure of a foldable terminal in a state according to an embodiment of this application.
Figure 2:
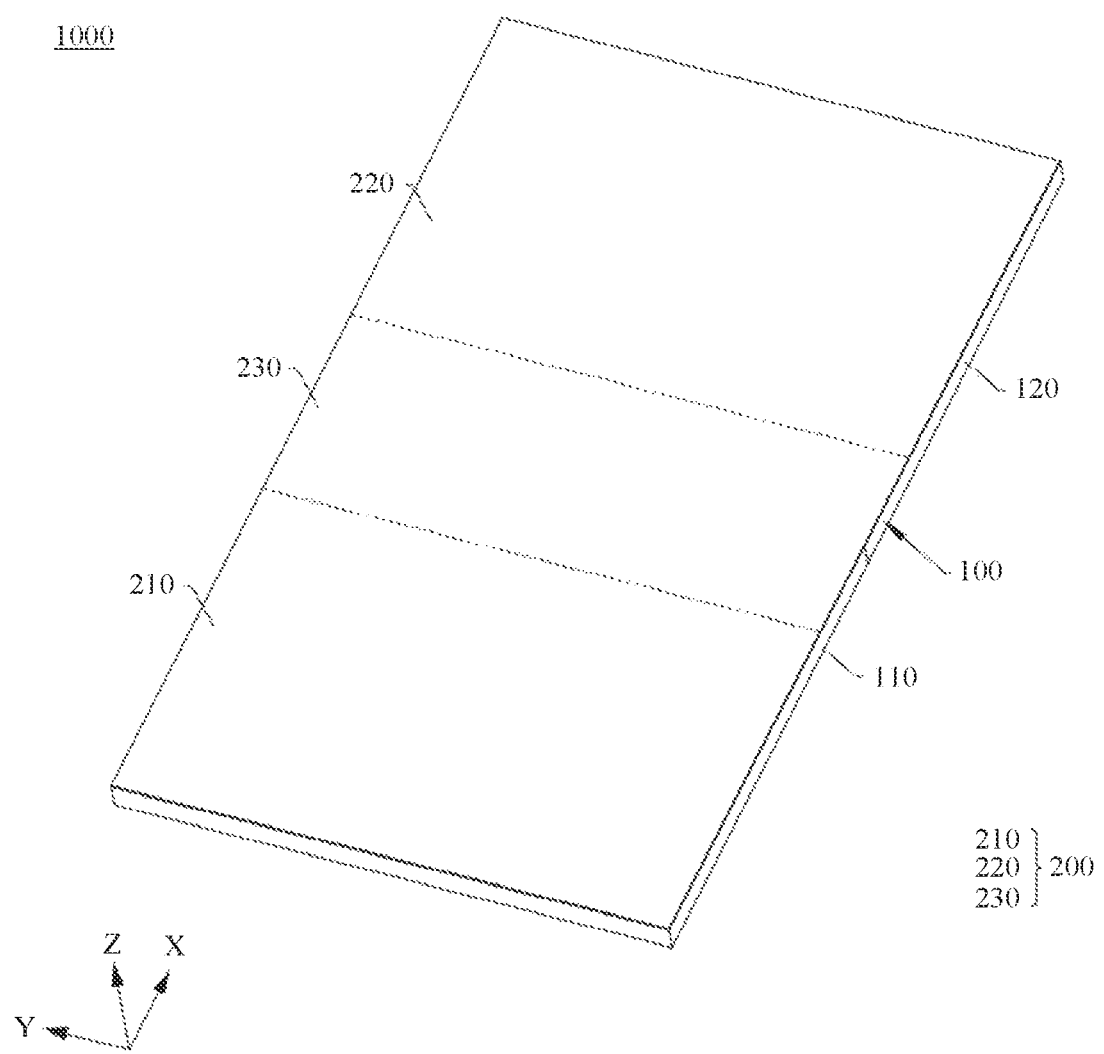
FIG. 2 is a schematic diagram of a structure of the foldable terminal shown in FIG. 1 in a second state.

Refer to FIG. 1 and FIG. 2. FIG. 1 is a schematic diagram of a structure of a foldable terminal 1000 in a state according to an embodiment of this application. FIG. 2 is a schematic diagram of a structure of the foldable terminal 1000 shown in FIG. 1 in a second state.

The foldable terminal 1000 may be a foldable electronic product such as a mobile phone, a tablet computer, a personal computer, a multimedia player, an e-book reader, a notebook computer, a vehicle-mounted device, or a wearable device. In this embodiment, the foldable terminal 1000 is a foldable mobile phone. That is, the foldable terminal 1000 is a mobile phone that can be switched between a folded state and an unfolded state.

For ease of description, a length direction of the shown foldable terminal 1000 is defined as an X-axis direction, a length direction of the foldable terminal 1000 is defined as a Y-axis direction, and a thickness direction of the foldable terminal 1000 is defined as a Z-axis direction. Every two of the X-axis direction, the Y-axis direction, and the Z-axis direction are perpendicular to each other.

It should be noted that qualifiers such as parallel and perpendicular for a relative position relationship in this embodiment of this application are all for a current process level, and are not absolutely strict definitions in the mathematical sense, a slight deviation is allowed, and approximately parallel and approximately perpendicular are acceptable. For example, that A is parallel to B means that A is parallel or approximately parallel to B, and an angle between A and B may range from 0 degrees to 10 degrees. For example, that A is perpendicular to B means that A is perpendicular or approximately perpendicular to B, and an angle between A and B may range from 80 degrees to 100 degrees.

In this embodiment, an extension direction of a rotation axis of the foldable terminal 1000 is the Y-axis direction. That is, the foldable terminal 1000 can be relatively unfolded or relatively folded in the Y-axis direction. The foldable terminal 1000 shown in FIG. 1 is in the folded state, the foldable terminal 1000 is smaller in size in the X-axis direction, and it is easy to carry the foldable terminal 1000. The foldable terminal 1000 shown in FIG. 2 is in the unfolded state, the foldable terminal 1000 is larger in size in the X-axis direction, and the foldable terminal 1000 has a larger display area. For example, an unfolding angle α of the foldable terminal 1000 shown in FIG. 2 is 180 degrees. That is, the foldable terminal 1000 shown in FIG. 2 is in the unfolded state.

It should be noted that the angle illustrated in this embodiment of this application is allowed to have a slight deviation. For example, that an unfolding angle α of the foldable terminal 1000 shown in FIG. 2 is 180 degrees means that a may be 180 degrees or approximately 180 degrees, for example, 170 degrees, 175 degrees, 185 degrees, or 190 degrees. An angle used as an example for description in the following may be understood in a same way.

It should be understood that the foldable terminal 1000 shown in this embodiment of this application is a terminal that can be folded once. In some other embodiments, the foldable terminal 1000 may be a terminal that can be folded for a plurality of times (twice or more). In this case, the foldable terminal 1000 may include a plurality of parts, and two adjacent parts may be folded relatively close to each other until the foldable terminal 1000 is in the folded state, or two adjacent parts may be unfolded relatively away from each other until the foldable terminal 1000 is in the unfolded state.

Figure 3:
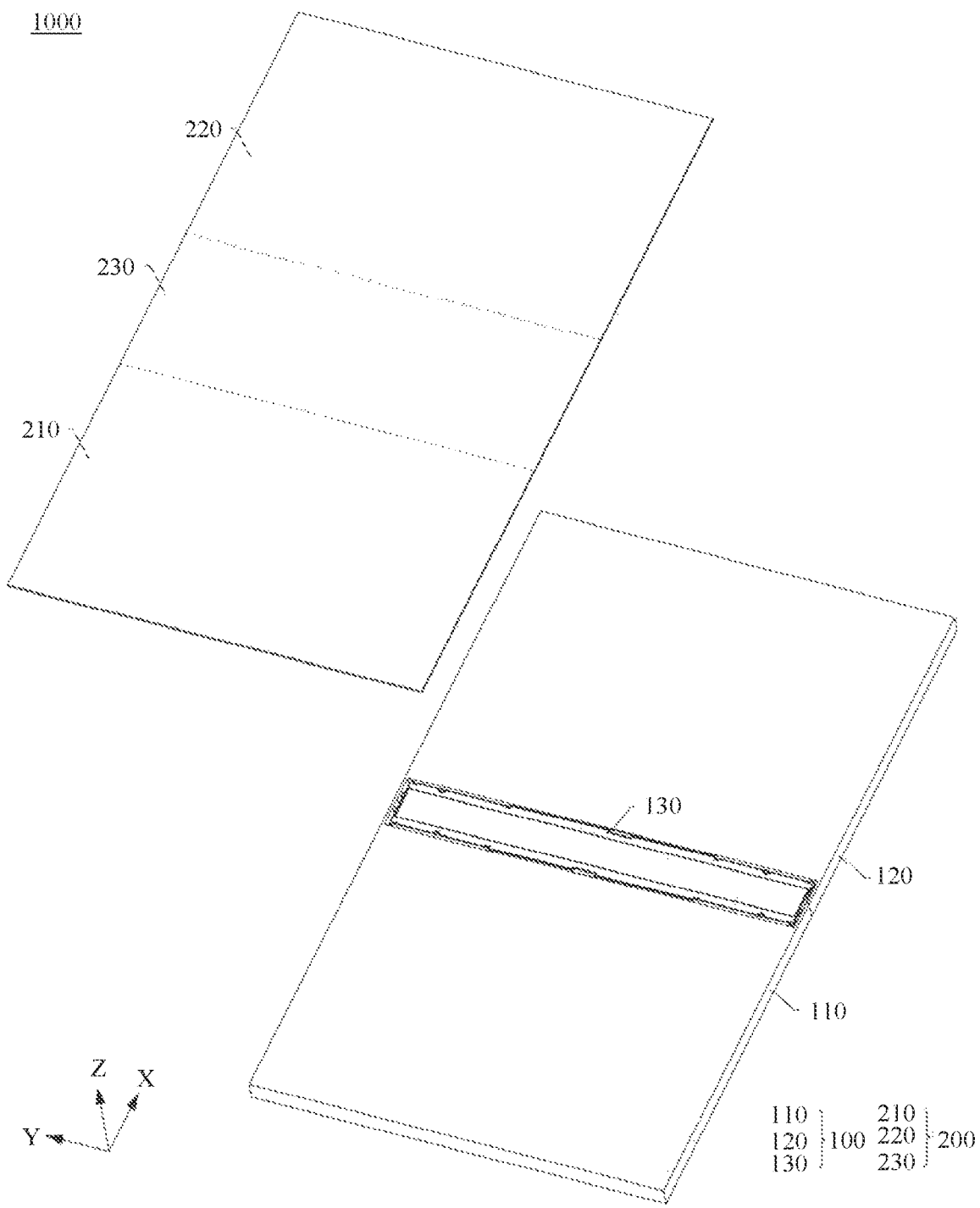
FIG. 3 is a schematic diagram of an exploded structure of the foldable terminal shown in FIG. 2.

Further refer to FIG. 3. FIG. 3 is a schematic diagram of an exploded structure of the foldable terminal 1000 shown in FIG. 2.

The foldable terminal 1000 includes a foldable apparatus 100 and a display screen 200, and the display screen 200 is mounted on the foldable apparatus 100. The display screen 200 includes a display surface (not shown in the figure) facing away from the foldable apparatus 100, and the display surface is used to display information such as texts, images, or videos. In this embodiment, the display screen 200 includes a first display part 210, a second display part 220, and a foldable part 230, and the foldable part 230 is connected between the first display part 210 and the second display part 220. The foldable part 230 can be bent in the Y-axis direction.

As shown in FIG. 1, when the foldable terminal 1000 is in the folded state, the first display part 210 and the second display part 220 are disposed opposite to each other, and the foldable part 230 is bent. In this case, the display screen 200 is in a folded state, and an exposed area of the display screen 200 is relatively small, to greatly reduce a probability that the display screen 200 is damaged, and effectively protect the display screen 200. As shown in FIG. 2, when the foldable terminal 1000 is in the unfolded state, the first display part 210 and the second display part 220 are unfolded with respect to each other, and the foldable part 230 is unfolded without bending. In this case, an angle between the foldable part 230 and each of the first display part 210 and the second display part 220 is a, and the display screen 200 has a large display region, to implement large-screen display by the foldable terminal 1000 and improve user experience.

It should be understood that the foldable terminal 1000 shown in this embodiment of this application is folded inward, and the display screen 200 of the foldable terminal 1000 in the folded state is located on an inner side of the foldable apparatus 100. In some other embodiments, the foldable terminal 1000 may be folded outward, and in this case, the display screen 200 of the foldable terminal 1000 in the folded state is located on an outer side of the foldable apparatus 100.

Figure 4:
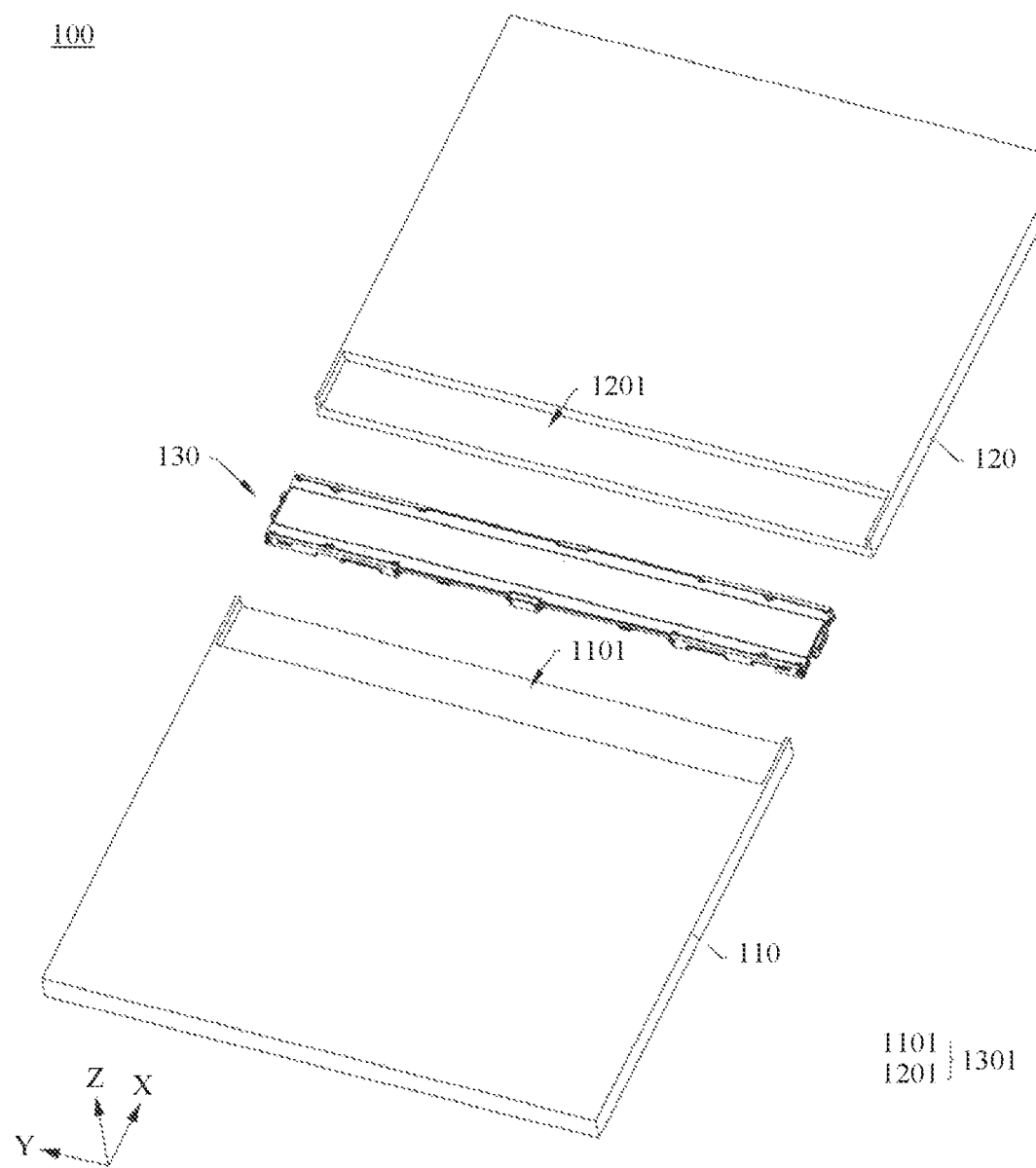
FIG. 4 is a schematic diagram of an exploded structure of a foldable apparatus in the foldable terminal shown in FIG. 3.

Further refer to FIG. 4. FIG. 4 is a schematic diagram of an exploded structure of the foldable apparatus 100 in the foldable terminal 1000 shown in FIG. 3.

In this embodiment, the foldable apparatus 100 includes a first housing 110, a second housing 120, and a foldable mechanism 130, and the foldable mechanism 130 is connected between the first housing 110 and the second housing 120, to implement rotatable connection between the first housing 110 and the second housing 120. Specifically, the first housing 110 carries the first display part 210, and the second housing 120 carries the second display part 220. In other words, the first display part 210 is mounted on the first housing 110, and the second display part 220 is mounted on the second housing 120. The foldable mechanism 130 is disposed opposite to the foldable part 230.

The first housing 110 and the second housing 120 may rotate with respect to each other through the foldable mechanism 130, so that the foldable apparatus 100 is switched between a folded state and an unfolded state. Specifically, the first housing 110 and the second housing 120 may rotate with respect to each other to be disposed opposite to each other, so that the foldable apparatus 100 is in the folded state, as shown in FIG. 1. In this case, the foldable mechanism 130 is in a folded state. The first housing 110 and the second housing 120 may alternatively rotate with respect to each other to be unfolded with respect to each other, so that the foldable apparatus 100 is in the unfolded state, as shown in FIG. 2. In this case, the foldable mechanism 130 is in an unfolded state. For example, the foldable terminal 1000 shown in FIG. 2 is in the unfolded state, and an angle between the first housing 110 and the second housing 120 is a. In this case, the foldable mechanism 130 is in the unfolded state.

The first housing 110 is provided with a first accommodating groove 1101, and the first accommodating groove 1101 is located on a side that is of the first housing 110 and that faces the second housing 120. An opening of the first accommodating groove 1101 is located on a top surface of the first housing 110. The first accommodating groove 1101 is recessed in a direction from the top surface to a bottom surface of the first housing 110, and runs through a right side surface of the first housing 110.

The second housing 120 and the first housing 110 have a same structure and are mirror-symmetrical with respect to the foldable mechanism 130. The second housing 120 is provided with a second accommodating groove 1201, and the second accommodating groove 1201 is located on a side that is of the second housing 120 and that faces the first housing 110. An opening of the second accommodating groove 1201 is located on a top surface of the second housing 120. The second accommodating groove 1201 is recessed in a direction from the top surface to a bottom surface of the second housing 120, and runs through a side surface that is of the second housing 120 and that faces the first housing 110.

When the foldable apparatus 100 is in an unfolded state, that is, when the angle between the first housing 110 and the second housing 120 is a, the first accommodating groove 1101 and the second accommodating groove 1201 form accommodating space 1301 through enclosing. The foldable mechanism 130 is mounted in the accommodating space 1301. A part of the foldable mechanism 130 is mounted in the first accommodating groove 1101 on the first housing 110, and a part of the foldable mechanism 130 is mounted in the second accommodating groove 1201 on the second housing 120.

It should be noted that the orientation words such as "top", "bottom", "left", "right", "front" and "back" used in this embodiment of this application to describe the foldable terminal 1000 are mainly explained based on a display orientation of the foldable terminal 1000 in FIG. 2, with "top" facing a positive direction of a Z-axis, "bottom" facing a negative direction of the Z-axis, "right" facing a positive direction of an X-axis, "left" facing a negative direction of the X-axis, "back" facing a positive direction of a Y-axis, and "front" facing a negative direction of the Y-axis. This does not limit the orientation of the foldable terminal 1000 in an actual application scenario.

In an existing foldable mechanism, a pressing plate is usually formed by assembling a plurality of components. Consequently, there are a large quantity of components in the pressing plate, and assembly is complex. In addition, a problem of poor assembly precision is likely to occur, resulting in a complex structure of the foldable mechanism, which is not conducive to a lightweight design of a foldable terminal. A structure of the foldable mechanism 130 in the foldable terminal 1000 shown in this embodiment of this application is described below.

Figure 5A:
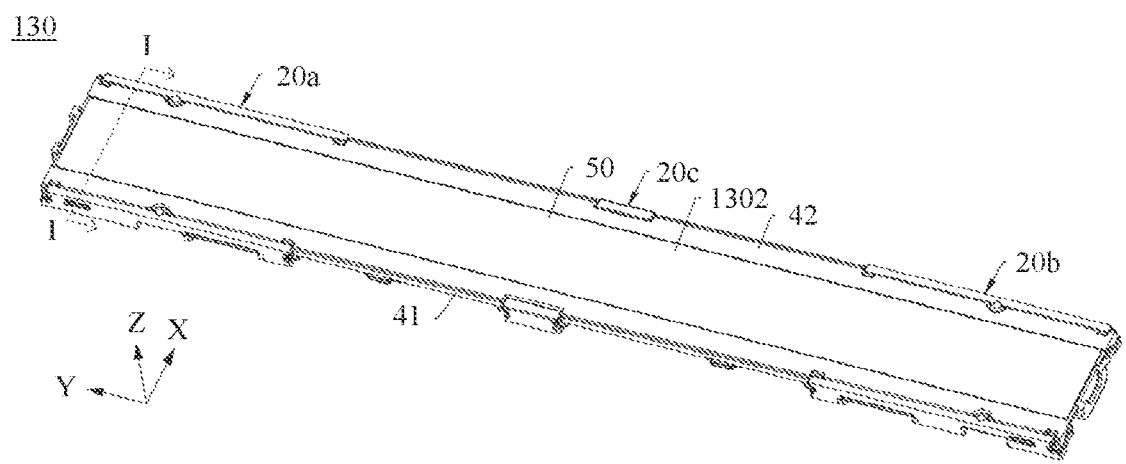
FIG. 5a is a schematic diagram of a structure of a foldable mechanism in the foldable apparatus shown in FIG. 4.
Figure 5B:
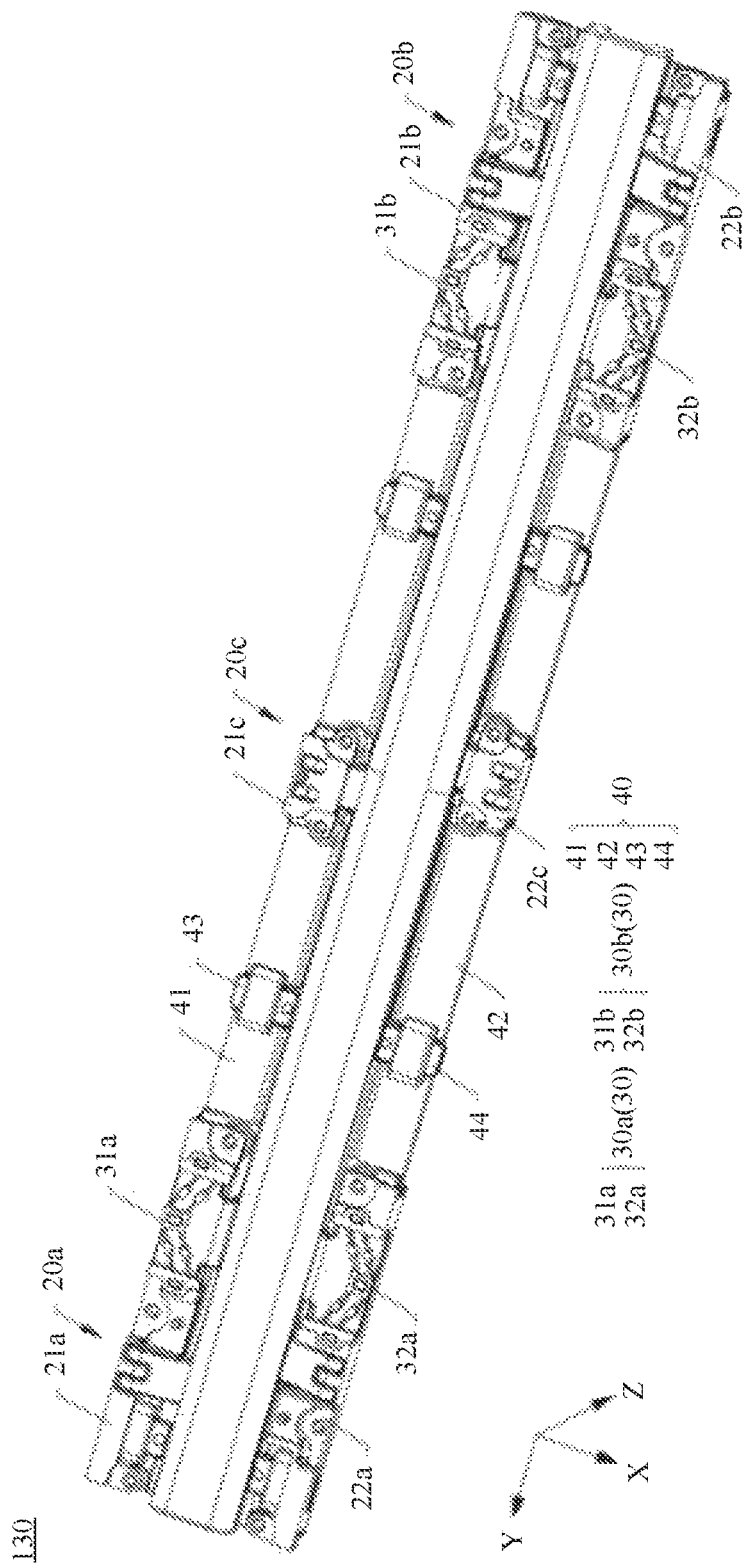
FIG. 5b is a schematic diagram of a structure of the foldable mechanism shown in FIG. 5a from another perspective.
Figure 6:
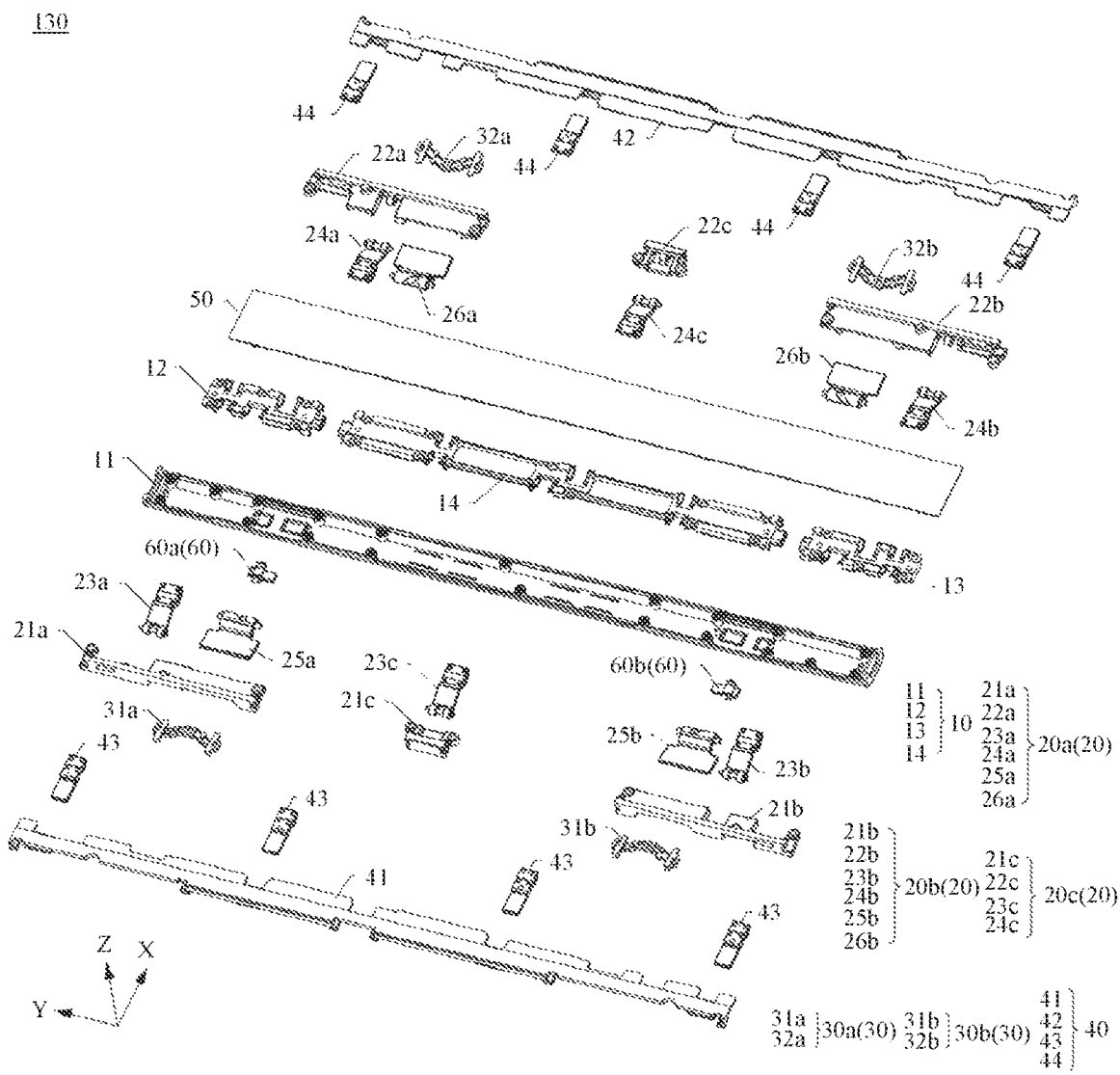

Refer to FIG. 5a, FIG. 5b, and FIG. 6. FIG. 5a is a schematic diagram of a structure of the foldable mechanism 130 in the foldable apparatus 100 shown in FIG. 4. FIG. 5b is a schematic diagram of a structure of the foldable mechanism 130 shown in FIG. 5a from another perspective. FIG.

6 is a schematic diagram of an exploded structure of the foldable mechanism 130 shown in FIG. 5a.

The foldable mechanism 130 includes a base 10, a connecting assembly 20, a damping assembly 30, a pressing plate assembly 40, and a flexible support plate 50. Both the connecting assembly 20 and the pressing plate assembly 40 are mounted on the base 10, and can be folded or unfolded with respect to the base 10, so as to be switched between a folded state and an unfolded state. The damping assembly 30 is mounted on the connecting assembly 20, and can be folded or unfolded with respect to the base 10 under the driving of the connecting assembly 20, so as to be switched between a folded state and an unfolded state. The flexible support plate 50 is mounted on the pressing plate assembly 40, and can be relatively folded or relatively unfolded under the driving of the pressing plate assembly 40, so as to be switched between a folded state and an unfolded state. For example, the base 10 extends in the Y-axis direction.

In this embodiment, there are three connecting assemblies 20, and the three connecting assemblies 20 are spaced apart from each other in the Y-axis direction. The three connecting assemblies 20 are a first connecting assembly 20a, a second connecting assembly 20b, and a third connecting assembly 20c. The third connecting assembly 20c is located between the first connecting assembly 20a and the second connecting assembly 20b. The first connecting assembly 20a is located on a front side of the foldable mechanism 130, the second connecting assembly 20b is located on a rear side of the foldable mechanism 130, and the third connecting assembly 20c is located in a middle portion of the foldable mechanism 130. In some other embodiments, there may be one, two, or at least four connecting assemblies 20. A quantity of connecting assemblies 20 is not specifically limited in this application.

The first connecting assembly 20a includes a first fastening bracket 21a, a second fastening bracket 22a, a first primary swing arm 23a, a second primary swing arm 24a, a first secondary swing arm 25a, and a second secondary swing arm 26a. The first primary swing arm 23a is rotatably connected to the first fastening bracket 21a, and is slidably and rotatably connected to the base 10. The second primary swing arm 24a is rotatably connected to the second fastening bracket 22a, and is slidably and rotatably connected to the base 10. The first secondary swing arm 25a is slidably connected to the first fastening bracket 21a, and is rotatably connected to the base 10. The second secondary swing arm 26a is slidably connected to the second fastening bracket 22a, and is rotatably connected to the base 10.

When the first connecting assembly 20a is switched between a folded state and an unfolded state, a direction in which the first fastening bracket 21a, the first primary swing arm 23a, and the first secondary swing arm 25a rotate with respect to the base 10 is a first direction, and a direction in which the second fastening bracket 22a, the second primary swing arm 24a, and the second secondary swing arm 26a rotate with respect to the base 10 is a second direction. The second direction is opposite to the first direction.

For example, when the first connecting assembly 20a is switched from the folded state to the unfolded state, the first fastening bracket 21a, the first primary swing arm 23a, and the first secondary swing arm 25a rotate with respect to the base 10 in a counterclockwise direction, and the second fastening bracket 22a, the second primary swing arm 24a, and the second secondary swing arm 26a rotate with respect to the base 10 in a clockwise direction. When the first connecting assembly 20a is switched from the unfolded state to the folded state, the first primary swing arm 23a and the first secondary swing arm 25a rotate with respect to the base 10 in the clockwise direction, and the second primary swing arm 24a and the second secondary swing arm 26a rotate with respect to the base 10 in the counterclockwise direction.

It should be noted that the second connecting assembly 20b and the first connecting assembly 20a may be a same or similar assembly, symmetrical or partially symmetrical structures, or different structures. The second connecting assembly 20b may be centrally symmetrical with the first connecting assembly 20a. For a basic structure of each component in the second connecting assembly 20b, a connection relationship between components, and a connection relationship between the component and a component outside the assembly, refer to the related design of the first connecting assembly 20a. The second connecting assembly 20b and the first connecting assembly 20a may differ in detailed structure or position arrangement of the component.

In this embodiment, the second connecting assembly 20b includes a first fastening bracket 21b, a second fastening bracket 22b, a first primary swing arm 23b, a second primary swing arm 24b, a first secondary swing arm 25b, and a second secondary swing arm 26b. For a structure of each component in the second connecting assembly 20b and a connection relationship between each component and each of the base 10, the pressing plate assembly 40, and the damping assembly 30, refer to the related description of the first connecting assembly 20a.

The third connecting assembly 20c includes a first fastening bracket 21c, a second fastening bracket 22c, a first primary swing arm 23c, and a second primary swing arm 24c. For a structure of each component in the third connecting assembly 20c and a connection relationship between each component and each of the base 10, the pressing plate assembly 40, and the damping assembly 30, refer to the related description of the first connecting assembly 20a. In some other embodiments, the third connecting assembly 20c may further include a first secondary swing arm and a second secondary swing arm (not shown in the figure). This is not specifically limited in this application.

It should be noted that the first fastening bracket 21a in the first connecting assembly 20a, the first fastening bracket 21b in the second connecting assembly 20b, and the first fastening bracket 21c in the third connecting assembly 20c may be structural members independent of each other, or may be a plurality of parts of an integrated structural member, and/or the second fastening bracket 22a in the first connecting assembly 20a, the second fastening bracket 22b in the second connecting assembly 20b, and the second fastening bracket 22c in the third connecting assembly 20c may be structural members independent of each other, or may be a plurality of parts of an integrated structural member.

It should be understood that "and/or" in this embodiment of this application means both "and" and "or". For example, A and/or B includes the following three cases: Only A exists, only B exists, and both A and B exist. The following description of "and/or" may be understood in a same way.

In addition, the foldable mechanism 130 further includes a synchronization part 60, and the synchronization part 60 is mounted on the base 10, and is slidably connected to the connecting assembly 20. In this embodiment, there are two synchronization parts 60, and the two synchronization parts 60 are spaced apart from each other in the Y-axis direction. The two synchronization parts 60 are a first synchronization part 60a and a second synchronization part 60b. The first synchronization part 60a is mounted on a front side of the base 10, and is slidably connected to the first secondary swing arm 25a and the second secondary swing arm 26a, so that the first secondary swing arm 25a and the second secondary swing arm 26a synchronously rotate with respect to the base 10. The second synchronization part 60b is mounted on a rear side of the base 10, and is slidably connected to the first secondary swing arm 25b and the second secondary swing arm 26b, so that the first secondary swing arm 25b and the second secondary swing arm 26b synchronously rotate with respect to the base 10.

It should be noted that the second synchronization part 60b and the first synchronization part 60a may be a same or similar assembly, symmetrical or partially symmetrical structures, or different structures. The second synchronization part 60b may be mirror-symmetrical with the first synchronization part 60a For a basic structure of each component in the second synchronization part 60b, a connection relationship between components, and a connection relationship between the component and a component outside an assembly, refer to the related design of the first synchronization part 60a. The second synchronization part 60b and the first synchronization part 60a may differ in detailed structure or position arrangement of the component.

In this embodiment, there are two damping assemblies 30, and the two damping assemblies 30 are spaced apart from each other in the Y-axis direction. The two damping assemblies 30 are a first damping assembly 30a and a second damping assembly 30b. The first damping assembly 30a is mounted on the first connecting assembly 20a. The first damping assembly 30a can provide damping force during folding or unfolding of the first connecting assembly 20a with respect to the base 10. The second damping assembly 30b is mounted on the second connecting assembly 20b. The second damping assembly 30b can provide damping force during folding or unfolding of the second connecting assembly 20b with respect to the base 10. In a process of using the foldable terminal 1000 by a user, for example, when the foldable terminal 1000 is in the folded state or the unfolded state and the foldable terminal 1000 is switched between the folded state and the unfolded state, the user can obviously feel the damping force provided by the first damping assembly 30a and the second damping assembly 30b, and the user can experience a relatively good hand feeling, thereby improving user experience.

In some other embodiments, there may be three damping assemblies 30. The three damping assemblies 30 are a first damping assembly 30a, a second damping assembly 30b, and a third damping assembly (not shown in the figure). The third damping assembly is mounted on the third connecting assembly 20c. The third damping assembly can provide damping force during folding or unfolding of the third connecting assembly 20c with respect to the base 10. Alternatively, there may be one or at least four damping assemblies 30. A quantity of damping assemblies 30 is not specifically limited in this application.

In this embodiment, the first damping assembly 30a includes a first damping member 31a and a second damping member 32a. The first damping member 31a is mounted on the first fastening bracket 21a, is fixedly connected to the first secondary swing arm 25a, and can slide with respect to the first fastening bracket 21a under the driving of the first secondary swing arm 25a. The second damping member 32a is mounted on the second fastening bracket 22a, is fixedly connected to the second secondary swing arm 26a, and can slide with respect to the second fastening bracket 22a under the driving of the second secondary swing arm 26a.

It should be noted that the second damping assembly 30b and the first damping assembly 30a may be a same or similar assembly, symmetrical or partially symmetrical structures, or different structures. The second damping assembly 30b may be mirror-symmetrical with the first damping assembly 30a. For a basic structure of each component in the second damping assembly 30b, a connection relationship between components, and a connection relationship between the component and a component outside the assembly, refer to the related design of the first damping assembly 30a. The second damping assembly 30b and the first damping assembly 30a may differ in detailed structure or position arrangement of the component.

In this embodiment, the second damping assembly 30b includes a first damping member 31b and a second damping member 32b. The first damping member 31b is mounted on the first fastening bracket 21b, is fixedly connected to the first secondary swing arm 25b, and can slide with respect to the first fastening bracket 21b under the driving of the first secondary swing arm 25b. The second damping member 32b is mounted on the second fastening bracket 22b, is fixedly connected to the second secondary swing arm 26b, and can slide with respect to the second fastening bracket 22b under the driving of the second secondary swing arm 26b. For a structure of each component in the second damping assembly 30b and a connection relationship between each component and each of the base 10, the second connecting assembly 20b, and the pressing plate assembly 40, refer to the related description of the first damping assembly 30a.

The pressing plate assembly 40 is slidably and rotatably connected to the connecting assembly 20. In this embodiment, the pressing plate assembly 40 includes a first pressing plate 41, a second pressing plate 42, a first pressing plate swing arm 43, and a second pressing plate swing arm 44. A front side of the first pressing plate 41 is slidably and rotatably connected to the first fastening bracket 21a, a rear side of the first pressing plate 41 is slidably and rotatably connected to the first fastening bracket 21b, and a middle portion of the first pressing plate 41 is slidably and rotatably connected to the first fastening bracket 21c. A front side of the second pressing plate 42 is slidably and rotatably connected to the second fastening bracket 22a, a rear side of the second pressing plate 42 is slidably and rotatably connected to the second fastening bracket 22b, and a middle portion of the second pressing plate 42 is slidably and rotatably connected to the second fastening bracket 22c.

There are four first pressing plate swing arms 43 and four second pressing plate swing arms 44. In the Y-axis direction, the four first pressing plate swing arms 43 are spaced apart from each other, and the four second pressing plate swing arms 44 are spaced apart from each other. In some other embodiments, there may be one, two, or at least four first pressing plate swing arms 43, and/or there may be one, two, or at least four second pressing plate swing arms 44. Quantities of first pressing plate swing arms 43 and second pressing plate swing arms 44 are not specifically limited in this application.

Each first pressing plate swing arm 43 is slidably connected to the first pressing plate 41, and is slidably and rotatably connected to the base 10. Each second pressing plate swing arm 44 is slidably connected to the second pressing plate 42, and is slidably and rotatably connected to the base 10. In some other embodiments, each first pressing plate swing arm 43 may be rotatably connected to the base 10, and/or the second pressing plate swing arm 44 may be rotatably connected to the base 10.

The flexible support plate 50 is mounted on the first pressing plate swing arm 43 and the second pressing plate swing arm 44, and can be relatively folded or relatively unfolded under the driving of the first pressing plate swing arm 43 and the second pressing plate swing arm 44, to implement switching between the folded state and the unfolded state. A bending direction of the flexible support plate 50 is the Y-axis direction, and is parallel to rotation centers of the first pressing plate swing arm 43 and the second pressing plate swing arm 44 with respect to the base 10. It should be noted that, that a bending direction of the flexible support plate 50 is the Y-axis means that the flexible support plate 50 can be bent in the Y-axis direction.

Figure 7:
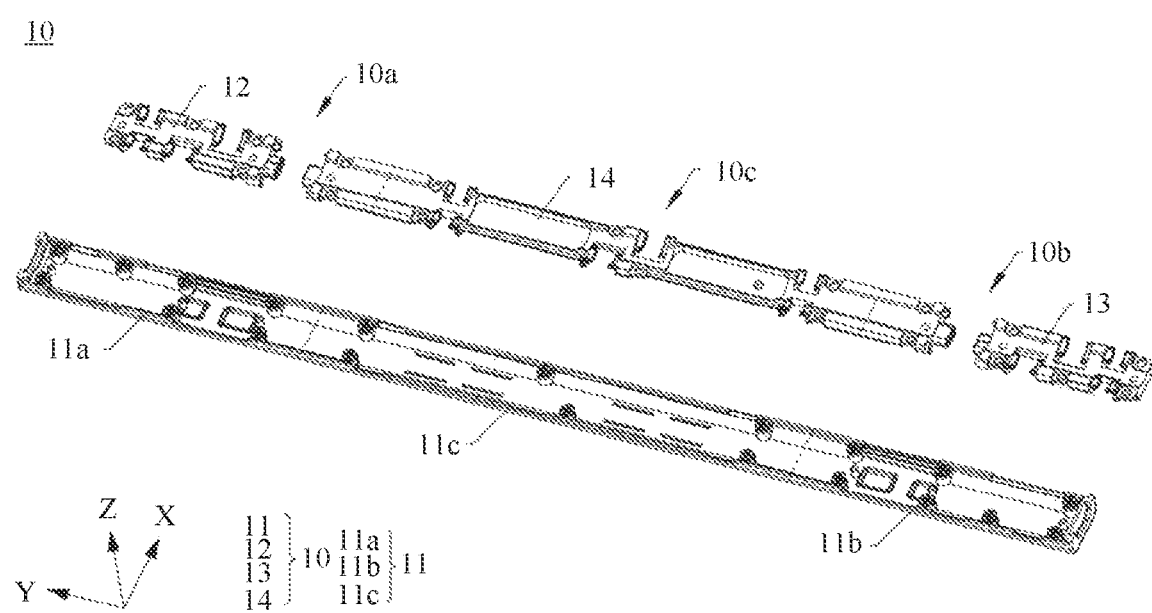
FIG. 7 is a schematic diagram of a structure of a base in the foldable mechanism shown in FIG. 6.

Refer to FIG. 6 and FIG. 7. FIG. 7 is a schematic diagram of a structure of the base 10 in the foldable mechanism 130 shown in FIG. 6.

The base 10 includes a shaft cover 11, a first bracket 12, a second bracket 13, and a third bracket 14. All of the first bracket 12, the second bracket 13, and the third bracket 14 are fixedly connected to the shaft cover 11. In the Y-axis direction, the third bracket 14 is located between the first bracket 12 and the second bracket 13, and is spaced apart from both the first bracket 12 and the second bracket 13.

In some other embodiments, the base 10 may be an integrally formed structural member. This not only can improve overall strength of the base 10 to ensure the overall strength of the base 10, but also can reduce a quantity of components in the base 10 to facilitate a lightweight design of the foldable mechanism 130.

In this embodiment, the shaft cover 11 includes a front end portion 11*a*, a rear end portion 11*b*, and a middle portion 11*c*. The middle portion 11*c* is connected between the front end portion 11*a* and the rear end portion 11*b*. Specifically, the front end portion 11*a*, the middle portion 11*c*, and the rear end portion 11*b* are sequentially arranged in the Y-axis direction. The front end portion 11*a*, the rear end portion 11*b*, and the middle portion 11*c* are integrally formed. In other words, the shaft cover 11 is an integrally formed structural member. In some other embodiments, the front end portion 11*a*, the rear end portion 11*b*, and the middle portion 11*c* may be assembled to form an integrated structural member. In other words, the shaft cover 11 is an integrated structural member formed through assembling.

The first bracket 12 and a part of the third bracket 14 are fixedly connected to the front end portion 11*a* of the shaft cover 11, and jointly form a first part 10*a* of the base 10 with the front end portion 11*a* of the shaft cover 11. The second bracket 13 and a part of the third bracket 14 are fixedly connected to the rear end portion 11*b* of the shaft cover 11, and jointly form a second part 10*b* of the base 10 with the rear end portion 11*b* of the shaft cover 11. A part of the third bracket 14 is fixedly connected to the middle portion 11*c* of the shaft cover 11, and jointly forms a third part 10*c* of the base 10 with the middle portion 11*c* of the shaft cover 11. The first part 10*a* of the base 10 is cooperatively connected to the first connecting assembly 20*a*, the second part 10*b* of the base 10 is cooperatively connected to the second connecting assembly 20*b*, and the third part 10*c* of the base 10 is cooperatively connected to the third connecting assembly 20*c*.

Figure 8:
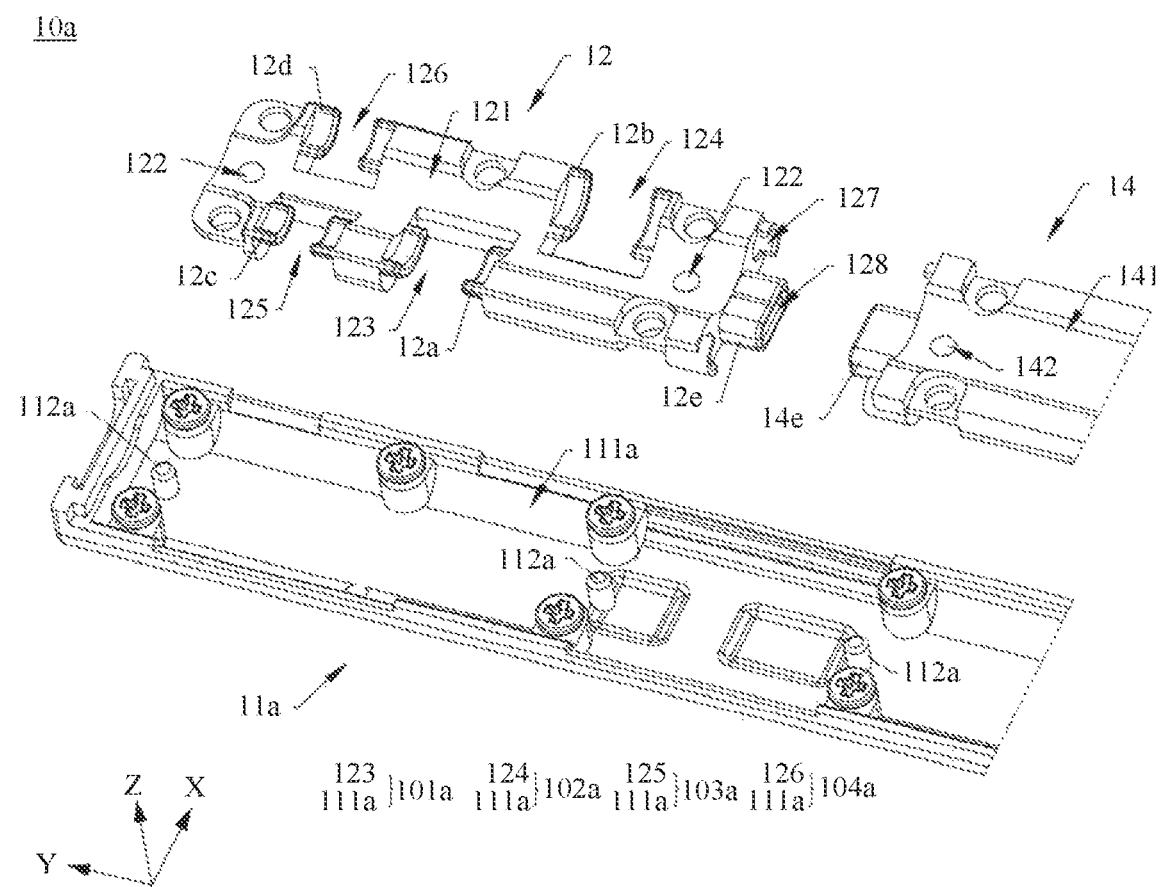
FIG. 8 is a schematic diagram of a structure of a first part of the base shown in FIG. 7.

Refer to FIG. 7 and FIG. 8. FIG. 8 is a schematic diagram of a structure of the first part 10*a* of the base 10 shown m FIG. 7.

The front end portion 11*a* of the shaft cover 11 is provided with a mounting groove 111*a*, and an opening of the mounting groove 111*a* is located on a top surface (not shown in the figure) of the front end portion 11*a*. The mounting groove 111*a* is recessed in a direction (the negative direction of the Z-axis shown in the figure) from the top surface to a bottom surface (not shown in the figure) of the front end portion 11*a*. Specifically, the mounting groove 111*a* is located in a middle portion of the front end portion 11*a*.

In addition, the front end portion 11*a* of the shaft cover 11 is further provided with a positioning rod 112*a*. The positioning rod 112*a* is disposed on a groove bottom wall (not shown in the figure) of the mounting groove 11*a*. The positioning rod 112*a* extends in the positive direction of the Z-axis from the groove bottom wall of the mounting groove 111*a*. For example, the positioning rod 112*a* is in a cylindrical shape. There are three positioning rods 112*a*, and the three positioning rods 112*a* are sequentially spaced apart from each other in the Y-axis direction. In some other embodiments, the positioning rod 112*a* may alternatively be in a square column shape or a specially-shaped column shape, and/or there may be one, two, or at least four positioning rods 112*a*.

The first bracket 12 is provided with an avoidance groove 121 and a positioning hole 122. An opening of the avoidance groove 121 is located on a top surface of the first bracket 12. Specifically, the opening of the avoidance groove 121 is located in a middle region of the top surface of the first bracket 12. The avoidance groove 121 is recessed in a direction (the negative direction of the Z-axis shown in the figure) from the top surface to a bottom surface of the first bracket 12, and runs through a front end face and a rear end face of the first bracket 12. The avoidance groove 121 is an arc-shaped groove. That is, a groove bottom wall of the avoidance groove 121 has an arc-shaped surface.

An opening of the positioning hole 122 is located on the bottom surface (not shown in the figure) of the first bracket 12. The positioning hole 122 is recessed in a direction (the positive direction of the Z-axis shown in the figure) from the bottom surface to the top surface (not shown in the figure) of the first bracket 12, and runs through the groove bottom wall of the avoidance groove 121. There are two positioning holes 122, and the two positioning holes 122 are spaced apart from each other in the Y-axis direction. Each positioning hole 122 is adapted to one positioning rod 112*a*. When the first bracket 12 and the front end portion 11*a* are assembled, two positioning rods 112*a* can pass through the two positioning holes 122, to implement positioning between the first bracket 12 and the shaft cover 11, and ensure assembly precision between the first bracket 12 and the shaft cover 11.

The first bracket 12 is further provided with a first notch 123, a second notch 124, a third notch 125, and a fourth notch 126. Openings of all of the first notch 123, the second notch 124, the third notch 125, and the fourth notch 126 are located on the top surface of the first bracket 12. All of the first notch 123, the second notch 124, the third notch 125, and the fourth notch 126 are recessed in a direction (the Z-axis direction shown in the figure) from the top surface to the bottom surface of the first bracket 12, and run through the bottom surface of the first bracket 12 and the groove bottom wall of the avoidance groove 121. Specifically, both the first notch 123 and the third notch 125 are located on a left side of the first bracket 12, and run through a left side surface of the first bracket 12. Both the second notch 124 and the fourth notch 126 are located on a right side of the first bracket 12, and run through a right side surface of the first bracket 12.

The first notch 123 and the second notch 124 are spaced apart from each other in the Y-axis direction. The first notch 123 and the second notch 124 partially overlap in the X-axis direction. That is, projections of the first notch 123 and the second notch 124 on an X-Z plane partially overlap. The first notch 123 and the second notch 124 partially reuse space of the first bracket 12 in the X-axis direction, to help reduce a size of the first bracket 12 in the X-axis direction, and help reduce a size of the foldable mechanism 130 in the X-axis direction, so as to help reduce a size of the foldable terminal 1000 in the X-axis direction, and help implement a miniaturization design of the foldable terminal 1000.

In some other embodiments, the first notch 123 and the second notch 124 may partially or completely overlap in the Y-axis direction, to reduce a size of the first bracket 12 in the Y-axis direction; or the first notch 123 and the second notch 124 may be spaced apart from each other or completely overlap in the X-axis direction.

The third notch 125 is located on a side that is of the first notch 123 and that faces the positive direction of the Y-axis, and is spaced apart from the first notch 123. The fourth notch 126 is located on a side that is of the second notch 124 and that faces the positive direction of the Y-axis, and is spaced apart from the second notch 124. The third notch 125 and the fourth notch 126 are spaced apart and disposed opposite to each other in the X-axis direction. The third notch 125 and the fourth notch 126 completely overlap in the Y-axis direction. That is, projections of the third notch 125 and the fourth notch 126 on a Y-Z plane completely overlap. The third notch 125 and the fourth notch 126 reuse space of the first bracket 12 in the Y-axis direction, to help reduce a size of the first bracket 12 in the Y-axis direction, and help reduce a size of the foldable mechanism 130 in the Y-axis direction, so as to help reduce a size of the foldable terminal 1000 in the Y-axis direction, and help implement a miniaturization design of the foldable terminal 1000.

In some other embodiments, the third notch 125 and the fourth notch 126 may partially or completely overlap in the X-axis direction, to reduce a size of the first bracket 12 in the X-axis direction; or the third notch 125 and the fourth notch 126 may be spaced apart from each other or partially overlap in the Y-axis direction.

In addition, the first bracket 12 is further provided with a first slider 12a, a second slider 12b, a third slider 12c, and a fourth slider 12d. There are two first sliders 12a, and the two first sliders 12a are respectively disposed on two groove side walls of the first notch 123. One first slider 12a extends in the negative direction of the Y-axis from the groove side wall of the first notch 123, and the other first slider 12a extends in the positive direction of the Y-axis from the groove side wall of the first notch 123. The two first sliders 12a are spaced apart and disposed opposite to each other in the Y-axis direction. Each of the two first sliders 12a is in a shape of an arc-shaped plate, and is recessed toward the negative direction of the Z-axis. That is, both a top surface (not shown in the figure) and a bottom surface (not shown in the figure) of the first slider 12a are arc-shaped surfaces, and are recessed toward the negative direction of the Z-axis. For example, axes of the two first sliders 12a are both parallel to the Y-axis, and the two first sliders 12a are coaxial.

It should be noted that "coaxial" in this embodiment of this application means that extension lines of axes coincide with each other. For example, that A and B are coaxial means that an extension line of an axis of A coincides with an extension line of an axis of B. The following description of "coaxial" may be understood in a same way.

There are two second sliders 12b, two third sliders 12c, and two fourth sliders 12d. The two second sliders 12b are respectively disposed on two groove side walls of the second notch 124, the two third sliders 12c are respectively disposed on two groove side walls of the third notch 125, and the two fourth sliders 12d are respectively disposed on two groove side walls of the fourth notch 126. For a structure of each of the second slider 12b, the third slider 12c, and the fourth slider 12d, refer to the related description of the first slider 12a. Details are not described herein.

In addition, the first bracket 12 is further provided with a first rotating shaft hole (not shown in the figure) and a second rotating shaft hole 127. Openings of both the first rotating shaft hole and the second rotating shaft hole 127 are located on the rear end face of the first bracket 12. Both the first rotating shaft hole and the second rotating shaft hole 127 extend in the positive direction of the Y-axis from the rear end face of the first bracket 12. Specifically, the first rotating shaft hole is located on the left side of the first bracket 12, and the second rotating shaft hole 127 is located on the right side of the first bracket 12. For example, both the first rotating shaft hole and the second rotating shaft hole 127 are circular holes, and axes are both parallel to the Y-axis direction.

In addition, the first bracket 12 is further provided with a mounting bump 12e, and the mounting bump 12e is disposed on the rear end face of the first bracket 12. Specifically, the mounting bump 12e is located between the first rotating shaft hole and the second rotating shaft hole 127, and is spaced apart from both the first rotating shaft hole and the second rotating shaft hole 127. The mounting bump 12e extends in the negative direction of the Y-axis from the rear end face of the first bracket 12. The mounting bump 12e is provided with a mounting hole 128, and an opening of the mounting hole 128 is located on a rear end face of the mounting bump 12e. The mounting hole 128 is recessed from the rear end face of the mounting bump 12e in the positive direction of the Y-axis. For example, the mounting hole 128 is a square hole. In some other embodiments, the mounting hole 128 may be a circular hole or another specially-shaped hole.

In this embodiment, the first bracket 12 may be fixedly connected to the front end portion 11a by using a fastener (for example, a screw or a pin). Specifically, the first bracket 12 is mounted in the mounting groove 111a, and is located at a position that is of the mounting groove 111a and that faces away from the middle portion 111c. The first notch 123 and a part of the mounting groove 111a jointly form a first sliding groove 101a, the second notch 124 and a part of the mounting groove 111a jointly form a second sliding groove 102a, the third notch 125 and a part of the mounting groove 111a jointly form a first fitting groove 103a, and the fourth notch 126 and a part of the mounting groove 111a jointly form a second fitting groove 104a. In some other embodiments, the first bracket 12 may be fixedly connected to the front end portion 11a of the shaft cover 11 through bonding, welding, or the like.

Figure 9:
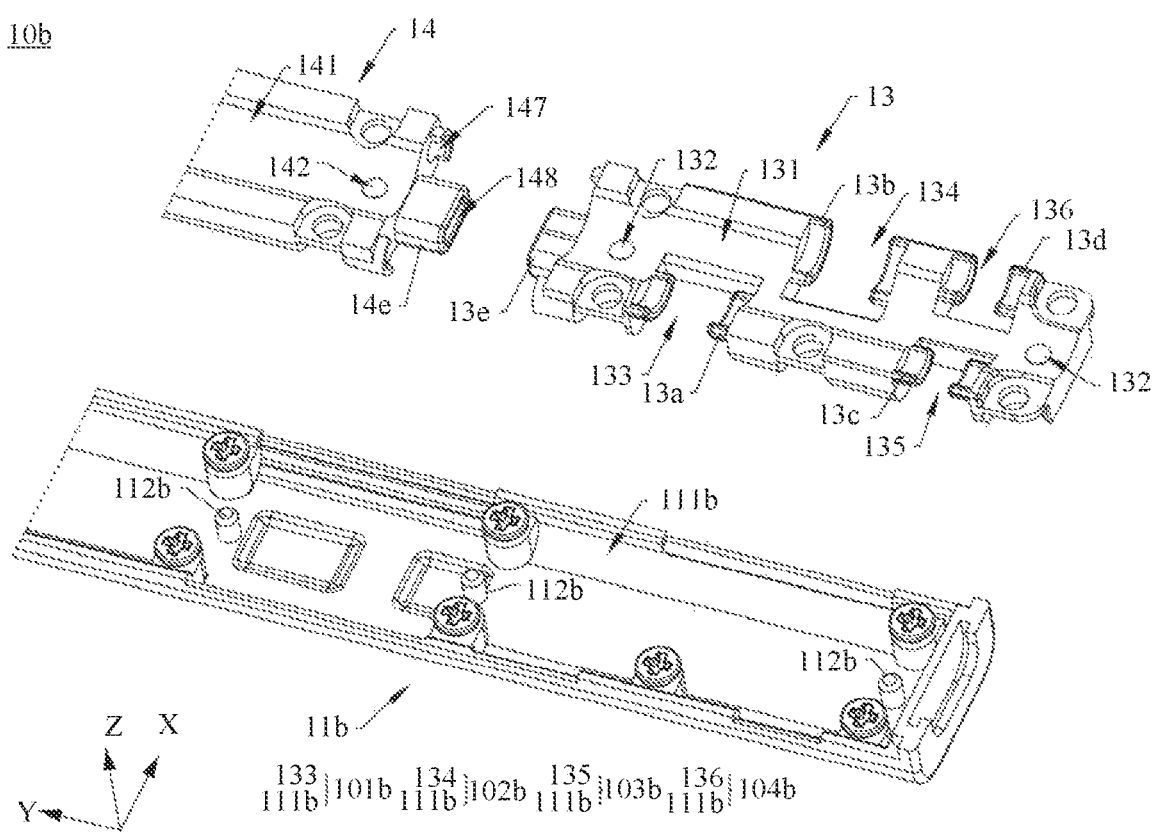
FIG. 9 is a schematic diagram of a structure of a second part of the base shown in FIG. 7.

Refer to FIG. 7 and FIG. 9. FIG. 9 is a schematic diagram of a structure of the second part 10b of the base 10 shown in FIG. 7.

In this embodiment, the rear end portion 11b of the shaft cover 11 is centrally symmetrical with the front end portion 11a of the shaft cover 11. This not only can improve symmetry of the shaft cover 11, but also can simplify an overall structure of the shaft cover 11, thereby reducing processing costs of the shaft cover 11. It may be understood that, for a structural design of the rear end portion 11b of the shaft cover 11, reference may be made to the related solution of the front end portion 11a (shown in FIG. 8) of the shaft cover 1, and the rear end portion 11b of the shaft cover 11 is allowed to be slightly different from the front end portion 11a of the shaft cover 11 in detailed structure or position arrangement of the component. The rear end portion 11b of the shaft cover 11 is provided with a mounting groove 111b and a positioning rod 112b.

In some other embodiments, the rear end portion 11b of the shaft cover 11 may be mirror-symmetrical with the front end portion 11a of the shaft cover 11, the rear end portion 11b of the shaft cover 11 may be partially symmetrical with the front end portion 11a of the shaft cover 11, or the rear end portion 11b of the shaft cover 11 and the front end portion 11a of the shaft cover 11 may be of a same or similar structure or different structures.

In this embodiment, the second bracket 13 is centrally symmetrical with the first bracket 12. This not only can improve symmetry of the base 10, but also can simplify an overall structure of the base 10, thereby reducing processing costs of the base 10. It may be understood that, for a basic design of a structure of a component of the second bracket 13, a design of a position relationship between components, and a design of a connection relationship between the second bracket 13 and the rear end portion 11b of the shaft cover 11, reference may be made to the related solution of the first bracket 12 (shown in FIG. 8), and the second bracket 13 is allowed to be slightly different from the first bracket 12 in detailed structure or position arrangement of the component.

The second bracket 13 is provided with an avoidance groove 131, a positioning hole 132, a first notch 133, a second notch 134, a third notch 135, a fourth notch 136, a first rotating shaft hole, and a second rotating shaft hole (not shown in the figure). The first notch 133 and a part of the mounting groove 111b jointly form a first sliding groove 101b. The second notch 134 and a part of the mounting groove 111b jointly form a second sliding groove 102b. The third notch 135 and a part of the mounting groove 111b jointly form a first fitting groove 103b. The fourth notch 136 and a part of the mounting groove 111b jointly form a second fitting groove 104b. Openings of both the first rotating shaft hole and the second rotating shaft hole are located on a front end face of the second bracket 13.

In addition, the second bracket 13 is further provided with a first slider 13a, a second slider 13b, a third slider 13c, a fourth slider 13d, and a mounting bump 13e. The mounting bump 13e is disposed on the front end face of the second bracket 13. The mounting bump 3e is provided with a mounting hole (not shown in the figure), and an opening of the mounting hole is located on a front end face of the mounting bump 13e.

In some other embodiments, the second bracket 13 may be mirror-symmetrical with the first bracket 12, the second bracket 13 may be partially symmetrical with the first bracket 12, or the second bracket 13 and the first bracket 12 may be of a same or similar structure or different structures.

Figure 10:
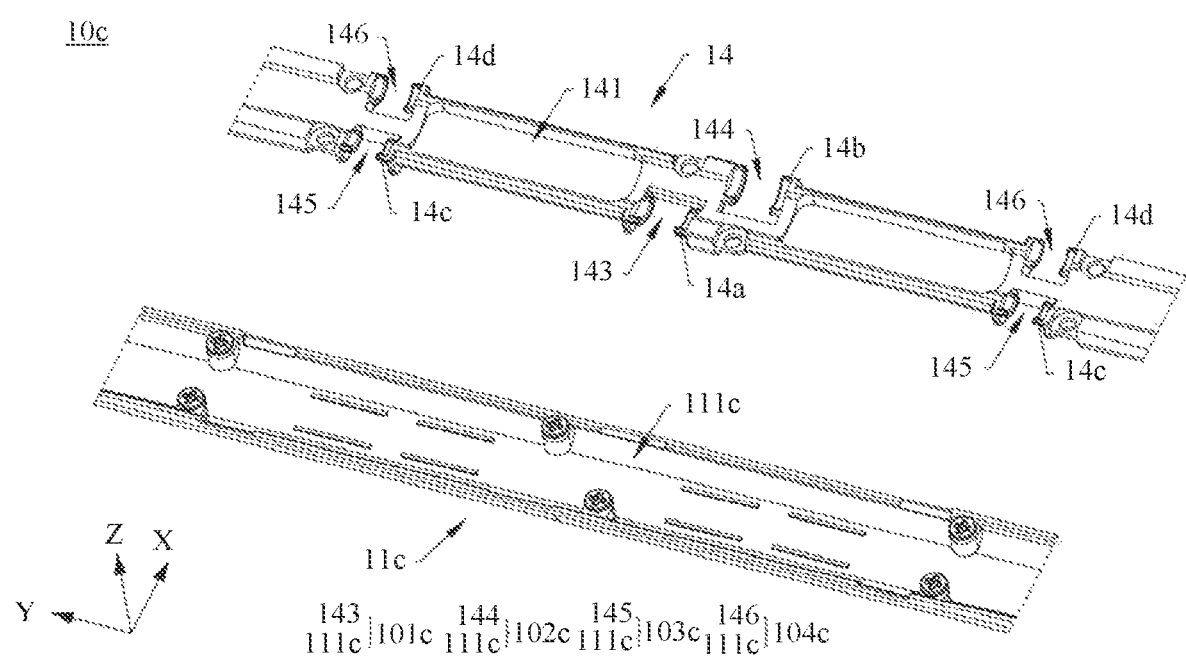
FIG. 10 is a schematic diagram of a structure of a third part of the base shown in FIG. 7.

Refer to FIG. 8, FIG. 9, and FIG. 10. FIG. 10 is a schematic diagram of a structure of the third part 10c of the base 10 shown in FIG. 7.

In this embodiment, the middle portion 11c of the shaft cover 11 is provided with a mounting groove 111c. It should be noted that a structure of the mounting groove 111c is substantially the same as that of the mounting groove 111a of the front end portion 11a. Details are not described herein. The mounting groove 111c of the middle portion 11c can communicate with the mounting groove 111a of the front end portion 11a and the mounting groove 111b of the rear end portion 11b.

The third bracket 14 is provided with an avoidance groove 141, a positioning hole 142, a first notch 143, a second notch 144, a third notch 145, a fourth notch 146, a first rotating shaft hole (not shown in the figure), and a second rotating shaft hole 147. It should be noted that, for structures of the avoidance groove 141, the positioning hole 142, the first notch 143, the second notch 144, the third notch 145, the fourth notch 146, the first rotating shaft hole, and the second rotating shaft hole 147, respectively refer to the related description of the avoidance groove 121, the positioning hole 122, the first notch 123, and the second notch 124 in the first bracket 12. Details are not described herein.

There are two positioning holes 142, one positioning hole 142 is located at a position that is of the third bracket 14 and that faces the first bracket 12, and the other positioning hole 142 is located at a position that is of the third bracket 14 and that faces the second bracket 13. When the third bracket 14 and the shaft cover 11 are assembled, one positioning rod 112a can pass through one positioning hole 142, and one positioning rod 112b can pass through the other positioning hole 142, to implement positioning between the third bracket 14 and the shaft cover 11, and ensure assembly precision between the third bracket 14 and the shaft cover 11.

There are two third notches 145 and two fourth notches 146. In the Y-axis direction, the two third notches 145 are respectively located on two opposite sides of the first notch 143, and the two fourth notches 146 are respectively located on two opposite sides of the second notch 144. The first notch 143 and a part of the mounting groove 111c jointly form a first sliding groove 101c. The second notch 144 and a part of the mounting groove 111c jointly form a second sliding groove 102c. Each third notch 145 and a part of the mounting groove 111c jointly form a first fitting groove 103c. Each fourth notch 146 and a part of the mounting groove 111c jointly form a second fitting groove 104c.

There are two first rotating shaft holes and two second rotating shaft holes 147. Openings of one first rotating shaft hole and one second rotating shaft hole are located on a front end face of the third bracket 14. The first rotating shaft hole is disposed opposite to the first rotating shaft hole of the first bracket 12, and is coaxial with the first rotating shaft hole of the first bracket 12. The second rotating shaft hole is disposed opposite to the second rotating shaft hole 127, and is coaxial with the second rotating shaft hole 127.

Openings of the other first rotating shaft hole and the other second rotating shaft hole are located on a rear end face of the third bracket 14. The first rotating shaft hole is disposed opposite to the first rotating shaft hole of the second bracket 13, and is coaxial with the first rotating shaft hole of the second bracket 13. The second rotating shaft hole is disposed opposite to the second rotating shaft hole 137, and is coaxial with the second rotating shaft hole 137.

In addition, the third bracket 14 is further provided with a first slider 14a, a second slider 14b, a third slider 14c, a fourth slider 14d, and a mounting bump 14e. In this embodiment, for structures of the first slider 14a, the second slider 14b, the third slider 14c, the fourth slider 14d, and the mounting bump 14e, respectively refer to the related description of the first slider 12a, the second slider 12b, the third slider 12c, the fourth slider 12d, and the mounting bump 12e in the first bracket 12. Details are not described herein.

There are four third sliders 14c and four fourth sliders 14d. Every two third sliders 14c are respectively disposed on two groove side walls of one third notch 145, and every two fourth sliders 14d are respectively disposed on two groove side walls of one fourth notch 146. There are two mounting bumps 14e. One mounting bump 14e is disposed on the front end face of the third bracket 14, and a mounting hole (not shown in the figure) of the mounting bump 14e is disposed opposite to the mounting hole 128 of the mounting bump 12e. The other mounting bump 14e is disposed on the rear end face of the third bracket 14, and a mounting hole 148 of the mounting bump 14e is disposed opposite to the mounting hole of the mounting bump 13e.

Figure 11:
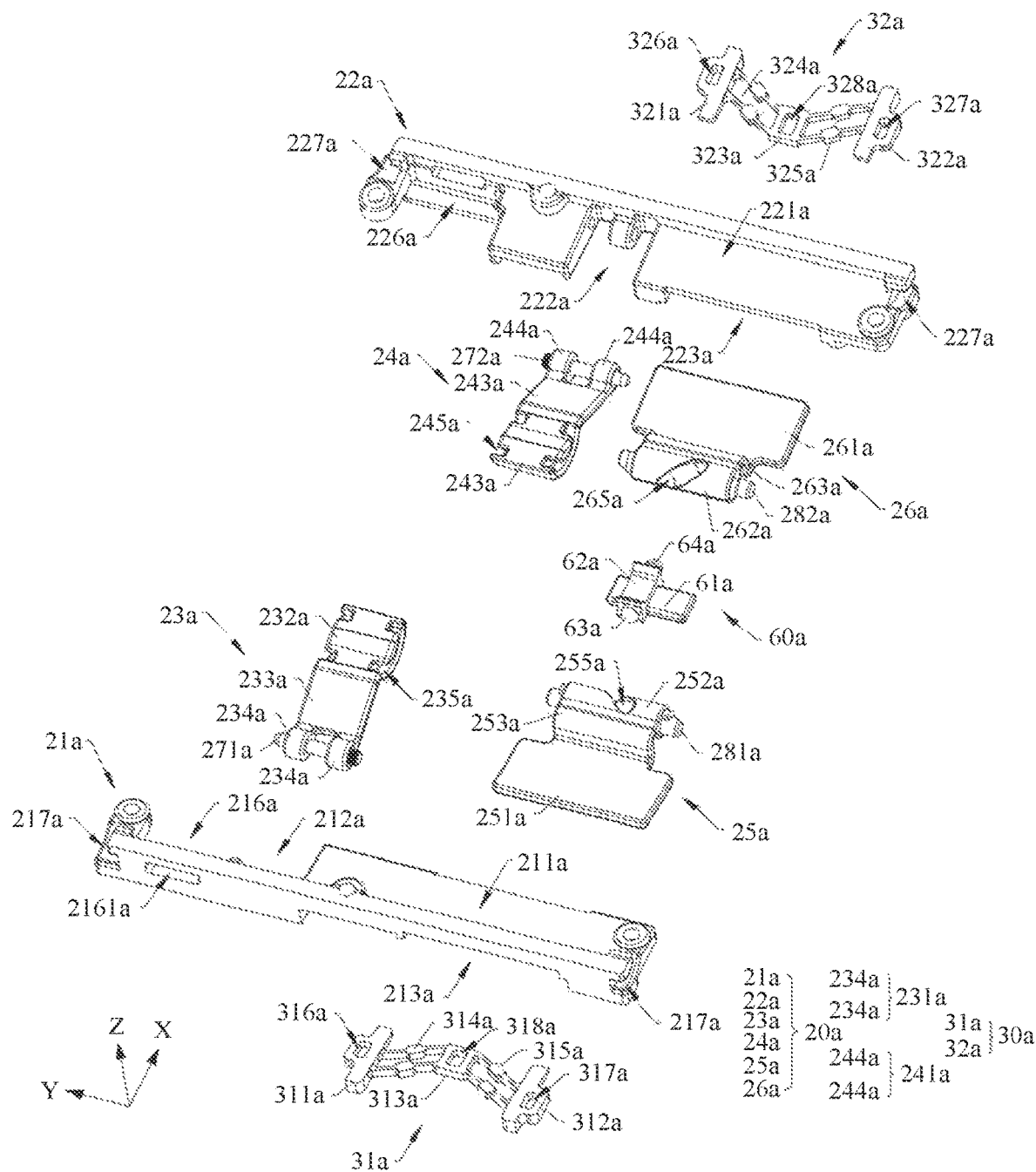
FIG. 11 is a schematic diagram of structures of a first connecting assembly, a first damping assembly, and a first synchronization part in the foldable mechanism shown in FIG. 6.
Figure 12:
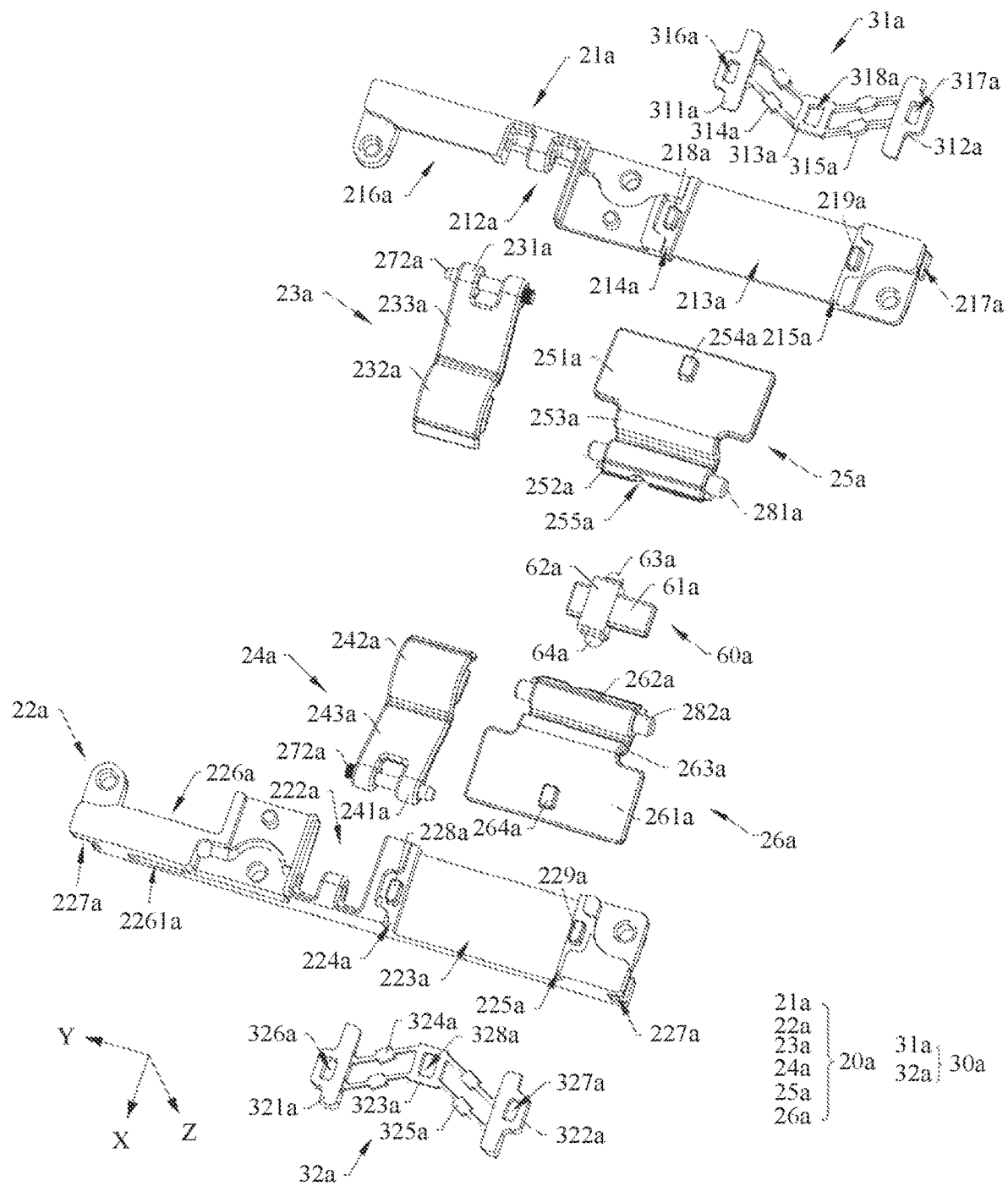
FIG. 12 is a schematic diagram of structures of the first connecting assembly, the first damping assembly, and the first synchronization part shown in FIG. 11 from another perspective.

Refer to FIG. 8, FIG. 11, and FIG. 12. FIG. 11 is a schematic diagram of structures of the first connecting assembly 20a, the first damping assembly 30a, and the first synchronization part 60a in the foldable mechanism 130 shown in FIG. 6. FIG. 12 is a schematic diagram of structures of the first connecting assembly 20a, the first damping assembly 30a, and the first synchronization part 60a shown in FIG. 11 from another perspective.

The first fastening bracket 21a is provided with an accommodating notch 211a, a mounting notch 212a, a sliding groove 213a, a first mounting groove 214a, a second mounting groove 215a, an avoidance groove 216a, and a guide groove 217a. An opening of the accommodating notch 211a is located on a top surface of the first fastening bracket 21a. The accommodating notch 211a is recessed in a direction (namely, the negative direction of the Z-axis shown in the figure) from the top surface to a bottom surface of the first fastening bracket 21a, and runs through a front end face, a rear end face, and a right side surface of the first fastening bracket 21a. In some other embodiments, the accommodating notch 211a may not run through the front end face of the first fastening bracket 21a, the accommodating notch 211a may not run through the rear end face of the first fastening bracket 21a, and/or the accommodating notch 211a may not run through the right side surface of the first fastening bracket 21a.

An opening of the mounting notch 212a is located on the right side surface of the first fastening bracket 21a. The mounting notch 212a is recessed in a direction (the negative direction of the X-axis shown in the figure) from the right side surface to a left side surface of the first fastening bracket 21a, and runs through the bottom surface of the first fastening bracket 21a and a groove bottom wall of the accommodating notch 211a. In some other embodiments, the mounting notch 212a may not run through the bottom surface of the first fastening bracket 21a.

The mounting notch 212a includes two groove side walls disposed opposite to each other and a groove bottom wall (not shown in the figure) connected between the two groove side walls. The two groove side walls of the mounting notch 212a are both concavely provided with mounting holes (not shown in the figure), and the mounting holes are both recessed in the Y-axis direction. The two mounting holes are circular holes, and the two mounting holes are coaxial. For example, axes of the two mounting holes are both parallel to the Y-axis direction.

The groove bottom wall of the mounting notch 212a is convexly provided with a mounting boss (not shown in the figure), and the mounting boss is spaced apart from both of the two groove side walls of the mounting notch 212a The mounting boss is provided with a through hole (not shown in the figure). The through hole runs through the mounting boss in the Y-axis direction. The through hole is a circular hole, and the through hole is coaxial with the two mounting holes. For example, an axis of the through hole is parallel to the Y-axis direction. In some other embodiments, the groove bottom wall of the mounting notch 212a may not be convexly provided with a mounting boss.

The sliding groove 213a is located on a side that is of the mounting notch 212a and that faces the negative direction of the Y-axis, and is spaced apart from the mounting notch 212a. An opening of the sliding groove 213a is located on the right side surface of the first fastening bracket 21a. The sliding groove 213a is recessed in a direction from the right side surface to the left side surface of the first fastening bracket 21a, and runs through the left side surface of the first fastening bracket 21a and the bottom surface of the first fastening bracket 21a. For example, a cross section of the sliding groove 213a is in a square shape. In some other embodiments, the cross section of the sliding groove 213a may be a circular hole, a specially-shaped hole, or the like.

In the Y-axis direction, the first mounting groove 214a and the second mounting groove 215a are located on two opposite sides of the sliding groove 213a, and both communicate with the sliding groove 213a. The first mounting groove 214a is located on a side that is of the sliding groove 213a and that faces the positive direction of the Y-axis. An opening of the first mounting groove 214a is located on the bottom surface of the first fastening bracket 21a. The first mounting groove 214a is recessed in a direction from the bottom surface to the top surface of the first fastening bracket 21a, and runs through a groove side wall of the sliding groove 213a. A groove bottom wall of the first mounting groove 214a is convexly provided with a first fastening block 218a The first fastening block 218a extends in the negative direction of the Z-axis from the groove bottom wall of the first mounting groove 214a. For example, the first fastening block 218a is in a square shape.

The second mounting groove 215a is located on a side that is of the sliding groove 213a and that faces the negative direction of the Y-axis. A structure of the second mounting groove 215a is substantially the same as that of the first mounting groove 214a. No repeated description is provided herein. A groove bottom wall of the second mounting groove 215a is convexly provided with a second fastening block 219a. For example, the second fastening block 219a is in a square shape.

The avoidance groove 216a is located on a side that is of the mounting notch 212a and that faces away from the sliding groove 213a, and is spaced apart from the mounting notch 212a. An opening of the avoidance groove 216a is located on the right side surface of the first fastening bracket 21a. The avoidance groove 216a is recessed in a direction from the right side surface to the left side surface of the first fastening bracket 21a, and runs through the bottom surface of the first fastening bracket 21a and the groove bottom wall of the accommodating notch 211a. In addition, a groove bottom wall of the avoidance groove 216a is provided with a sliding hole 2161a, and the sliding hole 2161a extends in the negative direction of the X-axis, and runs through the left side surface of the first fastening bracket 21a. For example, the sliding hole 2161a is a square hole.

In some other embodiments, the avoidance groove 216a may not run through the bottom surface of the first fastening bracket 21a, and/or the avoidance groove 216a may not run through the groove bottom wall of the accommodating notch 211a, and/or the groove bottom wall of the avoidance groove 216a may not be provided with the sliding hole 2161a, or the sliding hole 2161a may not run through the left side surface of the first fastening bracket 21a.

An opening of the guide groove 217a is located on the groove bottom wall of the accommodating notch 211a. The guide groove 217a is recessed in a direction (the negative direction of the Z-axis shown in the figure) from the groove bottom wall of the accommodating notch 211a to the bottom surface of the first fastening bracket 21a, and runs through the left side surface of the first fastening bracket 21a. The guide groove 217a is an arc-shaped groove. That is, a groove bottom wall of the guide groove 217a has an arc-shaped surface. In some other embodiments, the guide groove 217a may not run through the left side surface of the first fastening bracket 21a.

In this embodiment, there are two guide grooves 217a. One guide groove 217a is located on a side that is of the avoidance groove 216a and that faces away from the mounting notch 212a, is spaced apart from the avoidance groove 216a, and runs through the top surface of the first fastening bracket 21a and the front end face of the first fastening bracket 21a. The other guide groove 217a is located on a side that is of the sliding groove 213a and that faces away from the mounting notch 212a, is spaced apart from the sliding groove 213a, and runs through the top surface of the first fastening bracket 21a and the rear end face of the first fastening bracket 21a. In some other embodiments, the guide groove 217a may not run through the top surface of the first fastening bracket 21a, the guide groove 217a may not run through the front end face of the first fastening bracket 21a, and/or the guide groove 217a may not run through the rear end face of the first fastening bracket 21a.

In this embodiment, the first primary swing arm 23a includes a rotating portion 231a, a sliding portion 232a, and a connecting portion 233a. The connecting portion 233a is connected between the rotating portion 231a and the sliding portion 232a. The rotating portion 231a includes two rotating sub-portions 234a, and the two rotating sub-portions 234a are spaced apart from each other in the Y-axis direction. Each rotating sub-portion 234a is provided with a through hole (not shown in the figure), and the through hole runs through the rotating sub-portion 234 in the Y-axis direction.

A structure of the rotating portion 231a is adapted to a structure of the mounting notch 212a. In addition, the first connecting assembly 20a further includes a first pin shaft 271a, and the first pin shaft 271a may penetrate through the through holes in the two rotating sub-portions 234a. Specifically, the first pin shaft 271a may be mounted in the mounting notch 212a. The first pin shaft 271a may penetrate through the through hole in the mounting boss in the mounting notch 212a. Two ends of the first pin shaft 271a are respectively mounted in the mounting holes on the two groove side walls of the mounting notch 212a, and are respectively fixedly connected to hole walls of the two mounting holes. In this embodiment, the first pin shaft 271a is a circular shaft, and an axis of the first pin shaft 271a is parallel to the Y-axis direction. The two rotating sub-portions 234a can rotate with respect to the first pin shaft 271a, to implement rotatable connection between the rotating portion 231a and the first pin shaft 271a, so as to implement rotatable connection between the first primary swing arm 23a and the first fastening bracket 21a.

The connecting portion 233a is in a flat plate shape. A structure of the sliding portion 232a is adapted to a structure of the first sliding groove 101a. In this embodiment, a bottom surface of the sliding portion 232a is an arc-shaped surface. The sliding portion 232a is provided with two first sliding grooves 235a. An opening of one first sliding groove 235a is located on a front end face of the sliding portion 232a, and an opening of the other first sliding groove 235a is located on a rear end face of the sliding portion 232a. Both of the two first sliding grooves 235a are recessed in the Y-axis direction, and run through a top surface of the sliding portion 232a. Each first sliding groove 235a is an arc-shaped groove adapted to the first slider 12a, and an axis of each first sliding groove 235a is parallel to the Y-axis direction.

The two first sliders 12a may be respectively mounted in the two first sliding grooves 235a, and can slide and rotate in the first sliding grooves 235a, so that the sliding portion 232a can be mounted in the first sliding groove 101a, and can slide and rotate in the first sliding groove 101a, to implement slidable and rotatable connection between the sliding portion 232a and the base 10, so as to implement slidable and rotatable connection between the first primary swing arm 23a and the base 10. Each first slider 12a is coaxial with one first sliding groove 235a.

In this embodiment, the first secondary swing arm 25a includes a sliding portion 251a, a rotating portion 252a, and a connecting portion 253a. The connecting portion 253a is connected between the rotating portion 252a and the sliding portion 251a. The sliding portion 251a is in a flat plate shape. A bottom surface of the sliding portion 251a is convexly provided with a third fastening block 254a, and the third fastening block 254a extends in the negative direction of the Z-axis. The third fastening block 254a is disposed in a middle region of the bottom surface of the sliding portion 251a. For example, the third fastening block 254a is in a square shape.

A structure of the sliding portion 251a is adapted to a structure of the sliding groove 213a The sliding portion 251a may be mounted in the sliding groove 213a, and can slide with respect to the first fastening bracket 21a in the sliding groove 213a, to implement slidable connection between the sliding portion 251a and the first fastening bracket 21a, so as to implement slidable connection between the first secondary swing arm 25a and the first fastening bracket 21a.

In this embodiment, the rotating portion 252a is in a cylindrical shape. The rotating portion 252a is provided with a through hole (not shown in the figure) and a first spiral groove 255a The through hole runs through the rotating portion 252a in the Y-axis direction. The first spiral groove 255a is located on a side that is of the rotating portion 252a and that faces away from the connecting portion 253a. The first spiral groove 255a is bent and extends around an axis of the rotating portion 252a.

A structure of the rotating portion 252a is adapted to a structure of the first fitting groove 103a. In addition, the first connecting assembly 20a further includes a first rotating shaft 281a, and the first rotating shaft 281a penetrates through the through hole in the rotating portion 252a Specifically, the first rotating shaft 281a may be mounted in the mounting groove 111a. One end of the first rotating shaft 281a is mounted in the first rotating shaft hole in the first bracket 12, and the other end of the first rotating shaft 281a is mounted in the first rotating shaft hole in the third bracket 14. The rotating portion 252a can rotate with respect to the first rotating shaft 281a, to implement rotatable connection between the rotating portion 252a and the base 10, so as to implement rotatable connection between the first secondary swing arm 25a and the base 10.

In this embodiment, the first rotating shaft 281a is a circular shaft, an axis of the first rotating shaft 281a is parallel to the Y-axis direction, and the first rotating shaft 281a is coaxial with the rotating portion 252a. In this case, a rotation center of the rotating portion 252a of the first secondary swing arm 25a with respect to the base 10 is the axis of the first rotating shaft 281a. That is, a rotation center of the first secondary swing arm 25a with respect to the base 10 is the axis of the first rotating shaft 281a.

The second fastening bracket 22a is provided with an accommodating notch 221a, a mounting notch 222a, a sliding groove 223a, a first mounting groove 224a, a second mounting groove 225a, an avoidance groove 226a, and a guide groove 227a. For structures of the accommodating notch 221a, the mounting notch 222a, the sliding groove 223a, the first mounting groove 224a, the second mounting groove 225a, the avoidance groove 226a, and the guide groove 227a, respectively refer to the related description of the accommodating notch 211a, the mounting notch 212a, the sliding groove 213a, the first mounting groove 214a, the second mounting groove 215a, the avoidance groove 216a, and the guide groove 217a in the first fastening bracket 21a. Details are not described herein.

The accommodating notch 221a further runs through a left side surface of the second fastening bracket 22a. Openings of both the mounting notch 222a and the sliding groove 223a are located on the left side surface of the second fastening bracket 22a. A groove bottom wall of the first mounting groove 224a is convexly provided with a first fastening block 228a, and a groove bottom wall of the second mounting groove 225a is convexly provided with a second fastening block 229a. An opening of the avoidance groove 226a is located on the left side surface of the second fastening bracket 22a, and a groove bottom wall of the avoidance groove 226a is provided with a sliding hole 2261a. The sliding hole 2261a extends in the positive direction of the X-axis, and runs through a right side surface of the second fastening bracket 22a.

The second primary swing arm 24a includes a rotating portion 241a, a sliding portion 242a, and a connecting portion 243a. The connecting portion 243a is connected between the rotating portion 241a and the sliding portion 242a. For a structure of the second primary swing arm 24a, refer to the related description of the first primary swing arm 23a. Details are not described herein.

The rotating portion 241a includes two rotating sub-portions 244a. A structure of the rotating portion 241a is adapted to a structure of the mounting notch 222a. In addition, the first connecting assembly 20a further includes a second pin shaft 272a, and the second pin shaft 272a may penetrate through through holes (not shown in the figure) in the two rotating sub-portions 244a. Specifically, the second pin shaft 272a may be mounted in the mounting notch 222a. The second pin shaft 272a is a circular shaft, and an axis of the second pin shaft 272a is parallel to the Y-axis direction. The two rotating sub-portions 244a can rotate with respect to the second pin shaft 272a, to implement rotatable connection between the rotating portion 241a and the second pin shaft 272a, so as to implement rotatable connection between the second primary swing arm 24a and the second fastening bracket 22a.

A structure of the sliding portion 242a is adapted to a structure of the second sliding groove 102a. The sliding portion 242a is provided with two second sliding grooves 245a, and each second sliding groove 245a is an arc-shaped groove adapted to the second slider 12b. The two second sliders 12b may be respectively mounted in the two second sliding grooves 245a, and can slide and rotate in the second sliding grooves 245a, so that the sliding portion 242a can be mounted in the second sliding groove 102a, and can slide and rotate in the second sliding groove 102a, to implement slidable and rotatable connection between the sliding portion 242a and the base 10, so as to implement slidable and rotatable connection between the second primary swing arm 24a and the base 10. Each second slider 12b is coaxial with one second sliding groove 245a.

The second secondary swing arm 26a includes a sliding portion 261a, a rotating portion 262a, and a connecting portion 263a. The connecting portion 263a is connected between the rotating portion 262a and the sliding portion 261a. For a structure of the second secondary swing arm 26a, refer to the related description of the first secondary swing arm 25a. Details are not described herein.

A bottom surface of the sliding portion 261a is convexly provided with a third fastening block 264a. A structure of the sliding portion 261a is adapted to a structure of the sliding groove 223a. The sliding portion 261a may be mounted in the sliding groove 223a, and can slide with respect to the second fastening bracket 22a in the first sliding groove 223a, to implement slidable connection between the sliding portion 261a and the second fastening bracket 22a, so as to implement slidable connection between the second secondary swing arm 26a and the second fastening bracket 22a.

The rotating portion 262a is provided with a through hole (not shown in the figure) and a second spiral groove 265a. A structure of the rotating portion 262a is adapted to a structure of the second fitting groove 104a. In addition, the first connecting assembly 20a further includes a second rotating shaft 282a, and the second rotating shaft 282a penetrates through the through hole in the rotating portion 262a. Specifically, the second rotating shaft 282a may be mounted in the mounting groove 111a, and is parallel to and spaced apart from the first rotating shaft 281a. One end of the second rotating shaft 282a is mounted in the second rotating shaft hole 127 in the first bracket 12, and the other end of the second rotating shaft 282a is mounted in the second rotating shaft hole in the third bracket 14. The rotating portion 262a can rotate with respect to the second rotating shaft 282a, to implement rotatable connection between the rotating portion 262a and the base 10, so as to implement rotatable connection between the second secondary swing arm 26a and the base 10.

The second rotating shaft 282a is a circular shaft, and an axis of the second rotating shaft 282a is parallel to the Y-axis direction. In this case, a rotation center of the rotating portion 262a of the second secondary swing arm 26a with respect to the base 10 is the axis of the second rotating shaft 282a. That is, a rotation center of the second secondary swing arm 26a with respect to the base 10 is the axis of the second rotating shaft 282a.

In a process of switching the first connecting assembly 20a between the folded state and the unfolded state, when the first fastening bracket 21a rotates with respect to the base 10, the first fastening bracket 21a drives the first primary swing arm 23a to rotate with respect to the first fastening bracket 21a, drives the first primary swing arm 23a to slide and rotate with respect to the base 10, drives the first secondary swing arm 25a to slide with respect to the first fastening bracket 21a, and drives the first secondary swing arm 25a to rotate with respect to the base 10. Similarly, when the second fastening bracket 22a rotates with respect to the base 10, the second fastening bracket 22a drives the second primary swing arm 24a to rotate with respect to the second fastening bracket 22a, drives the second primary swing arm 24a to slide and rotate with respect to the base 10, drives the second secondary swing arm 26a to slide with respect to the second fastening bracket 22a, and drives the second secondary swing arm 26a to rotate with respect to the base 10.

The first damping member 31a includes a first fastening portion 311a, a second fastening portion 312a, a third fastening portion 313a, a first connecting portion 314a, and a second connecting portion 315a. The third fastening portion 313a is located between the first fastening portion 311a and the second fastening portion 312a, and is spaced apart from the first fastening portion 311a and the second fastening portion 312a. The first connecting portion 314a is fixedly connected between the first fastening portion 311a and the third fastening portion 313a. The second connecting portion 315a is fixedly connected between the second fastening portion 312a and the third fastening portion 313a. The first damping member 31a is an integrally formed structural member.

The first fastening portion 311a is provided with a first fastening hole 316a, and the first fastening hole 316a runs through the first fastening portion 311a in a thickness direction of the first fastening portion 311a. The second fastening portion 312a is provided with a second fastening hole 317a, and the second fastening hole 317a runs through the second fastening portion 312a in a thickness direction of the second fastening portion 312a. The third fastening portion 313a is provided with a third fastening hole 318a, and the third fastening hole 318a runs through the third fastening portion 313a in a thickness direction of the third fastening portion 313a.

Specifically, the first fastening portion 311a is mounted in the first mounting groove 214a, and the second fastening portion 312a is mounted in the second mounting groove 215a, to implement assembling between the first damping member 31a and the first fastening bracket 21a. The third fastening portion 313a is fixedly connected to the sliding portion 251a of the first secondary swing arm 25a, to implement fixed connection between the first damping member 31a and the first secondary swing arm 25a. The first fastening block 218a is mounted in the first fastening hole 316a, the second fastening block 219a is mounted in the second fastening hole 317a, and the third fastening block 254a is mounted in the third fastening hole 318a.

When the first secondary swing arm 25a slides with respect to the first fastening bracket 21a, the sliding portion 251a drives the third fastening portion 313a to move with respect to the first fastening portion 311a and the second fastening portion 312a, and the first connecting portion 314a and the second connecting portion 315a are deformed to generate damping force. During folding or unfolding of the foldable terminal 1000, the user can feel the damping force generated by the deformation of the first connecting portion 314a and the second connecting portion 315a, and the user can experience a relatively good hand feeling, thereby improving user experience.

The second damping member 32a includes a first fastening portion 321a, a second fastening portion 322a, a third fastening portion 323a, a first connecting portion 324a, and a second connecting portion 325a. For the first fastening portion 321a, the second fastening portion 322a, the third fastening portion 323a, the first connecting portion 324a, and the second connecting portion 325a, respectively refer to the related description of the first fastening portion 311a, the second fastening portion 312a, the third fastening portion 313a, the first connecting portion 314a, and the second connecting portion 315a in the first damping member 31a. Details are not described herein.

Specifically, the first fastening portion 321a is mounted in the first mounting groove 224a, and the second fastening portion 322a is mounted in the second mounting groove 225a, to implement assembling between the second damping member 32a and the second fastening bracket 22a. The third fastening portion 323a is fixedly connected to the sliding portion 261a of the second secondary swing arm 26a, to implement fixed connection between the second damping member 32a and the second secondary swing arm 26a. The first fastening block 228a is mounted in a first fastening hole 326a, the second fastening block 229a is mounted in a second fastening hole 327a, and the third fastening block 264a is mounted in a third fastening hole 328a.

When the second secondary swing arm 26a slides with respect to the second fastening bracket 22a, the sliding portion 251a drives the third fastening portion 323a to move with respect to the first fastening portion 321a and the second fastening portion 322a, and the first connecting portion 324a and the second connecting portion 325a are deformed to generate damping force. During folding or unfolding of the foldable terminal 1000, the user can feel the damping force generated by the deformation of the first connecting portion 324a and the second connecting portion 325a, and the user can experience a relatively good hand feeling, thereby improving user experience.

When the first connecting assembly 20a is switched between the folded state and the unfolded state, all of the first fastening bracket 21a, the second fastening bracket 22a, the first secondary swing arm 25a, and the second secondary swing arm 26a rotate with respect to the base 10, and therefore the first damping member 31a and the second damping member 32a are driven to rotate with respect to the base 10, so that the first damping member 30a is switched between the folded state and the unfolded state.

In the foldable mechanism 130 shown in this embodiment, the first damping assembly 30a mounted on the first connecting assembly 20a is used to provide damping force in a folding process and an unfolding process. Compared with a common damping mechanism in which a spring and a cam are used to provide damping, the first damping assembly 30a shown in this embodiment includes fewer parts, and is easy to assemble. Therefore, costs of the foldable mechanism 130 can be reduced, and a structure of the foldable mechanism 130 can be simplified. In addition, the first damping assembly 30a can be directly mounted on the first connecting assembly 20a, and does not need to be mounted on the base 10. Therefore, the first damping assembly 30a does not need to occupy space of the base 10, and a lightweight design of the foldable mechanism 130 is facilitated.

In some other embodiments, the first damping assembly 30a may use a spring and a cam to provide the damping force in the folding process and the unfolding process of the foldable mechanism 130. This is not specifically limited in this application.

The first synchronization part 60 includes a fastening post 61a and a synchronization slider 62a. The synchronization slider 62a is sleeved on the fastening post 61a, and can slide with respect to the fastening post 61a. The synchronization slider 62a is provided with a first cam 63a and a second cam 64a, and the first cam 63a and the second cam 64a are respectively located on two opposite sides of the synchronization slider 62a. A structure of the first cam 63a is adapted to a structure of the first spiral groove 255a, and a structure of the second cam 64a is adapted to a structure of the second spiral groove 265a.

The first synchronization part 60a is mounted in the mounting groove 111a. Specifically, one end of the fastening post 61a is mounted in the mounting hole 128 in the mounting bump 12e, and the other end of the fastening post 61a is mounted in the mounting hole in the mounting bump 14e. The first cam 63a is mounted in the first spiral groove 255a, and can slide with respect to the rotating portion 252a in the first spiral groove 255a. The second cam 64a is mounted in the second spiral groove 265a, and can slide with respect to the rotating portion 262a in the second spiral groove 265a.

When the first secondary swing arm 25*a* rotates with respect to the base 10, the rotating portion 252*a* drives the first cam 63*a* to slide in the first spiral groove 255*a*, to drive the synchronization slider 62*a* to slide with respect to the fastening post 61*a*, and drive the second cam 64*a* to slide with respect to the rotating portion 262*a* in the second spiral groove 265*a*, so as to drive the second secondary swing arm 26*a* to rotate with respect to the base 10, thereby implementing synchronous rotation between the first secondary swing arm 25*a* and the second secondary swing arm 26*a*. Similarly, when the second secondary swing arm 26*a* rotates with respect to the base 10, the first synchronization part 60*a* can drive the first secondary swing arm 25*a* to rotate with respect to the base 10, thereby implementing synchronous rotation between the first secondary swing arm 25*a* and the second secondary swing arm 26*a*.

In the foldable mechanism 130 shown in this embodiment, synchronous transmission is implemented through cooperation between the spiral groove and the cam. In comparison with a common manner in which synchronous transmission is implemented by using a gear, a quantity of parts in the foldable mechanism 130 is reduced, an assembly error between parts is avoided, and costs of the foldable mechanism 130 are reduced. In addition, the first synchronization part 60*a* has a relatively small thickness size (namely, a size in the Z-axis direction). This helps reduce a thickness size of the foldable mechanism 130 and implement a lightweight design of the foldable mechanism 130.

In some other embodiments, synchronous transmission may be implemented by using a synchronization assembly including a gear. This is not specifically limited in this application.

Figure 13:
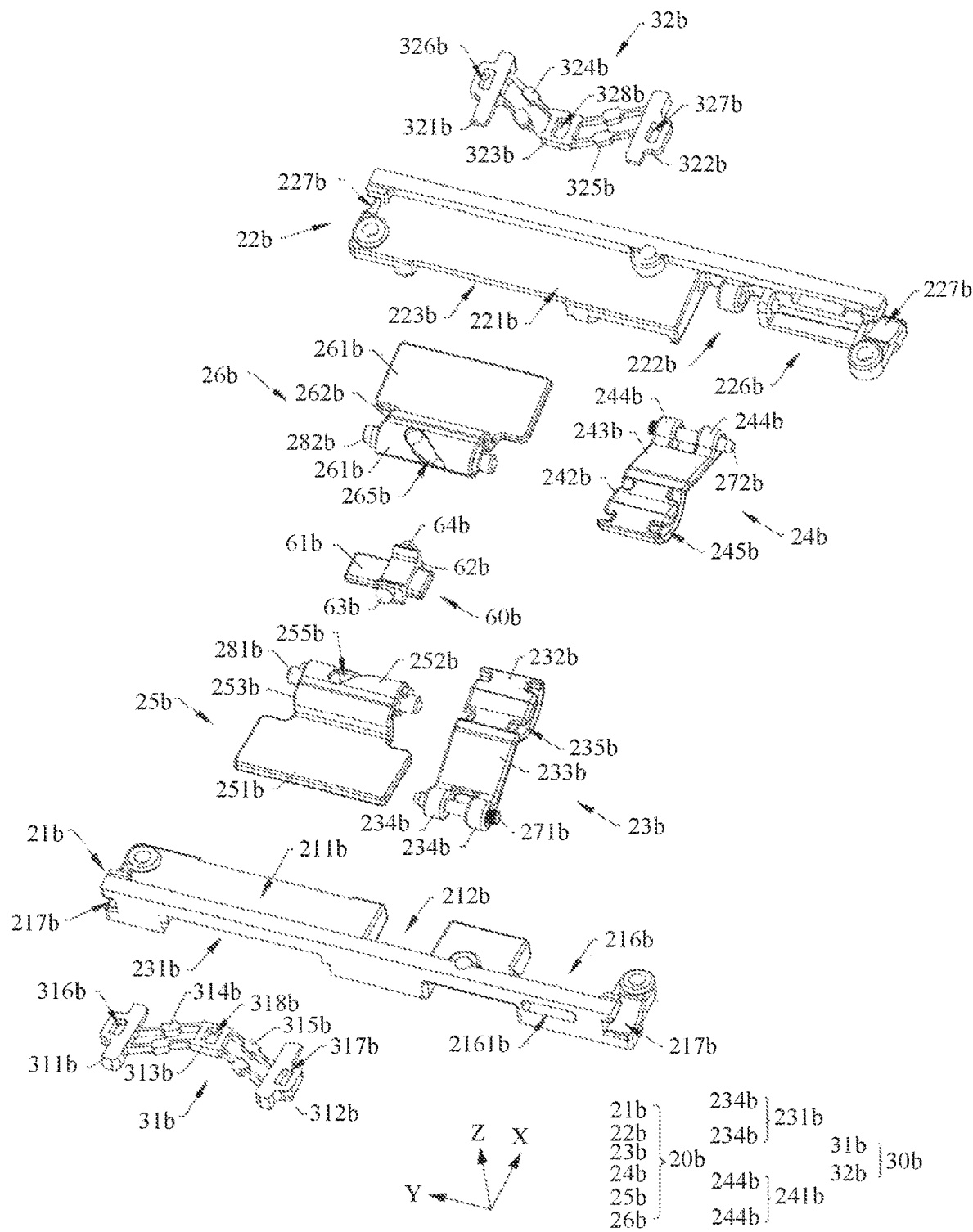
FIG. 13 is a schematic diagram of structures of a second connecting assembly, a second damping assembly, and a second synchronization part in the foldable mechanism shown in FIG. 6.
Figure 14:
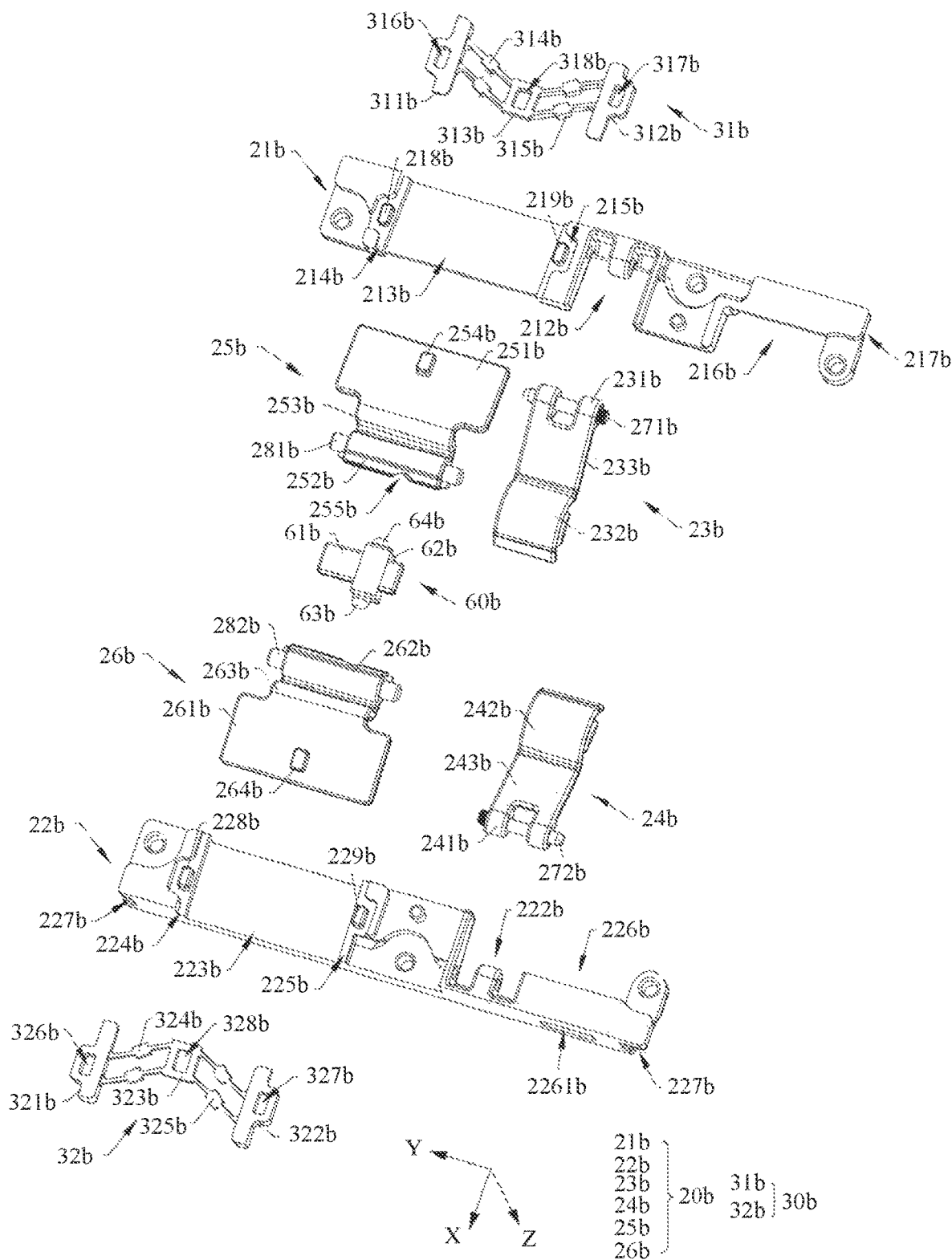
FIG. 14 is a schematic diagram of structures of the second connecting assembly, the second damping assembly, and the second synchronization part shown in FIG. 13 from another perspective.

Refer to FIG. 9, FIG. 13, and FIG. 14. FIG. 13 is a schematic diagram of structures of the second connecting assembly 20*b*, the second damping assembly 30*b*, and the second synchronization part 60*b* in the foldable mechanism 130 shown in FIG. 6. FIG. 14 is a schematic diagram of structures of the second connecting assembly 20*b*, the second damping assembly 30*b*, and the second synchronization part 60*b* shown in FIG. 13 from another perspective.

The first fastening bracket 21*b* is provided with an accommodating notch 211*b*, a mounting notch 212*b*, a sliding groove 213*b*, a first mounting groove 214*b*, a second mounting groove 215*b*, an avoidance groove 216*b*, and a guide groove 217*b*. For structures of the accommodating notch 211*b*, the mounting notch 212*b*, the sliding groove 213*b*, the first mounting groove 214*b*, the second mounting groove 215*b*, the avoidance groove 216*b*, and the guide groove 217*b*, respectively refer to the related description of the accommodating notch 211*a*, the mounting notch 212*a*, the sliding groove 213*a*, the first mounting groove 214*a*, the second mounting groove 215*a*, the avoidance groove 216*a*, and the guide groove 217*a* (shown in FIG. 11 and FIG. 12) in the first fastening bracket 21*a*. Details are not described herein.

The sliding groove 213*b* is located on a side that is of the mounting notch 212*b* and that faces the positive direction of the Y-axis. A groove bottom wall of the first mounting groove 214*b* is convexly provided with a first fastening block 218*b*, and a groove bottom wall of the second mounting groove 215*b* is convexly provided with a second fastening block 219*b*. The avoidance groove 216*b* is located on a side that is of the mounting notch 212*b* and that faces the negative direction of the Y-axis. A groove bottom wall of the avoidance groove 216*b* is provided with a sliding hole 2161*b*.

The first primary swing arm 23*b* includes a rotating portion 231*b*, a sliding portion 232*b*, and a connecting portion 233*b*. The connecting portion 233*b* is connected between the rotating portion 231*b* and the sliding portion 232*b*. For a structure of the first primary swing arm 23*b*, refer to the related description of the first primary swing arm 23*a* (shown in FIG. 11 and FIG. 12). Details are not described herein.

The rotating portion 231*b* includes two rotating sub-portions 234*b*. A structure of the rotating portion 231*b* is adapted to a structure of the mounting notch 212*b*. In addition, the second connecting assembly 20*b* further includes a first pin shaft 271*b*, and the first pin shaft 271*b* may penetrate through through holes (not shown in the figure) in the two rotating sub-portions 234*b*. Specifically, the first pin shaft 271*b* may be mounted in the mounting notch 212*b*. The first pin shaft 271*b* is a circular shaft, an axis of the first pin shaft 271*b* is parallel to the Y-axis direction, and the first pin shaft 271*b* is coaxial with the first pin shaft 271*a* (shown in FIG. 11 and FIG. 12). The two rotating sub-portions 234*b* can rotate with respect to the first pin shaft 271*b*, to implement rotatable connection between the rotating portion 231*b* and the first pin shaft 271*b*, so as to implement rotatable connection between the first primary swing arm 23*b* and the first fastening bracket 21*b*.

A structure of the sliding portion 232*b* is adapted to a structure of the first sliding groove 101*b*. The sliding portion 232*b* is provided with two first sliding grooves 235*b*, and each first sliding groove 235*b* is an arc-shaped groove adapted to the first slider 13*a*. The two first sliders 13*a* may be respectively mounted in the two first sliding grooves 235*b*, and can slide and rotate in the first sliding grooves 235*b*, so that the sliding portion 232*b* can be mounted in the first sliding groove 101*b*, and can slide and rotate in the first sliding groove 101*b*, to implement slidable and rotatable connection between the sliding portion 232*b* and the base 10, so as to implement slidable and rotatable connection between the first primary swing arm 23*b* and the base 10. Each first slider 13*a* is coaxial with one first sliding groove 235*b*.

The first secondary swing arm 25*b* includes a sliding portion 251*b*, a rotating portion 252*b*, and a connecting portion 253*b*. The connecting portion 253*b* is connected between the rotating portion 252*b* and the sliding portion 251*b*. For a structure of the first secondary swing arm 25*b*, refer to the related description of the first secondary swing arm 25*b* (shown in FIG. 11 and FIG. 12). Details are not described herein.

A bottom surface of the sliding portion 251*b* is convexly provided with a third fastening block 254*b*. A structure of the sliding portion 251*b* is adapted to a structure of the sliding groove 213*b*. The sliding portion 251*b* may be mounted in the sliding groove 213*b*, and can slide with respect to the first fastening bracket 21*b* in the first sliding groove 213*b*, to implement slidable connection between the sliding portion 251*b* and the first fastening bracket 21*b*, so as to implement slidable connection between the first secondary swing arm 25*b* and the first fastening bracket 21*b*.

The rotating portion 252*b* is provided with a through hole (not shown in the figure) and a first spiral groove 255*b*. A structure of the rotating portion 252*b* is adapted to a structure of the first rotating groove 104*b*. In addition, the second connecting assembly 20*b* further includes a first rotating shaft 281*b*, and the first rotating shaft 281*b* may penetrate through the through hole in the rotating portion 252*b*. Specifically, the first rotating shaft 281*b* may be mounted in the mounting groove 111*b*. One end of the first rotating shaft 281*b* is mounted in the first rotating shaft hole in the third bracket 14, and the other end of the first rotating shaft 281*b* is mounted in the first rotating shaft hole in the second bracket 13. The rotating portion 252*b* can rotate with respect to the first rotating shaft 281*b*, to implement rotatable connection between the rotating portion 252*b* and the base 10, so as to implement rotatable connection between the first secondary swing arm 25*b* and the base 10.

The first rotating shaft 281*b* is a circular shaft, an axis of the first rotating shaft 281*b* is parallel to the Y-axis direction, and the first rotating shaft 281*b* is coaxial with the first rotating shaft 281*a* (shown in FIG. 11 and FIG. 12). In this case, a rotation center of the rotating portion 252*b* of the first secondary swing arm 25*b* with respect to the base 10 is the axis of the first rotating shaft 281*b*. That is, a rotation center of the first secondary swing arm 25*b* with respect to the base 10 is the axis of the first rotating shaft 281*b*.

The second fastening bracket 22*b* is provided with an accommodating notch 221*b*, a mounting notch 222*b*, a sliding groove 223*b*, a first mounting groove 224*b*, a second mounting groove 225*b*, an avoidance groove 226*b*, and a guide groove 227*b*. For structures of the accommodating notch 221*b*, the mounting notch 222*b*, the sliding groove 223*b*, the first mounting groove 224*b*, the second mounting groove 225*b*, the avoidance groove 226*b*, and the guide groove 227*b*, respectively refer to the related description of the accommodating notch 211*b*, the mounting notch 212*b*, the sliding groove 213*b*, the first mounting groove 214*b*, the second mounting groove 215*b*, the avoidance groove 216*b*, and the guide groove 217*b* in the first fastening bracket 21*b*. Details are not described herein.

The accommodating notch 221*b* further runs through a left side surface of the second fastening bracket 22*b*. Openings of both the mounting notch 222*b* and the sliding groove 223*b* are located on the left side surface of the second fastening bracket 22*b*. A groove bottom wall of the first mounting groove 224*b* is convexly provided with a first fastening block 228*b*, and a groove bottom wall of the second mounting groove 225*b* is convexly provided with a second fastening block 229*b*. An opening of the avoidance groove 226*b* is located on the left side surface of the second fastening bracket 22, and a groove bottom wall of the avoidance groove 226*b* is provided with a sliding hole 2261*b*. The sliding hole 2261*b* extends in the positive direction of the X-axis, and runs through a right side surface of the second fastening bracket 22*b*.

The second primary swing arm 24*b* includes a rotating portion 241*b*, a sliding portion 242*b*, and a connecting portion 243*b*. The connecting portion 243*b* is connected between the rotating portion 241*b* and the sliding portion 242*b*. For a structure of the second primary swing arm 24*b*, refer to the related description of the first primary swing arm 23*b*. Details are not described herein.

The rotating portion 241*b* includes two rotating sub-portions 244*b*. A structure of the rotating portion 241*b* is adapted to a structure of the mounting notch 222*b*. In addition, the second connecting assembly 20*b* further includes a second pin shaft 272*b*, and the second pin shaft 272*b* may penetrate through through holes (not shown in the figure) in the two rotating sub-portions 244*b*. Specifically, the second pin shaft 272*b* may be mounted in the mounting notch 222*b*. The second pin shaft 272*b* is a circular shaft, an axis of the second pin shaft 272*b* is parallel to the Y-axis direction, and the second pin shaft 272*b* is coaxial with the second pin shaft 272*a* (shown in FIG. 11 and FIG. 12). The two rotating sub-portions 244*b* can rotate with respect to the second pin shaft 272*b*, to implement rotatable connection between the rotating portion 241*b* and the second pin shaft 272*b*, so as to implement rotatable connection between the second primary swing arm 24*b* and the second fastening bracket 22*b*.

A structure of the sliding portion 242*b* is adapted to a structure of the second sliding groove 102*b*. The sliding portion 242*b* is provided with two second sliding grooves 245*b*, and each second sliding groove 245*b* is an arc-shaped groove adapted to the second slider 13*b*. The two second sliders 13*b* may be respectively mounted in the two second sliding grooves 245*b*, and can slide and rotate in the second sliding grooves 245*b*, so that the sliding portion 242*b* can be mounted in the second sliding groove 102*b*, and can slide and rotate in the second sliding groove 102*b*, to implement slidable and rotatable connection between the sliding portion 242*b* and the base 10, so as to implement slidable and rotatable connection between the second primary swing arm 24*b* and the base 10. Each second slider 13*b* is coaxial with one second sliding groove 245*b*.

The second secondary swing arm 26*b* includes a sliding portion 261*b*, a rotating portion 262*b*, and a connecting portion 263*b*. The connecting portion 263*b* is connected between the rotating portion 262*b* and the sliding portion 261*b*. For a structure of the second secondary swing arm 26*b*, refer to the related description of the first secondary swing arm 25*b*. Details are not described herein.

A bottom surface of the sliding portion 261*b* is convexly provided with a third fastening block 264*b*. A structure of the sliding portion 261*b* is adapted to a structure of the sliding groove 223*b*. The sliding portion 261*b* may be mounted in the sliding groove 223*b*, and can slide with respect to the second fastening bracket 22*b* in the first sliding groove 223*b*, to implement slidable connection between the sliding portion 261*b* and the second fastening bracket 22*b*, so as to implement slidable connection between the second secondary swing arm 26*b* and the second fastening bracket 22*b*.

The rotating portion 262*b* is provided with a through hole (not shown in the figure) and a second spiral groove 265*b*. A structure of the rotating portion 262*b* is adapted to a structure of the second fitting groove 104*b*. In addition, the second connecting assembly 20*b* further includes a second rotating shaft 282*b*, and the second rotating shaft 282*b* penetrates through the through hole in the rotating portion 262*b*. Specifically, the second rotating shaft 282*b* may be mounted in the mounting groove 111*b*, and is parallel to and spaced apart from the first rotating shaft 281*a*. One end of the second rotating shaft 282*b* is mounted in the second rotating shaft hole 147 in the third bracket 14, and the other end of the second rotating shaft 282*b* is mounted in the second rotating shaft hole in the second bracket 13. The rotating portion 262*b* can rotate with respect to the second rotating shaft 282*b*, to implement rotatable connection between the rotating portion 262*b* and the base 10, so as to implement rotatable connection between the second secondary swing arm 26*b* and the base 10.

The second rotating shaft 282*b* is a circular shaft, an axis of the second rotating shaft 282*b* is parallel to the Y-axis direction, and the second rotating shaft 282*b* is coaxial with the second rotating shaft 282*a* (shown in FIG. 11 and FIG. 12). In this case, a rotation center of the rotating portion 262*b* of the second secondary swing arm 26*b* with respect to the base 10 is the axis of the second rotating shaft 282*b*. That is, a rotation center of the second secondary swing arm 26*b* with respect to the base 10 is the axis of the second rotating shaft 282*b*.

When the first fastening bracket 21*b* and the second fastening bracket 22*b* rotate with respect to the base 10, the first fastening bracket 21b drives the first primary swing arm 23b to rotate with respect to the first fastening bracket 21b, drives the first primary swing arm 23b to slide and rotate with respect to the base 10, drives the first secondary swing arm 25a to slide with respect to the first fastening bracket 21b, and drives the first secondary swing arm 25a to rotate with respect to the base 10, and the second fastening bracket 22b drives the second primary swing arm 24b to rotate with respect to the second fastening bracket 22b, drives the second primary swing arm 24b to slide and rotate with respect to the base 10, drives the second secondary swing arm 26a to slide with respect to the second fastening bracket 22b, and drives the second secondary swing arm 26a to rotate with respect to the base 10, to implement switching of the second connecting assembly 20b between the folded state and the unfolded state.

In this embodiment, the second damping assembly 30b has a same structure as the first damping assembly 30a (shown in FIG. 11 and FIG. 12). The first damping member 31b includes a first fastening portion 311b, a second fastening portion 312b, a third fastening portion 313b, a first connecting portion 314b, and a second connecting portion 315b. For the first fastening portion 311b, the second fastening portion 312b, the third fastening portion 313b, the first connecting portion 314b, and the second connecting portion 315b, respectively refer to the related description of the first fastening portion 311a, the second fastening portion 312a, the third fastening portion 313a, the first connecting portion 314a, and the second connecting portion 315a (shown in FIG. 11 and FIG. 12) in the first damping member 31a. Details are not described herein.

Specifically, the first fastening portion 311b is mounted in the first mounting groove 214b, and the second fastening portion 312b is mounted in the second mounting groove 215b, to implement assembling between the first damping member 31b and the first fastening bracket 21b. The third fastening portion 313b is fixedly connected to the sliding portion 251b of the first secondary swing arm 25b, to implement fixed connection between the first damping member 31b and the first secondary swing arm 25b. The first fastening block 218b is mounted in a first fastening hole 316b, the second fastening block 219b is mounted in a second fastening hole 317b, and the third fastening block 254b is mounted in a third fastening hole 318b.

The second damping member 32b includes a first fastening portion 321b, a second fastening portion 322b, a third fastening portion 323b, a first connecting portion 324b, and a second connecting portion 325b. For the first fastening portion 321b, the second fastening portion 322b, the third fastening portion 323b, the first connecting portion 324b, and the second connecting portion 325b, respectively refer to the related description of the first fastening portion 311b, the second fastening portion 312b, the third fastening portion 313b, the first connecting portion 314b, and the second connecting portion 315b (shown in FIG. 11 and FIG. 12) in the first damping member 31b. Details are not described herein.

The first fastening portion 321b is mounted in the first mounting groove 224b, and the second fastening portion 322b is mounted in the second mounting groove 225b, to implement assembling between the second damping member 32b and the second fastening bracket 22b. The third fastening portion 323b is fixedly connected to the sliding portion 261b of the second secondary swing arm 26b, to implement fixed connection between the second damping member 32b and the second secondary swing arm 26b. The first fastening block 228b is mounted in a first fastening hole 326b, the second fastening block 229b is mounted in a second fastening hole 327b, and the third fastening block 264b is mounted in a third fastening hole 328b.

In this embodiment, the second synchronization part 60b has a same structure as the first synchronization part 60a. The second synchronization part 60b includes a fastening post 61b and a synchronization slider 62b. Specifically, the second synchronization part 60b is mounted in the mounting groove 111b. Specifically, one end of the fastening post 61b is mounted in the mounting hole 148 in the mounting bump 14e, and the other end of the fastening post 61b is mounted in the mounting hole in the mounting bump 13e. A first cam 63b is mounted in the first spiral groove 255b, and can slide with respect to the rotating portion 252b in the first spiral groove 255b. A second cam 64b is mounted in the second spiral groove 265b, and can slide with respect to the rotating portion 262b in the second spiral groove 265b. For a structure of each component in the second synchronization part 60b and a connection relationship between each component and the second connecting assembly 20b, refer to the related description of the first synchronization part 60a.

Figure 15:
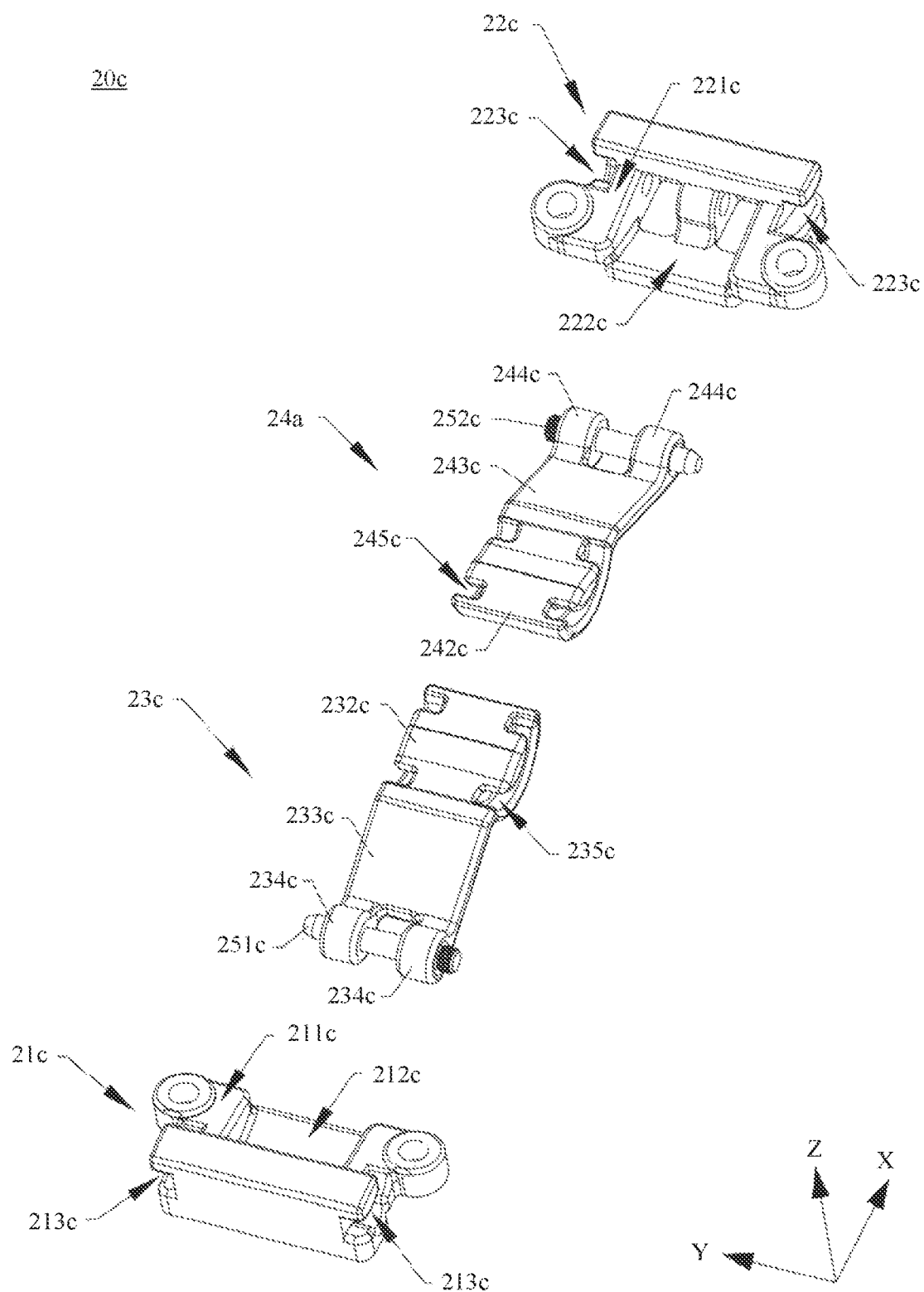
FIG. 15 is a schematic diagram of a structure of a third connecting assembly in the foldable mechanism shown in FIG. 6.
Figure 16:
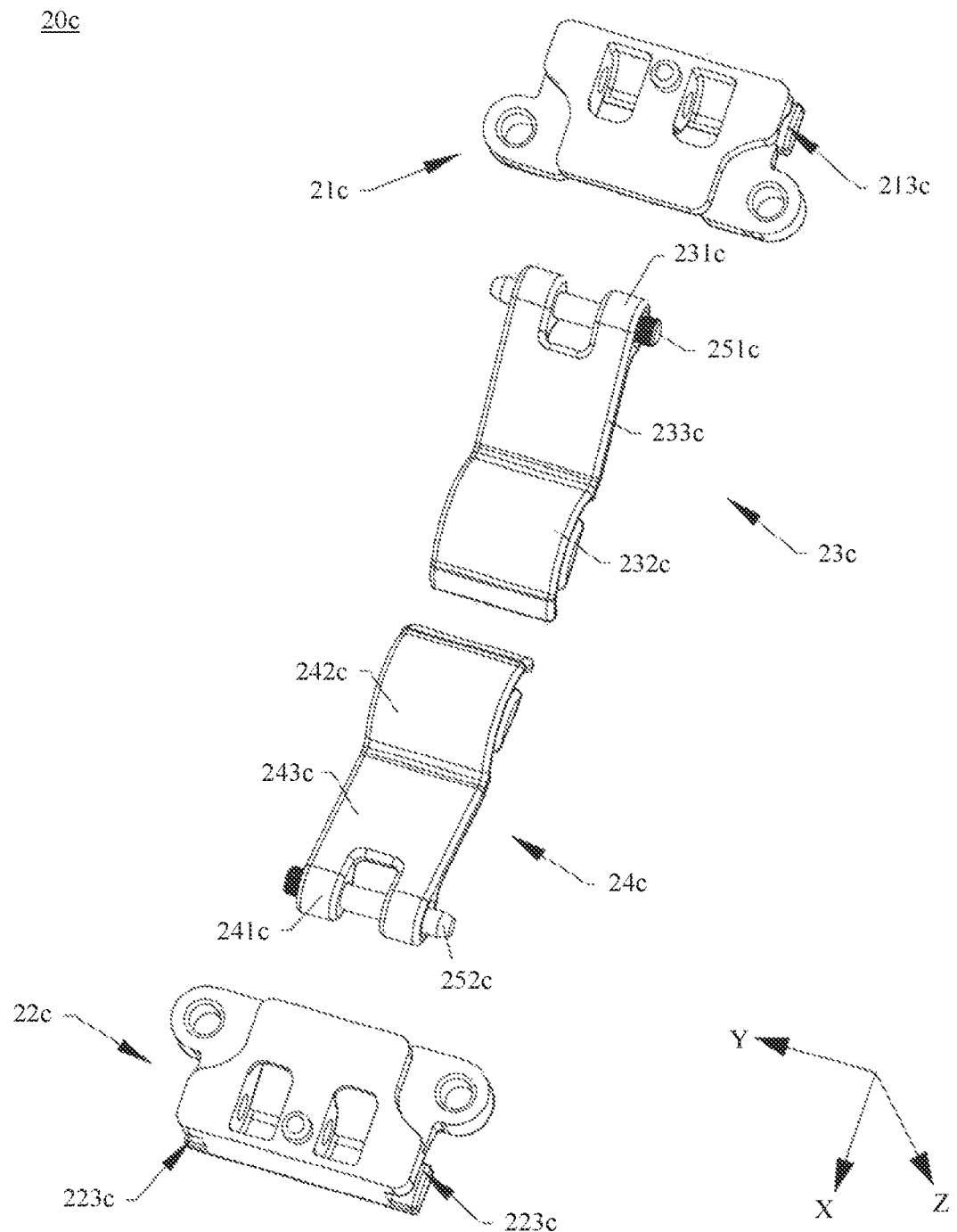
FIG. 16 is a schematic diagram of a structure of the third connecting assembly shown in FIG. 15 from another perspective.

Refer to FIG. 10, FIG. 15, and FIG. 16. FIG. 15 is a schematic diagram of a structure of the third connecting assembly 20c in the foldable mechanism 130 shown in FIG. 6. FIG. 16 is a schematic diagram of a structure of the third connecting assembly 20c shown in FIG. 15 from another perspective.

The first fastening bracket 21c is provided with an accommodating notch 211c, a mounting notch 212c, and a guide groove 213c. In this embodiment, for structures of the accommodating notch 211c, the mounting notch 212c, and the guide groove 213c, refer to the related description of the accommodating notch 211aa, the mounting notch 212a, and the guide groove 217a (shown in FIG. 11 and FIG. 12) in the first fastening bracket 21a. Details are not described herein. The mounting notch 212c is located in a middle portion of the first fastening bracket 21c.

The first primary swing arm 23c includes a rotating portion 231c, a sliding portion 232c, and a connecting portion 233c. The connecting portion 233c is connected between the rotating portion 231c and the sliding portion 232c. For a structure of the first primary swing arm 23c, refer to the related description of the first primary swing arm 23a (shown in FIG. 11 and FIG. 12). Details are not described herein.

The rotating portion 231c includes two rotating sub-portions 234c. A structure of the rotating portion 231c is adapted to a structure of the mounting notch 212c. In addition, the third connecting assembly 20c further includes a first pin shaft 251c, and the first pin shaft 251c may penetrate through through holes (not shown in the figure) in the two rotating sub-portions 234c. Specifically, the first pin shaft 251c may be mounted in the mounting notch 212c. The first pin shaft 251c is a circular shaft, an axis of the first pin shaft 251c is parallel to the Y-axis direction, and the first pin shaft 251c is coaxial with the first pin shaft 271a (shown in FIG. 11 and FIG. 12). The two rotating sub-portions 234c can rotate with respect to the first pin shaft 251c, to implement rotatable connection between the rotating portion 231c and the first pin shaft 251c, so as to implement rotatable connection between the first primary swing arm 23c and the first fastening bracket 21c.

A structure of the sliding portion 232c is adapted to a structure of the first sliding groove 101c. The sliding portion 232c is provided with two first sliding grooves 235c, and each first sliding groove 235c is an arc-shaped groove adapted to the first slider 14a. The two first sliders 14a may be respectively mounted in the two first sliding grooves 235c, and can slide and rotate in the first sliding grooves 235c, so that the sliding portion 232c can be mounted in the first sliding groove 101c, and can slide and rotate in the first sliding groove 101c, to implement slidable and rotatable connection between the sliding portion 232c and the base 10, so as to implement slidable and rotatable connection between the first primary swing arm 23c and the base 10. Each first slider 14a is coaxial with one first sliding groove 235c.

The second fastening bracket 22c is provided with an accommodating notch 221c, a mounting notch 222c, and a guide groove 223c. In this embodiment, for structures of the accommodating notch 221c, the mounting notch 222c, and the guide groove 223c, refer to the related description of the accommodating notch 211c, the mounting notch 212c, and the guide groove 213c in the first fastening bracket 21c. Details are not described herein. The accommodating notch 221c further runs through a left side surface of the second fastening bracket 22c. An opening of the mounting notch 222b is located on the left side surface of the second fastening bracket 22c.

The second primary swing arm 24c includes a rotating portion 241c, a sliding portion 242c, and a connecting portion 243c. The connecting portion 243c is connected between the rotating portion 241c and the sliding portion 242c. For a structure of the second primary swing arm 24c, refer to the related description of the first primary swing arm 23c. Details are not described herein.

The rotating portion 241c includes two rotating sub-portions 244c. A structure of the rotating portion 241c is adapted to a structure of the mounting notch 222c. In addition, the third connecting assembly 20c further includes a second pin shaft 252c, and the second pin shaft 252c may penetrate through through holes (not shown in the figure) in the two rotating sub-portions 244c. Specifically, the second pin shaft 252c may be mounted in the mounting notch 222c. The second pin shaft 252c is a circular shaft, an axis of the second pin shaft 252c is parallel to the Y-axis direction, and the second pin shaft 252c is coaxial with the second pin shaft 272a (shown in FIG. 11 and FIG. 12). The two rotating sub-portions 244c can rotate with respect to the second pin shaft 252c, to implement rotatable connection between the rotating portion 241c and the second pin shaft 252c, so as to implement rotatable connection between the second primary swing arm 24c and the second fastening bracket 22c.

A structure of the sliding portion 242c is adapted to a structure of the second sliding groove 102c. The sliding portion 242c is provided with two second sliding grooves 245c, and each second sliding groove 245c is an arc-shaped groove adapted to the second slider 14b. The two second sliders 14b may be respectively mounted in the two second sliding grooves 245c, and can slide and rotate in the second sliding grooves 245c, so that the sliding portion 242c can be mounted in the second sliding groove 102c, and can slide and rotate in the second sliding groove 102c, to implement slidable and rotatable connection between the sliding portion 242c and the base 10, so as to implement slidable and rotatable connection between the second primary swing arm 24c and the base 10. Each second slider 14b is coaxial with one second sliding groove 245c.

When the first fastening bracket 21c and the second fastening bracket 22c rotate with respect to the base 10, the first fastening bracket 21c drives the first primary swing arm 23c to rotate with respect to the first fastening bracket 21c, and drives the first primary swing arm 23c to slide and rotate with respect to the base 10, and the second fastening bracket 22c drives the second primary swing arm 24c to rotate with respect to the second fastening bracket 22c, and drives the second primary swing arm 24c to slide and rotate with respect to the base 10, to implement switching of the third connecting assembly 20c between the folded state and the unfolded state.

Figure 17:
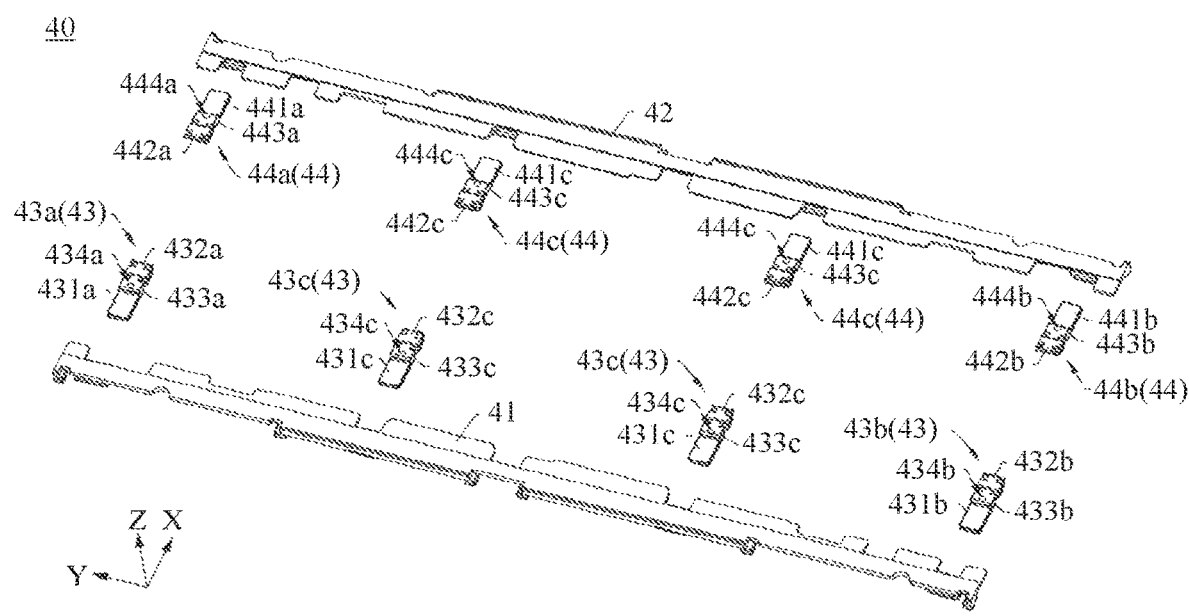
FIG. 17 is a schematic diagram of a structure of a pressing plate assembly in the foldable mechanism shown in FIG. 6.
Figure 18:
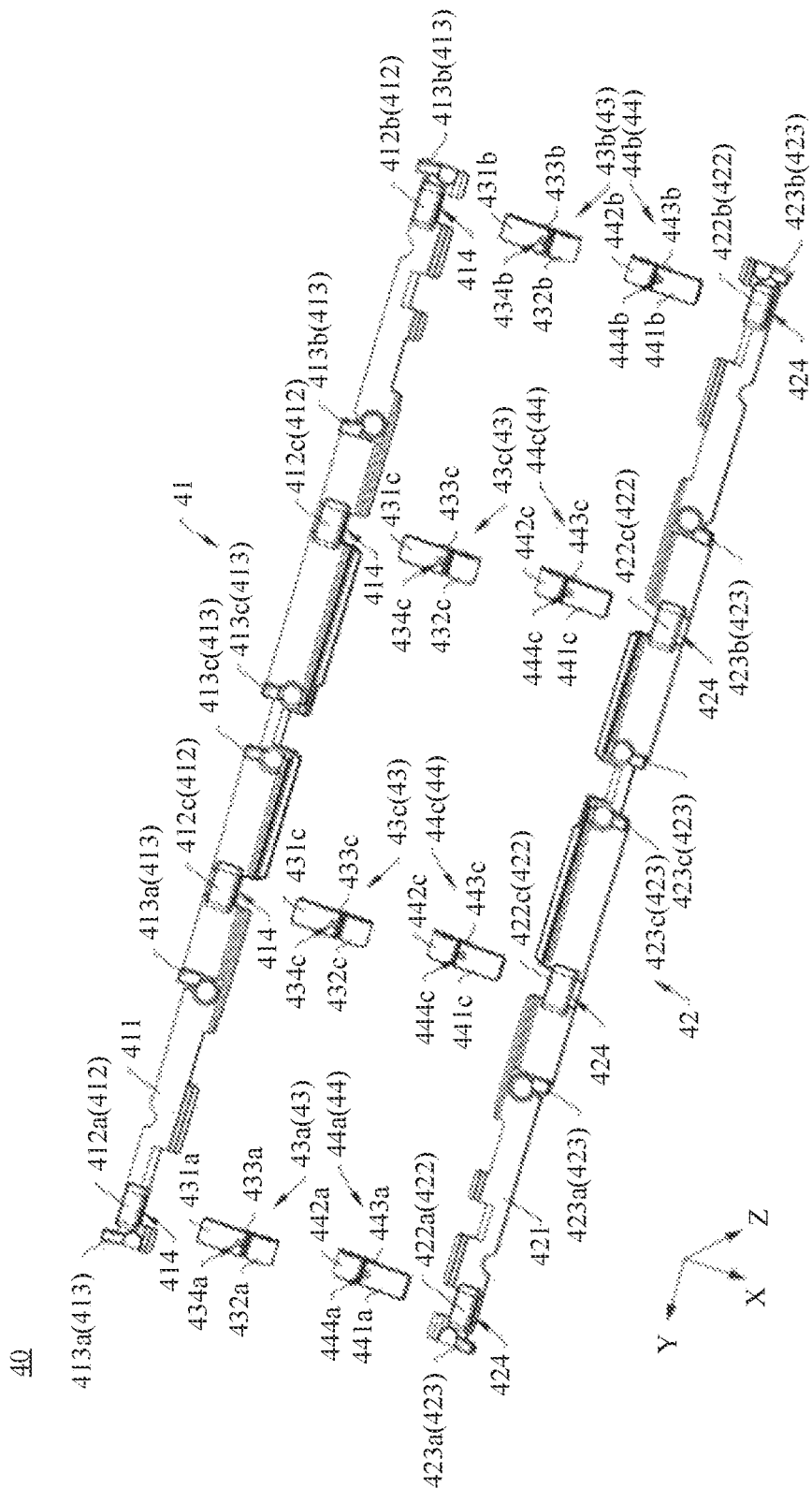
FIG. 18 is a schematic diagram of a structure of the pressing plate assembly shown in FIG. 17 from another perspective.

Refer to FIG. 17 and FIG. 18. FIG. 17 is a schematic diagram of a structure of the pressing plate assembly 40 in the foldable mechanism 130 shown in FIG. 6. FIG. 18 is a schematic diagram of a structure of the pressing plate assembly 40 shown in FIG. 17 from another perspective.

The first pressing plate 41 includes a support portion 411, an auxiliary portion 412, and a guide slider 413. Both the auxiliary portion 412 and the guide slider 413 are fixedly connected to the support portion 411. The first pressing plate 41 is an integrally formed structural member, to improve structural strength of the first pressing plate 41 and ensure structural stability of the first pressing plate 41. For example, the support portion 411 may be made of carbon fiber, and the auxiliary portion 412 and the guide slider 413 may be made of stainless steel. In this case, the first pressing plate 41 may be made by using an AIO technology. This not only helps reduce manufacturing costs of the first pressing plate 41, but also helps reduce a weight of the first pressing plate 41.

It may be understood that by using the integrally formed first pressing plate 41, components in the foldable mechanism 130 can be reduced, assembling of the foldable mechanism 130 can be facilitated, costs of the foldable mechanism 130 can be reduced, and a miniaturization design of the foldable mechanism 130 can be facilitated. In addition, the first pressing plate 41 made by using the AIO technology has a lighter weight, which helps implement a lightweight design of the foldable mechanism 130.

In some other embodiments, the first pressing plate 41 may be an integrated structural member formed through assembling. For example, the auxiliary portion 412 and the guide slider 413 may be fixedly connected to the support portion 411 through welding or bonding.

The support portion 411 is roughly in a shape of an elongated plate. In this embodiment, the support portion 411 extends in the Y-axis direction. The auxiliary portion 412 is fixedly connected to a bottom surface of the support portion 411. The auxiliary portion 412 is provided with a sliding hole 414, and an opening of the sliding hole 414 is located on a right side surface of the auxiliary portion 412. The sliding hole 414 is recessed in a direction (the negative direction of the X-axis shown in the figure) from the right side surface to a left side surface of the auxiliary portion 412, and runs through the left side surface of the auxiliary portion 412. That is, the sliding hole 414 runs through the auxiliary portion 412 in the X-axis direction. For example, the sliding hole 414 is a square hole.

In some other embodiments, the sliding hole 414 may not run through the left side surface of the first pressing plate 41, or the auxiliary portion 412 and the support portion 411 may form the sliding hole 414 through enclosing. A manner of forming the sliding hole 414 is not specifically limited in this application.

In this embodiment, there are four auxiliary portions 412, and the four auxiliary portions 412 are sequentially arranged and spaced apart from each other in the Y-axis direction. The four auxiliary portions 412 are a front auxiliary portion 412a, a rear auxiliary portion 412b, and middle auxiliary portions 412c. There are two middle auxiliary portions 412c. The front auxiliary portion 412a is fixedly connected to a front side of the support portion 411, the rear auxiliary portion 412b is fixedly connected to a rear side of the support portion 411, and the two middle auxiliary portions 412c are fixedly connected to a middle portion of the support portion 411. In some other embodiments, there may be one, two, three, or at least five auxiliary portions 412. A quantity of auxiliary portions 412 is not specifically limited in this application.

The guide slider 413 is fixedly connected to the bottom surface of the support portion 411, and is spaced apart from the auxiliary portion 412. The guide slider 413 extends from the bottom surface of the support portion 411 in a direction (the negative direction of the Z-axis shown in the figure) far away from a top surface. A structure of the guide slider 413 is adapted to a structure of the guide groove (the guide groove 217a shown in FIG. 11, the guide groove 217b shown in FIG. 13, and the guide groove 213c shown in FIG. 15). A bottom surface of the guide slider 413 is an arc-shaped surface.

In this embodiment, there are six guide sliders 413, and the six guide sliders 413 are sequentially arranged and spaced apart from each other in the Y-axis direction. The six guide sliders 413 are two front guide sliders 413a, two rear guide sliders 413b, and two middle guide sliders 413c. The two front guide sliders 413a are fixedly connected to the front side of the support portion 411, and are located on two opposite sides of the front auxiliary portion 412a. The two rear guide sliders 413b are fixedly connected to the rear side of the support portion 411, and are located on two opposite sides of the rear auxiliary portion 412b. The two middle guide sliders 413c are fixedly connected to the middle portion of the support portion 411, are located between the two middle auxiliary portions 412c, and are spaced apart from the middle auxiliary portions 412c. In some other embodiments, there may be no more than five or at least seven guide sliders 413. A quantity of guide sliders 413 is not specifically limited in this application.

In this embodiment, the four first pressing plate swing arms 43 are a first front pressing plate swing arm 43a, a first rear pressing plate swing arm 43b, and first middle pressing plate swing arms 43c. There are two first middle pressing plate swing arms 43c. In some other embodiments, there may be no more than three or at least five first pressing plate swing arms 43. A quantity of first pressing plate swing arms 43 is not specifically limited in this application.

The first front pressing plate swing arm 43a includes a sliding portion 431a, a rotating portion 432a, and a connecting portion 433a. The connecting portion 433a is connected between the rotating portion 432a and the sliding portion 431a. The sliding portion 431a is in a flat plate shape. A structure of the sliding portion 431a is adapted to a structure of a sliding hole 414 in the front auxiliary portion 412a. The sliding portion 431a may penetrate through the sliding hole 414 in the front auxiliary portion 412a, and can slide with respect to the first pressing plate 41 in the sliding hole 414 in the front auxiliary portion 412a, to implement slidable connection between the sliding portion 431a and the first pressing plate 41, so as to implement slidable connection between the first front pressing plate swing arm 43a and the first pressing plate 41.

The connecting portion 433a is provided with an assembly hole 434a, and an opening of the assembly hole 434a is located on a top surface of the connecting portion 433a. The assembly hole 434a is recessed in a direction (the negative direction of the Z-axis shown in the figure) from the top surface to a bottom surface of the connecting portion 433a, and runs through the bottom surface of the connecting portion 433a. That is, the assembly hole 434a runs through the connecting portion 433a in a thickness direction (the Z-axis direction shown in the figure) of the connecting portion 433a. For example, the assembly hole 434a is a circular hole. In some other embodiments, the assembly hole 434a may not run through the bottom surface of the connecting portion 433a, and/or the assembly hole 434a may be a square hole or another specially-shaped hole.

A structure of the rotating portion 432a is adapted to a structure of the first fitting groove 103a (shown in FIG. 8). In this embodiment, a bottom surface of the rotating portion 432a is an arc-shaped surface. The rotating portion 432a is provided with two third sliding grooves (not shown in the figure). An opening of one third sliding groove is located on a front end face of the rotating portion 432a, and an opening of the other third sliding groove is located on a rear end face of the rotating portion 432a. Both of the two third sliding grooves are recessed in the Y-axis direction, and run through a top surface of the rotating portion 432a. Each third sliding groove is an arc-shaped groove adapted to the third slider 12c (shown in FIG. 8), and an axis of each third sliding groove is parallel to the Y-axis direction.

The two third sliders 12c may be respectively mounted in the two third sliding grooves, and can slide and rotate in the third sliding grooves, so that the rotating portion 432a can be mounted in the first fitting groove 103a, and can slide and rotate in the first fitting groove 103a, to implement slidable and rotatable connection between the rotating portion 432a and the base 10, so as to implement slidable and rotatable connection between the first front pressing plate swing arm 43a and the base 10. In this case, each third slider 12c is coaxial with one third sliding groove. A rotation center of the first front pressing plate swing arm 43a with respect to the base 10 is parallel to the Y-axis direction.

The first rear pressing plate swing arm 43b has a same structure as the first front pressing plate swing arm 43a. A connecting portion 433b of the first rear pressing plate swing arm 43b is provided with an assembly hole 434b. A structure of a sliding portion 431b of the first rear pressing plate swing arm 43b is adapted to a structure of a sliding hole 414 in the rear auxiliary portion 412b. The sliding portion 431b may penetrate through the sliding hole 414 in the rear auxiliary portion 412b, and can slide with respect to the first pressing plate 41 in the sliding hole 414 in the rear auxiliary portion 412b, to implement slidable connection between the sliding portion 431b and the first pressing plate 41, so as to implement slidable connection between the first rear pressing plate swing arm 43b and the first pressing plate 41.

A structure of a rotating portion 432b of the first rear pressing plate swing arm 43b is adapted to a structure of the first fitting groove 103b (shown in FIG. 9). The rotating portion 432b is provided with two third sliding grooves. Each third sliding groove is an arc-shaped groove adapted to the third slider 13c (shown in FIG. 9), and an axis of each third sliding groove is parallel to the Y-axis direction. The two third sliders 13c may be respectively mounted in the two third sliding grooves, and can slide and rotate in the third sliding grooves, so that the rotating portion 432b can be mounted in the first fitting groove 103b, and can slide and rotate in the first fitting groove 103b, to implement slidable and rotatable connection between the rotating portion 432b and the base 10, so as to implement slidable and rotatable connection between the first rear pressing plate swing arm 43b and the base 10. In this case, each third slider 13c is coaxial with one third sliding groove. A rotation center of the first rear pressing plate swing arm 43b with respect to the base 10 is parallel to the Y-axis direction, and is coaxial with the rotation center of the first front pressing plate swing arm 43a with respect to the base 10.

The first middle pressing plate swing arm 43c has a same structure as the first front pressing plate swing arm 43a. A connecting portion 433c of the first middle pressing plate swing arm 43c is provided with an assembly hole 434c. A structure of a sliding portion 431c of the first middle pressing plate swing arm 43c is adapted to a structure of a sliding hole 414 in the middle auxiliary portion 412c. The sliding portion 431c of each first middle pressing plate swing arm 43c may penetrate through the sliding hole 414 of one middle auxiliary portion 412c, and can slide with respect to the first pressing plate 41 in the sliding hole 414, to implement slidable connection between the sliding portion 431c and the first pressing plate 41, so as to implement slidable connection between the first middle pressing plate swing arm 43c and the first pressing plate 41.

A structure of a rotating portion 432c of the first middle pressing plate swing arm 43c is adapted to a structure of the first fitting groove 103c (shown in FIG. 10). The rotating portion 432c is provided with two third sliding grooves. Each third sliding groove is an arc-shaped groove adapted to the third slider 14c (shown in FIG. 10), and an axis of each third sliding groove is parallel to the Y-axis direction. The four third sliders 14c may be respectively mounted in the four third sliding grooves, and can slide and rotate in the third sliding grooves, so that rotating portions 432c of the two first middle pressing plate swing arms 43c can be respectively mounted in the two first fitting grooves 103c, and can slide and rotate in the first fitting grooves 103c, to implement slidable and rotatable connection between the rotating portions 432c of the two first middle pressing plate swing arms 43c and the base 10, so as to implement slidable and rotatable connection between the two first middle pressing plate swing arms 43c and the base 10. In this case, each third slider 14c is coaxial with one third sliding groove. A rotation center of the first middle pressing plate swing arm 43c with respect to the base 10 is parallel to the Y-axis direction, and is coaxial with the rotation center of the first front pressing plate swing arm 43a with respect to the base 10.

Further referring to FIG. 11. FIG. 13, and FIG. 15, the front side of the support portion 411 may be accommodated in the accommodating notch 211a in the first fastening bracket 21a, the rear side of the support portion 411 may be accommodated in the accommodating notch 211b in the first fastening bracket 21b, and the middle portion of the support portion 411 may be accommodated in the accommodating notch 211c in the first fastening bracket 21c.

The front auxiliary portion 412a may be accommodated in the avoidance groove 216a in the first fastening bracket 21a. The sliding hole 414 in the front auxiliary portion 412a communicates with the sliding hole 2161a in the first fastening bracket 21a, and the sliding portion 431a of the first front pressing plate swing arm 43a may further penetrate through the sliding hole 2161a in the first fastening bracket 21a, and can slide with respect to the first fastening bracket 21a in the sliding hole 2161a.

The rear auxiliary portion 412b may be accommodated in the avoidance groove 216b in the first fastening bracket 21b. The sliding hole 414 in the rear auxiliary portion 412b communicates with the sliding hole 2161b in the first fastening bracket 21b, and the sliding portion 431b of the first rear pressing plate swing arm 43b may further penetrate through the sliding hole 2161b in the first fastening bracket 21b, and can slide with respect to the first fastening bracket 21b in the sliding hole 2161b.

The two front guide sliders 413a may be respectively mounted in the two guide grooves 217a in the first fastening bracket 21a, and can slide and rotate in the guide grooves 217a, to implement slidable and rotatable connection between the first pressing plate 41 and the first fastening bracket 21a. The two rear guide sliders 413b may be respectively mounted in the two guide grooves 217b in the first fastening bracket 21b, and can slide and rotate in the guide grooves 217b, to implement slidable and rotatable connection between the first pressing plate 41 and the first fastening bracket 21b. The two middle guide sliders 413c may be respectively mounted in the two guide grooves 213c in the first fastening bracket 21c, and can slide and rotate in the guide grooves 213c, to implement sliding and rotation between the first pressing plate 41 and the first fastening bracket 21c.

The second pressing plate 42 has a same structure as the first pressing plate 41. The second pressing plate 42 includes a support portion 421, an auxiliary portion 422, and a guide slider 423. Both the auxiliary portion 422 and the guide slider 423 are fixedly connected to the support portion 421. The second pressing plate 42 is an integrally formed structural member, to improve structural strength of the second pressing plate 42 and ensure structural stability of the second pressing plate 42. For example, the support portion 421 may be made of carbon fiber, and the auxiliary portion 422 and the guide slider 423 may be made of stainless steel. In this case, the second pressing plate 42 may be made by using an AIO technology. This not only helps reduce manufacturing costs of the second pressing plate 42, but also helps reduce a weight of the second pressing plate 42.

It may be understood that by using the integrally formed second pressing plate 42, components in the foldable mechanism 130 can be reduced, assembling of the foldable mechanism 130 can be facilitated, costs of the foldable mechanism 130 can be reduced, and a miniaturization design of the foldable mechanism 130 can be facilitated. In addition, the second pressing plate 42 made by using the AIO technology has a lighter weight, which helps implement a lightweight design of the foldable mechanism 130.

In some other embodiments, the second pressing plate 42 may be an integrated structural member formed through assembling. For example, the auxiliary portion 422 and the guide slider 423 may be fixedly connected to the support portion 411 through welding or bonding.

In this embodiment, for structures of the support portion 421, the auxiliary portion 422, and the guide slider 423, refer to the related description of the support portion 411, the auxiliary portion 412, and the guide slider 413 in the first pressing plate 41. Details are not described herein. The auxiliary portion 422 is provided with a sliding hole 424.

The second pressing plate swing arm 44 has a same structure as the first pressing plate swing arm 43. There are four second pressing plate swing arms 44. The four second pressing plate swing arms 44 are a second front pressing plate swing arm 44a, a second rear pressing plate swing arm 44b, and second middle pressing plate swing arms 44c. There are two second middle pressing plate swing arms 44c.

A connecting portion 443a of the second front pressing plate swing arm 44a is provided with an assembly hole 444a. A structure of a sliding portion 441a of the second front pressing plate swing arm 44a is adapted to a structure of a sliding hole 424 in a front auxiliary portion 422a. The sliding portion 441a may penetrate through the sliding hole 424 in the front auxiliary portion 422a, and can slide with respect to the second pressing plate 42 in the sliding hole 424 in the front auxiliary portion 422a, to implement slidable connection between the sliding portion 441a and the second pressing plate 42, so as to implement slidable connection between the second front pressing plate swing arm 44a and the second pressing plate 42.

A structure of a rotating portion 442a of the second front pressing plate swing arm 44a is adapted to a structure of the second fitting groove 104a (shown in FIG. 8). The rotating portion 442b is provided with two fourth sliding grooves. Each fourth sliding groove is an arc-shaped groove adapted to the fourth slider 12d (shown in FIG. 8), and an axis of each fourth sliding groove is parallel to the Y-axis direction. The two fourth sliders 12d may be respectively mounted in the two fourth sliding grooves, and can slide and rotate in the fourth sliding grooves, so that the rotating portion 442a can be mounted in the second fitting groove 104a, and can slide and rotate in the second fitting groove 104a, to implement slidable and rotatable connection between the rotating portion 442a and the base 10, so as to implement slidable and rotatable connection between the second front pressing plate swing arm 44a and the base 10. In this case, each fourth slider 12d is coaxial with one fourth sliding groove. A rotation center of the second front pressing plate swing arm 44a with respect to the base 10 is parallel to the Y-axis direction, and is spaced apart from the rotation center of the first front pressing plate swing arm 43a with respect to the base 10.

The second rear pressing plate swing arm 44b has a same structure as the second front pressing plate swing arm 44a. A connecting portion 443b of the second rear pressing plate swing arm 44b is provided with an assembly hole 444b. A structure of a sliding portion 441b of the second rear pressing plate swing arm 44b is adapted to a structure of a sliding hole 424 in a rear auxiliary portion 422b. The sliding portion 441b may penetrate through the sliding hole 424 in the rear auxiliary portion 422b, and can slide with respect to the second pressing plate 42 in the sliding hole 424 in the rear auxiliary portion 422b, to implement slidable connection between the sliding portion 441b and the second pressing plate 42, so as to implement slidable connection between the second rear pressing plate swing arm 44b and the second pressing plate 42.

A structure of a rotating portion 442b of the second rear pressing plate swing arm 44b is adapted to a structure of the second fitting groove 104b (shown in FIG. 9). The rotating portion 442b is provided with two fourth sliding grooves. Each fourth sliding groove is an arc-shaped groove adapted to the fourth slider 13d (shown in FIG. 9), and an axis of each fourth sliding groove is parallel to the Y-axis direction. The two fourth sliders 13d may be respectively mounted in the two fourth sliding grooves, and can slide and rotate in the fourth sliding grooves, so that the rotating portion 442b can be mounted in the second fitting groove 104b, and can slide and rotate in the second fitting groove 104b, to implement slidable and rotatable connection between the rotating portion 442b and the base 10, so as to implement slidable and rotatable connection between the second rear pressing plate swing arm 44b and the base 10. In this case, each fourth slider 13d is coaxial with one fourth sliding groove. A rotation center of the second rear pressing plate swing arm 44b with respect to the base 10 is parallel to the Y-axis direction, and is coaxial with the rotation center of the second front pressing plate swing arm 44a with respect to the base 10.

The second middle pressing plate swing arm 44c has a same structure as the second front pressing plate swing arm 44a A connecting portion 443c of the second middle pressing plate swing arm 44c is provided with an assembly hole 444c. A structure of a sliding portion 441c of the second middle pressing plate swing arm 44c is adapted to a structure of a sliding hole 424 in a middle auxiliary portion 422c. The sliding portion 441c of each second middle pressing plate swing arm 44c may penetrate through the sliding hole 424 in the middle auxiliary portion 422c, and can slide with respect to the second pressing plate 42 in the sliding hole 424, to implement slidable connection between the sliding portion 441c and the second pressing plate 42, so as to implement slidable connection between the second middle pressing plate swing arm 44c and the second pressing plate 42.

A structure of a rotating portion 442c of the second middle pressing plate swing arm 44c is adapted to a structure of the second fitting groove 104c (shown in FIG. 10). The rotating portion 442b is provided with two fourth sliding grooves. Each fourth sliding groove is an arc-shaped groove adapted to the fourth slider 14d (shown in FIG. 10), and an axis of each fourth sliding groove is parallel to the Y-axis direction. The two fourth sliders 14d may be respectively mounted in the two fourth sliding grooves, and can slide and rotate in the fourth sliding grooves, so that rotating portions 442c of two second middle pressing plate swing arms 44c can be respectively mounted m the two second fitting grooves 104c, and can slide and rotate in the second fitting grooves 104c, to implement slidable and rotatable connection between the rotating portions 442c of the two second middle pressing plate swing arms 44c and the base 10, so as to implement slidable and rotatable connection between the two second middle pressing plate swing arms 44c and the base 10. In this case, each fourth slider 14d is coaxial with one fourth sliding groove. A rotation center of the second middle pressing plate swing arm 44c with respect to the base 10 is parallel to the Y-axis direction, and is coaxial with the rotation center of the second front pressing plate swing arm 44a with respect to the base 10.

Further referring to FIG. 11, FIG. 13, and FIG. 15, a front side of the support portion 421 may be accommodated in the accommodating notch 221a in the second fastening bracket 22a, a rear side of the support portion 421 may be accommodated in the accommodating notch 221b in the second fastening bracket 22b, and a middle portion of the support portion 421 may be accommodated in the accommodating notch 221c in the second fastening bracket 22c.

The front auxiliary portion 422a may be accommodated in the avoidance groove 226a in the second fastening bracket 22a. The sliding hole 424 in the front auxiliary portion 422a communicates with the sliding hole 2261a in the second fastening bracket 22a, and the sliding portion 441a of the second front pressing plate swing arm 44a may further penetrate through the sliding hole 2261a in the second fastening bracket 22a, and can slide with respect to the second fastening bracket 22a in the sliding hole 2261a.

The rear auxiliary portion 422b may be accommodated in the avoidance groove 226b in the second fastening bracket 22b. The sliding hole 424 in the rear auxiliary portion 422b communicates with the sliding hole 2261b in the second fastening bracket 22b, and the sliding portion 441b of the second rear pressing plate swing arm 44b may further penetrate through the sliding hole 2261a in the second fastening bracket 22b, and can slide with respect to the second fastening bracket 22b in the sliding hole 2261a.

Two front guide sliders 423a may be respectively mounted in the two guide grooves 227a in the second fastening bracket 22a, and can slide and rotate in the guide grooves 227a, to implement slidable and rotatable connection between the second pressing plate 42 and the second fastening bracket 22a. Two rear guide sliders 423b may be respectively mounted in the two guide grooves 227b in the second fastening bracket 22b, and can slide and rotate in the guide grooves 227b, to implement slidable and rotatable connection between the second pressing plate 42 and the second fastening bracket 22b. Two middle guide sliders 423c may be respectively mounted in the two guide grooves 223c in the second fastening bracket 22c, and can slide and rotate in the guide grooves 223c, to implement sliding and rotation between the second pressing plate 42 and the second fastening bracket 22c.

It should be noted that there is a substantially same fitting relationship between the pressing plate assembly 40 and each of the first connecting assembly 20a, the second connecting assembly 20b, and the third connecting assembly 20c. To avoid repetition, description is provided below by using a fitting relationship between the pressing plate assembly 40 and the first connecting assembly 20a as an example.

When the first fastening bracket 21a and the second fastening bracket 22a rotate with respect to the base 10 (shown in FIG. 7), the first fastening bracket 21a drives the first pressing plate 41 to slide and rotate with respect to the first fastening bracket 21a, and drives the first pressing plate 41 to slide with respect to the first pressing plate swing arm 43, to drive the first pressing plate 41 and the first pressing plate swing arm 43 to rotate with respect to the base 10, and the second fastening bracket 22a drives the second pressing plate 42 to slide and rotate with respect to the second fastening bracket 22a, and drives the second pressing plate 42 to slide with respect to the second pressing plate swing arm 44, to drive the second pressing plate 42 and the second pressing plate swing arm 44 to rotate with respect to the base 10, so as to switch the pressing plate assembly 40 between the folded state and the unfolded state.

Figure 19:
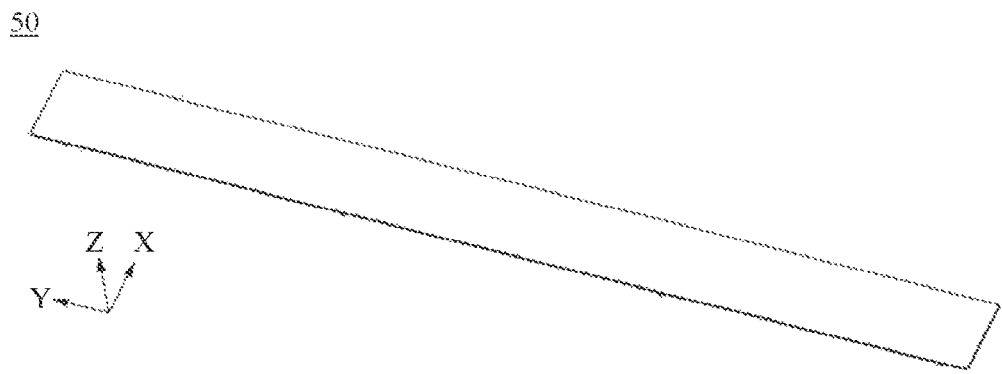
FIG. 19 is a schematic diagram of a structure of a support plate in the foldable mechanism shown in FIG. 6.
Figure 20:
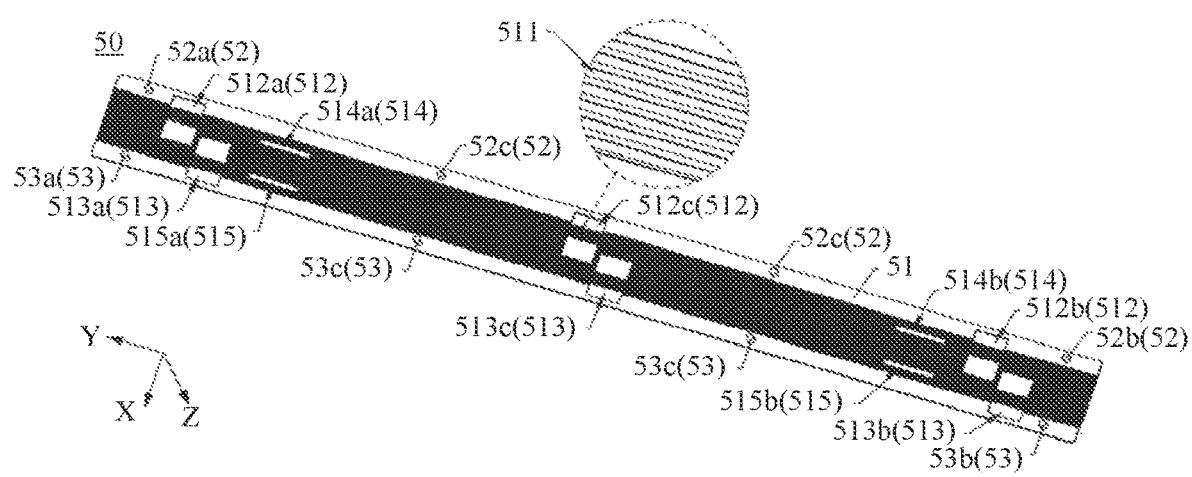
FIG. 20 is a schematic diagram of a structure of the support plate shown in FIG. 19 from another perspective.

Refer to FIG. 19 and FIG. 20. FIG. 19 is a schematic diagram of a structure of the flexible support plate 50 in the foldable mechanism 130 shown in FIG. 6. FIG. 20 is a schematic diagram of a structure of the flexible support plate 50 shown in FIG. 19 from another perspective.

The flexible support plate 50 includes a flexible support portion 51, a first fastening portion 52, and a second fastening portion 53. Both the first fastening portion 52 and the second fastening portion 53 are fixedly connected to the flexible support portion 51. The flexible support plate 50 may be an integrally formed structural member to reduce a quantity of parts in the flexible support plate 50. This not only facilitates assembling of the flexible support plate 50, but also can reduce manufacturing costs of the flexible support plate 50. It may be understood that the flexible support plate 50 may be locally manufactured thin to reduce a thickness of the flexible support plate 50, to help reduce a thickness of the foldable mechanism 130 and implement a lightweight design of the foldable mechanism 130.

The flexible support portion 51 is in a shape of a strip-shaped plate. The flexible support portion 51 extends in the Y-axis direction, and can be bent in the Y-axis direction. The flexible support portion 51 is provided with a plurality of strip-shaped grooves 511, and an opening of each strip-shaped groove 511 is located on a bottom surface of the flexible support portion 51. Specifically, the opening of each strip-shaped groove 511 is located in a middle region of the bottom surface of the flexible support portion 51. The strip-shaped groove 511 is recessed in a direction (the negative direction of the Z-axis shown in the figure) from the bottom surface to a top surface of the flexible support portion 51, and runs through a front side surface and a rear side surface of the flexible support portion 51. The plurality of strip-shaped grooves 511 are arranged in parallel and spaced apart from each other in the X-axis direction. An extension direction of the strip-shaped groove 511 is parallel to the Y-axis direction, to improve flexibility of the flexible support portion 51, so that the flexible support portion 51 is bent in the Y-axis direction.

In addition, the flexible support portion 51 is further provided with a first avoidance groove 512, a second avoidance groove 513, a third avoidance groove 514, and a fourth avoidance groove 515. An opening of each of the first avoidance groove 512, the second avoidance groove 513, the third avoidance groove 514, and the fourth avoidance groove 515 is located on the bottom surface of the flexible support portion 51, and communicates with one or more strip-shaped grooves 511.

In this embodiment, there are three first avoidance grooves 512, and all of the three avoidance grooves 512 are located on a left side of the flexible support portion 51. The three first avoidance grooves 512 are spaced apart from each other in the Y-axis direction. The three first avoidance grooves 512 are a first front avoidance groove 512a, a first rear avoidance groove 512b, and a first middle avoidance groove 512c. The first front avoidance groove 512a is located on a front side of the flexible support portion 51, the first rear avoidance groove 512b is located on a rear side of the flexible support portion 51, and the first middle avoidance groove 512c is located in a middle portion of the flexible support portion 51.

There are three second avoidance grooves 513, and all of the three second avoidance grooves 513 are located on a right side of the flexible support portion 51. The three second avoidance grooves 513 are spaced apart from each other in the Y-axis direction. The three second avoidance grooves 513 are a second front avoidance groove 513a, a second rear avoidance groove 513b, and a second middle avoidance groove 513c. The second front avoidance groove 513a is located on the front side of the flexible support portion 51, is located on a side that is of the first front avoidance groove 512a and that faces the negative direction of the Y-axis, and is spaced apart from the first front avoidance groove 512a. The second rear avoidance groove 513b is located on the rear side of the flexible support portion 51, is located on a side that is of the first rear avoidance groove 512b and that faces the negative direction of the Y-axis, and is spaced apart from the first rear avoidance groove 512b. The second middle avoidance groove 513c is located in the middle portion of the flexible support portion 51, is located on a side that is of the first middle avoidance groove 512c and that faces the negative direction of the Y-axis, and is spaced apart from the first middle avoidance groove 512c.

There are two third avoidance grooves 514 and two fourth avoidance grooves 515. The two third avoidance grooves 514 are a third front avoidance groove 514a and a third rear avoidance groove 514b, and the two fourth avoidance grooves 515 are a fourth front avoidance groove 515a and a fourth rear avoidance groove 515b. Both the third front avoidance groove 514a and the fourth front avoidance groove 515a are located on the front side of the flexible support portion 51, are located on a side that is of the second front avoidance groove 513a and that faces away from the first front avoidance groove 512a, and are spaced apart from the second front avoidance groove 513a. Both the third rear avoidance groove 514b and the fourth rear avoidance groove 515b are located on the rear side of the flexible support portion 51, are located on a side that is of the second rear avoidance groove 513b and that faces away from the first rear avoidance groove 512b, and are spaced apart from the second rear avoidance groove 513b. In the X-axis direction, the third front avoidance groove 514a and the fourth front avoidance groove 515a are spaced apart and disposed opposite to each other, and the third rear avoidance groove 514b and the fourth rear avoidance groove 515b are spaced apart and disposed opposite to each other.

The first fastening portion 52 is fixedly connected to the bottom surface of the flexible support portion 51, and is spaced apart from the strip-shaped groove 511. Specifically, the first fastening portion 52 is fixedly connected to an edge region of a bottom of the flexible support portion 51. The first fastening portion 52 extends from the bottom surface of the flexible support portion 51 in a direction (the positive direction of the Z-axis shown in the figure) facing away from the top surface. For example, the first fastening portion 52 is in a cylindrical shape.

In this embodiment, there are four first fastening portions 52. All of the four first fastening portions 52 are fixedly connected to the left side of the flexible support portion 51, and the four first fastening portions 52 are spaced apart from each other in the Y-axis direction. The four first fastening portions 52 are a first front fastening portion 52a, a first rear fastening portion 52b, and first middle fastening portions 52c. There are two first middle fastening portions 52c. The first front fastening portion 52a is fixedly connected to the front side of the flexible support portion 51, is located on a side that is of the first front avoidance groove 512a and that faces away from the third front avoidance groove 514a, and is spaced apart from the first front avoidance groove 512a. The first rear fastening portion 52b is fixedly connected to the rear side of the flexible support portion 51, is located on a side that is of the first rear avoidance groove 512b and that faces away from the third rear avoidance groove 514b, and is spaced apart from the second rear avoidance groove 513b. Both of the two first middle fastening portions 52c are fixedly connected to the middle portion of the flexible support portion 51, are respectively located on two opposite sides of the first middle avoidance groove 512c, and are spaced apart from the first middle avoidance groove 512c.

The second fastening portion 53 is fixedly connected to the bottom surface of the flexible support portion 51, and is spaced apart from the strip-shaped groove 511 and the first fastening portion 52. In this embodiment, for a structure of the second fastening portion 53 and a relationship between the second fastening portion 53 and the flexible support portion 51, refer to the related description of the first fastening portion 52. Details are not described herein. There are four second fastening portions 53, and all of the four second fastening portions 53 are fixedly connected to the right side of the flexible support portion 51. The four second fastening portions 53 are spaced apart from each other in the Y-axis direction. The four second fastening portions 53 are a second front fastening portion 53a, a second rear fastening portion 53b, and second middle fastening portions 53c. There are two second middle fastening portions 53c. In the X-axis direction, the second front fastening portion 53a and the first front fastening portion 52a are spaced apart and disposed opposite to each other, the second rear fastening portion 53b and the second rear fastening portion 51b are spaced apart and disposed opposite to each other, and each second middle fastening portion 53c and one first middle fastening portion 52c are spaced apart and disposed opposite to each other.

Further referring to FIG. 17 and FIG. 18, the first front fastening portion 52a is mounted in the assembly hole 434a in the first front pressing plate swing arm 43a, the first rear fastening portion 52b is mounted in the assembly hole 434b in the first rear pressing plate swing arm 43b, the two first middle fastening portions 52c are respectively mounted in the assembly holes 434c in the two first middle pressing plate swing arms 43c, the second front fastening portion 53a is mounted in the assembly hole 444a in the second front pressing plate swing arm 44a, the second rear fastening portion 53b is mounted in the assembly hole 444b in the second rear pressing plate swing arm 44b, and the two second middle fastening portions 53c are respectively mounted in the assembly holes 444c in the two second middle pressing plate swing arms 44c, to implement assembling between the flexible support plate 50 and the pressing plate assembly 40.

When the pressing plate assembly 40 is switched between the folded state and the unfolded state, both the first pressing plate swing arm 43 and the second pressing plate swing arm 44 rotate with respect to the base 10 (shown in FIG. 7), to drive the first fastening portion 52 and the second fastening portion 53 to rotate with respect to the base 10, so as to drive the flexible support portion 51 to be relatively folded or relatively unfolded. In other words, the flexible support plate 50 may be relatively folded or relatively unfolded under the driving of the pressing plate assembly 40. In other words, the flexible support plate 50 may be switched between the folded state and the unfolded state under the driving of the pressing plate assembly 40.

Figure 21:
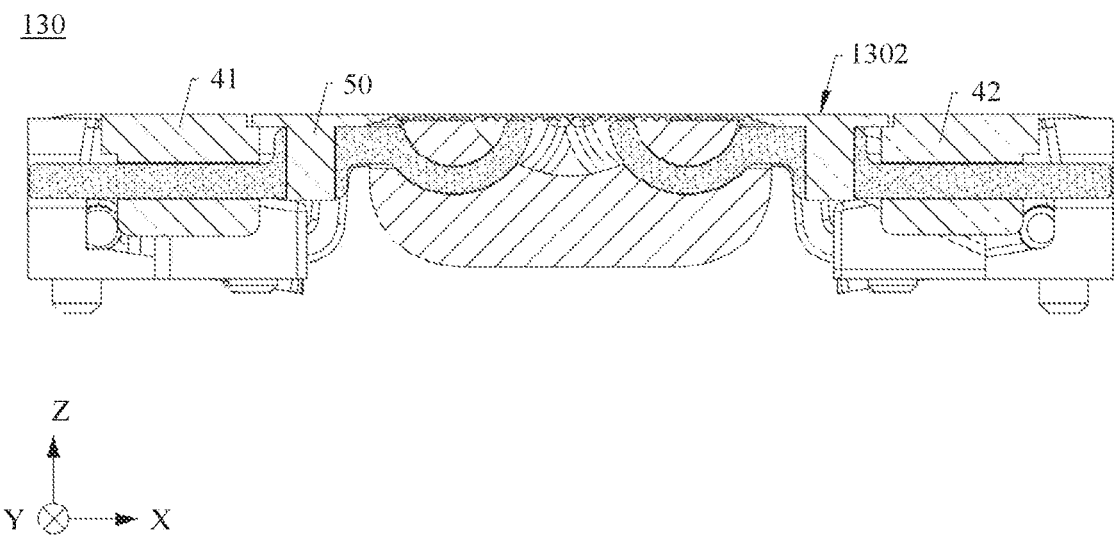
FIG. 21 is a schematic diagram of a sectional structure of the foldable mechanism shown in FIG. 5a taken along I-I.

Refer to FIG. 5a. FIG. 5b, and FIG. 21. FIG. 21 is a schematic diagram of a sectional structure of the foldable mechanism 130 shown in FIG. 5a taken along I-I. "Taken along I-I" means "taken along a plane on which a line I-I is located". Similar descriptions in this application may be understood in a same way.

When the foldable mechanism 130 is in the unfolded state, the pressing plate assembly 40 is in the unfolded state, the first pressing plate 41 and the second pressing plate 42 are respectively located on two sides of the base 10, the flexible support plate 50 is relatively unfolded, a top surface of the first pressing plate 41 (namely, the top surface of the support portion 411), a top surface of the second pressing plate 42 (namely, a top surface of the support portion 421), and a top surface of the flexible support plate 50 (namely, the top surface of the flexible support portion 51) are flush with each other, and the top surface of the first pressing plate 41, the top surface of the second pressing plate 42, and the top surface of the flexible support plate 50 form a support surface 1302.

The first front avoidance groove 512a avoids the sliding portion 232a (shown in FIG. 11) of the first primary swing arm 23a, the first rear avoidance groove 512b avoids the sliding portion 232b (shown in FIG. 13) of the first primary swing arm 23b, and the first middle avoidance groove 512c avoids the sliding portion 232c (shown in FIG. 15) of the first primary swing arm 23c. The second front avoidance groove 513a avoids the sliding portion 242a (shown in FIG. 11) of the second primary swing arm 24a, the second rear avoidance groove 513b avoids the sliding portion 242b (shown in FIG. 13) of the second primary swing arm 24b, and the second middle avoidance groove 513c avoids the sliding portion 242c (shown in FIG. 15) of the second primary swing arm 24c.

The third front avoidance groove 514a avoids the rotating portion 252a (shown in FIG. 11) of the first secondary swing arm 25a, and the third rear avoidance groove 514b avoids the rotating portion 252b (shown in FIG. 13) of the first secondary swing arm 25b. The fourth front avoidance groove 515a avoids the rotating portion 262a (shown in FIG. 11) of the second secondary swing arm 26a, and the fourth rear avoidance groove 515b avoids the rotating portion 262b (shown in FIG. 13) of the second secondary swing arm 26b.

It may be understood that when the flexible support plate 50 is in the unfolded state, each avoidance groove disposed in the flexible support plate 50 can prevent the flexible support plate 50 from interfering with the swing arm in each connecting assembly 20, so that the flexible support portion 51 does not abut against any swing arm, and does not protrude with respect to the top surface of the first pressing plate 41 and the top surface of the second pressing plate 42, to ensure that the top surface of the flexible support plate 50 is flush with the top surface of the first pressing plate 41 and the top surface of the second pressing plate 42.

Figure 22:
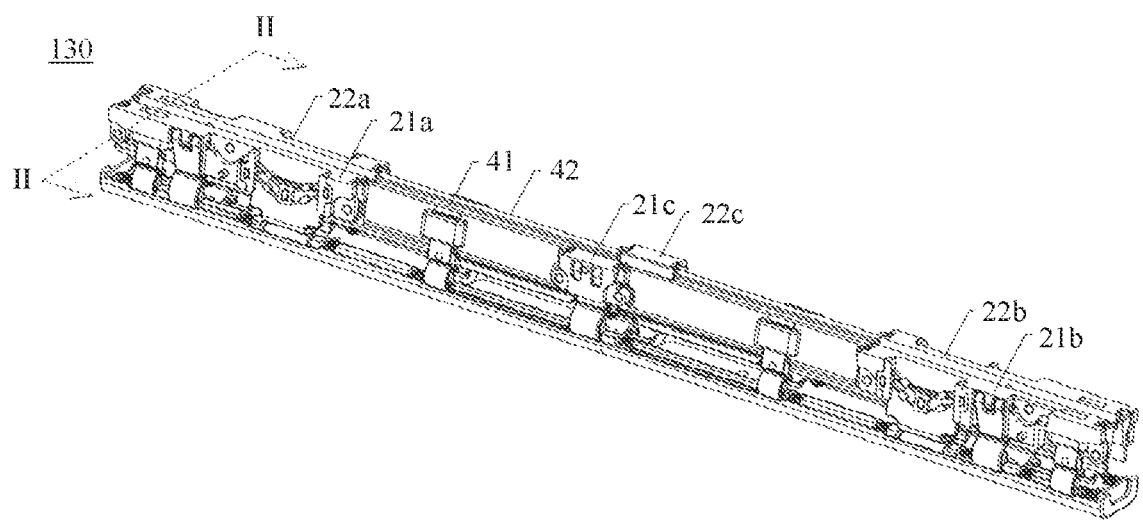
FIG. 22 is a schematic diagram of a structure of the foldable mechanism shown in FIG. 5a in a folded state.
Figure 23:
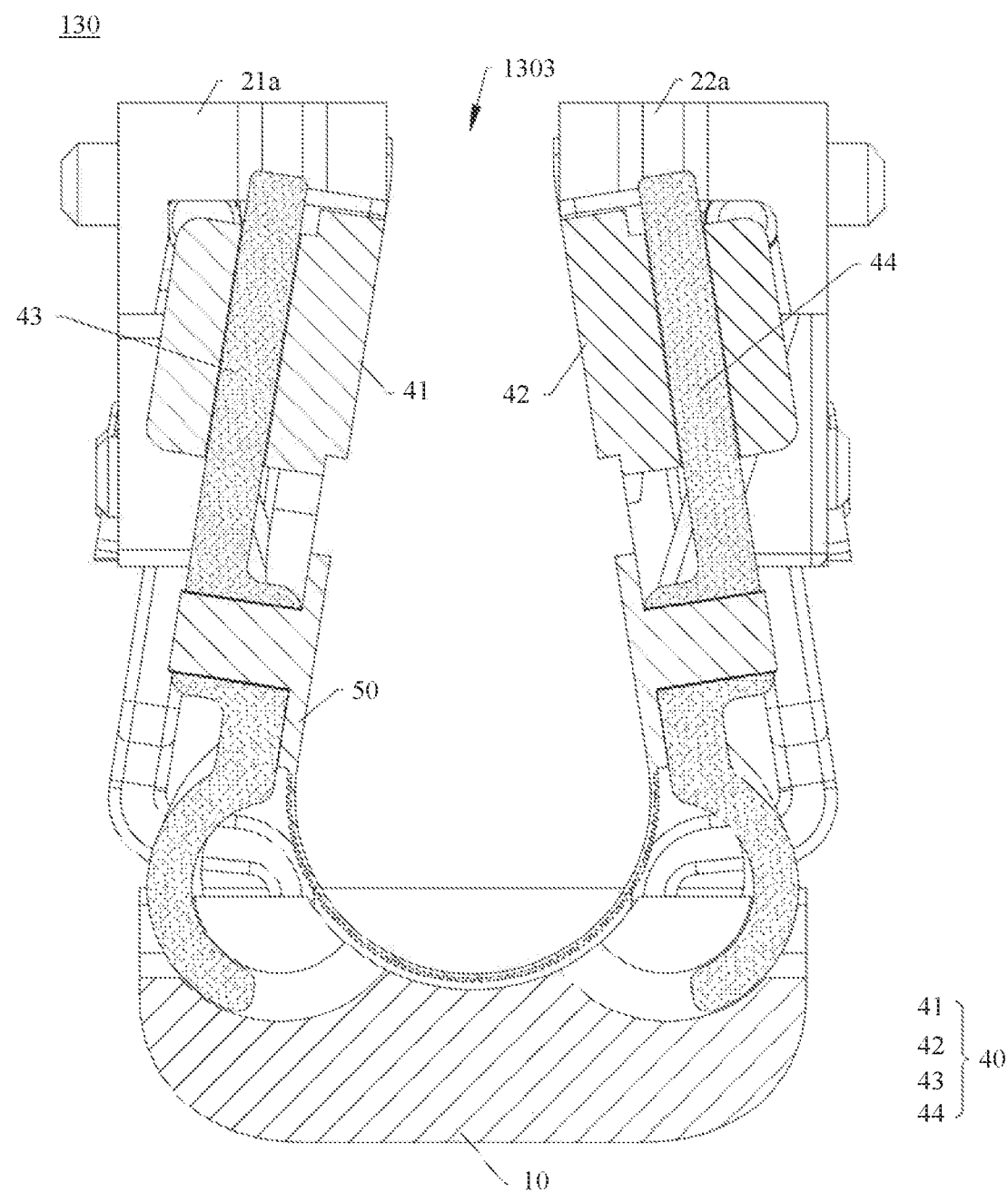
FIG. 23 is a schematic diagram of a sectional structure of the foldable mechanism shown in FIG. 22 taken along II-II.

Refer to FIG. 22 and FIG. 23. FIG. 22 is a schematic diagram of a structure of the foldable mechanism 130 shown in FIG. 5a in the folded state. FIG. 23 is a schematic diagram of a sectional structure of the foldable mechanism 130 shown in FIG. 22 taken along II-II.

When the foldable mechanism 130 is in the folded state, the pressing plate assembly 40 is in the folded state, the first pressing plate 41 and the second pressing plate 42 are disposed opposite to each other, the flexible support plate 50 is bent and relatively folded, and the first fastening bracket 21a, the first fastening bracket 21b, the first fastening bracket 21c, the second fastening bracket 22a, the second fastening bracket 22b, the second fastening bracket 22c, the first pressing plate 41, the second pressing plate 42, and the flexible support plate 50 form avoidance space 1303 through enclosing. A cross section of the avoidance space 1303 is in a "water drop shape". It should be noted that the cross section of the avoidance space 1303 is a cross section taken along an X-Z plane.

A bottom of the flexible support plate 50 is partially accommodated in the avoidance groove 121 (shown in FIG. 8) in the base 10, partially accommodated in the avoidance groove 131 (shown in FIG. 9), and partially accommodated in the avoidance groove 141 (shown in FIG. 10). It may be understood that the avoidance groove designed in the base 10 can avoid the bottom of the flexible support plate 50, so that interference between the base 10 and the flexible support plate 50 is avoided, to help form the avoidance space 1303 in the "water drop shape".

Figure 24:
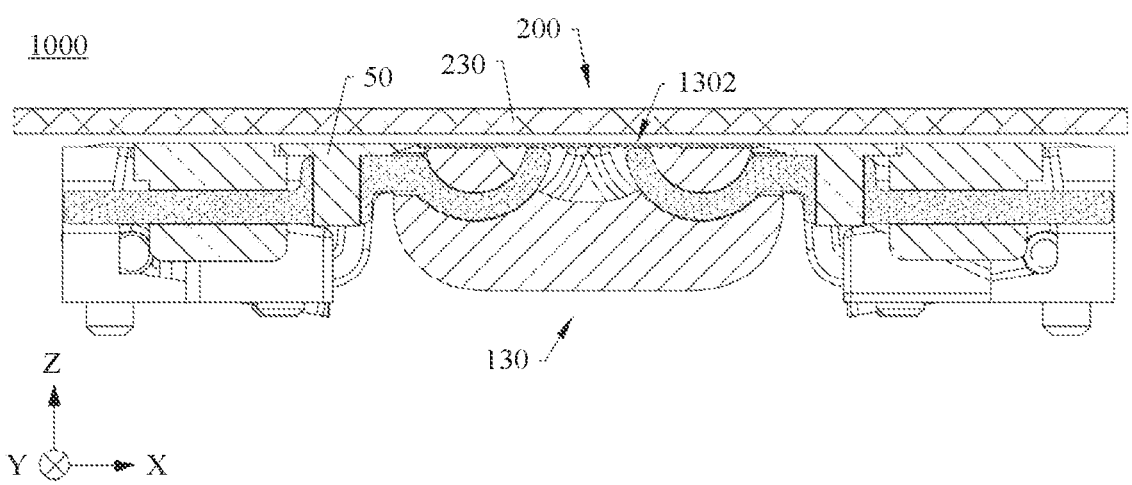
FIG. 24 is a schematic diagram of a local sectional structure of the foldable terminal shown in FIG. 2.
Figure 25:
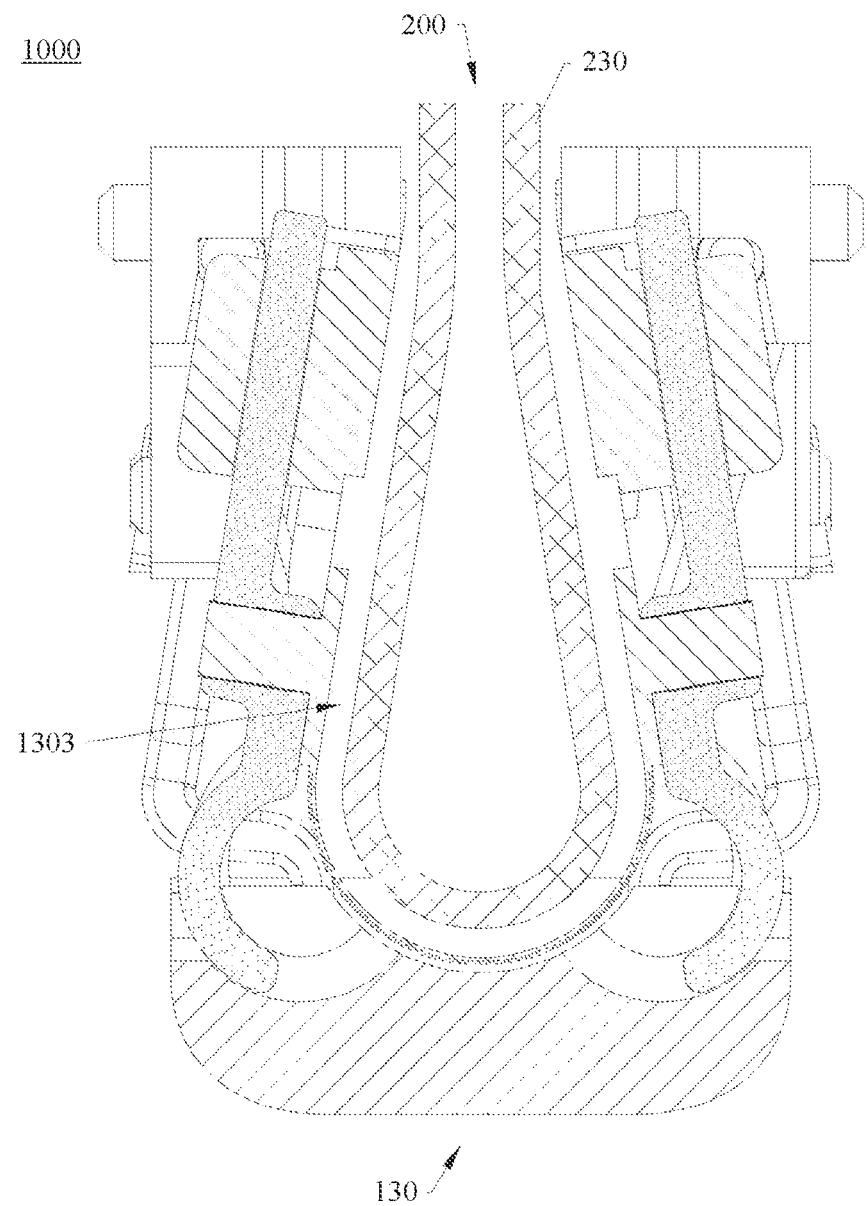
FIG. 25 is a schematic diagram of a structure of the foldable terminal shown in FIG. 24 in a folded state.

Refer to FIG. 5b, FIG. 24, and FIG. 25. FIG. 24 is a schematic diagram of a local sectional structure of the foldable terminal 1000 shown in FIG. 2. FIG. 25 is a schematic diagram of a structure of the foldable terminal 1000 shown in FIG. 24 in the folded state. The foldable terminal 1000 shown in FIG. 24 and FIG. 25 shows only the foldable mechanism 130 and the foldable part 230 of the display screen 200.

Specifically, the first fastening bracket 21a, the first fastening bracket 21b, and the first fastening bracket 21c are fixedly connected to the first housing 110, and the second fastening bracket 22a, the second fastening bracket 22b, and the second fastening bracket 22c are fixedly connected to the second housing 120. For example, the first fastening bracket 21a, the first fastening bracket 21b, and the first fastening bracket 21c may be fixedly connected to the first housing 110 by using a fastener such as a screw or a bolt, and the second fastening bracket 22a, the second fastening bracket 22b, and the second fastening bracket 22c may be fixedly connected to the second housing 120 by using a fastener such as a screw or a bolt.

In this case, the support surface 1302 that includes the first pressing plate 41, the second pressing plate 42, and the flexible support plate 50 can support the foldable part 230 of the display screen 200. This not only can ensure good display of the display screen 200, but also can ensure that when the foldable part 230 is touched, the foldable part 230 is not likely to be damaged or dented due to an external force touch, thereby improving reliability of using the display screen 200. The support surface 1302 may be flush with a top surface of the first housing 110 and a top surface of the second housing 120, so that the first pressing plate 41, the second pressing plate 42, and the flexible support plate 50 may jointly support the display screen 200 with the first housing 110 and the second housing 120, to effectively support the display screen 200 by the foldable apparatus 100 in the unfolded state.

It may be understood that the flexible support plate 50 is not designed with a hole, and the top surface of the flexible support plate 50 is a complete plane. Therefore, the support surface 1302 has a relatively large area, and can well support the foldable part 230, to improve an effect of supporting the foldable part 230 by the flexible support plate 50.

When the foldable terminal 1000 is in the folded state, the foldable part 230 of the display screen 200 is located on an inner side of the foldable mechanism 130. Specifically, the foldable part 230 is located in the avoidance space 1303. The avoidance space 1303 is in the "water drop shape", and therefore the avoidance space 1303 can avoid an R angle formed when the foldable part 230 is bent, so that the foldable part 230 is not bent at a relatively large angle, to avoid a poor phenomenon such as a crease on the display screen 200, and help prolong a service life of the display screen 200.

In the foldable mechanism 130 used in the foldable terminal 1000 shown in this embodiment, each of the first pressing plate 41 and the second pressing plate 42 is an integrally formed structural member. This not only can improve overall strength of the first pressing plate 41 and the second pressing plate 42 to ensure structural stability of the first pressing plate 41 and the second pressing plate 42, but also can reduce components of the pressing plate assembly 40 to facilitate assembling of the foldable mechanism 130, thereby helping improve assembly precision between the pressing plate assembly 40 and another component, and helping implement a lightweight design of the foldable terminal 1000.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Embodiments of this application and features in the embodiments may be combined with each other, provided that there is no conflict. Therefore, the protection scope of this application shall be subject to the protection scope of the claims.

What is claimed is:

1. A foldable terminal, comprising:
   a first housing;
   a second housing; and
   a foldable mechanism connected between the first housing and the second housing, the foldable mechanism comprising:
      a base;
      a first pressing plate that is an integrally formed structural member;
      a first pressing plate swing arm, comprising:
         a first sliding portion that is slidably connected to the first pressing plate; and
         a first rotating portion that is rotatably connected to the base;
      a second pressing plate that is an integrally formed structural member;

a second pressing plate swing arm, comprising:
   a second sliding portion that is slidably connected to the second pressing plate; and
   a second rotating portion is rotatably connected to the base; and
a flexible support plate mounted on the first pressing plate swing arm and the second pressing plate swing arm, wherein the flexible support plate comprises:
a flexible support portion having a bottom surface;
a first fastening portion fixedly connected to the bottom surface of the flexible support portion and mounted in the assembly hole on the first pressing plate swing arm; and
a second fastening portion fixedly connected to the bottom surface of the flexible support portion, and mounted in the assembly hole on the second pressing plate swing arm,
   wherein the first fastening portion and the second fastening portion are spaced apart from each other.

2. The foldable terminal of claim 1, wherein the first pressing plate comprises:
a support portion having a bottom surface; and
an auxiliary portion fixedly connected to the bottom surface of the support portion, wherein either a) the auxiliary portion is provided with a sliding hole, or b) the auxiliary portion and the support portion form a sliding hole by together enclosing the sliding hole,
wherein the first sliding portion penetrates through the sliding hole and is configured to slide with respect to the first pressing plate in the sliding hole.

3. The foldable terminal of claim 2, wherein the first pressing plate further comprises a guide slider that is fixedly connected to the bottom surface of the support portion and is spaced apart from the auxiliary portion, wherein the foldable mechanism further comprises a first fastening bracket that is provided with a guide groove, and wherein the guide slider is mounted in the guide groove and is configured to slide and rotate with respect to the first fastening bracket in the guide groove.

4. The foldable terminal of claim 3, wherein the flexible support plate is configured to be bent under driving of the first pressing plate swing arm and/or the second pressing plate swing arm, wherein a bending direction of the flexible support plate is parallel to rotation centers of the first pressing plate swing arm and the second pressing plate swing arm with respect to the base, and wherein when the foldable mechanism is in an unfolded state, the first pressing plate and the second pressing plate are respectively located on two opposite sides of the base, and a top surface of the flexible support plate, a top surface of the first pressing plate, and a top surface of the second pressing plate are flush with each other.

5. The foldable terminal of claim 4, wherein the flexible support portion includes a plurality of strip-shaped grooves arranged in parallel and spaced apart from each other, and wherein an extension direction of each strip-shaped groove is parallel to the bending direction of the flexible support plate.

6. The foldable terminal of claim 4, wherein the first rotating portion is slidably and rotatably connected to the base, and wherein the second rotating portion is slidably and rotatably connected to the base.

7. The foldable terminal of claim 4, wherein the foldable mechanism further comprises a second fastening bracket that is slidably and rotatably connected to the second pressing plate, wherein when the foldable mechanism is in a folded state, the first pressing plate and the second pressing plate are disposed opposite to each other, wherein the first pressing plate, the second pressing plate, the first fastening bracket, the second fastening bracket, and the flexible support plate form an avoidance space by together enclosing the avoidance space, and wherein the avoidance space is in a water drop shape.

8. The foldable terminal of claim 7, wherein the base includes an avoidance groove, and wherein when the foldable mechanism is in the folded state, the avoidance groove is configured to avoid the flexible support plate.

9. The foldable terminal of claim 7, wherein the foldable mechanism further comprises:
a first primary swing arm including a third rotating portion that is rotatably connected to the first fastening bracket, and a third sliding portion that is slidably and rotatably connected to the base; and
a second primary swing arm including a fourth rotating portion that is rotatably connected to the second fastening bracket, and a fourth sliding portion that is slidably and rotatably connected to the base.

10. The foldable terminal of claim 9, wherein the flexible support portion includes a first avoidance groove and a second avoidance groove, wherein openings of both the first avoidance groove and the second avoidance groove are located on the bottom surface of the flexible support portion, and wherein when the foldable mechanism is in the unfolded state, the first avoidance groove is configured to avoid the third sliding portion, and the second avoidance groove is configured to avoid the fourth sliding portion.

11. The foldable terminal of claim 6, wherein the foldable mechanism further comprises:
a first secondary swing arm including a fifth sliding portion that is slidably connected to the first fastening bracket, and a fifth rotating portion that is rotatably connected to the base; and
a second secondary swing arm including a sixth sliding portion that is slidably connected to the second fastening bracket, and a sixth rotating portion that is rotatably connected to the base.

12. The foldable terminal of claim 11, wherein the flexible support portion includes a third avoidance groove and a fourth avoidance groove, wherein openings of both the third avoidance groove and the fourth avoidance groove are located on the bottom surface of the flexible support portion, and wherein when the foldable mechanism is in the unfolded state, the third avoidance groove is configured to avoid the fifth rotating portion, and the fourth avoidance groove is configured to avoid the sixth rotating portion.

13. The foldable terminal of claim 11, wherein the foldable mechanism further comprises:
a first damping member that is mounted on the first fastening bracket and is fixedly connected to the first secondary swing arm; and
a second damping member that is mounted on the second fastening bracket and is fixedly connected to the second secondary swing arm.

14. The foldable terminal of claim 11, wherein the fifth rotating portion includes a first spiral groove, wherein the sixth rotating portion includes a second spiral groove, and wherein the foldable mechanism further comprises:
a fastening post that is mounted on the base; and
a synchronization slider that is mounted on the fastening post and is configured to slide with respect to the fastening post, wherein the synchronization slider comprises:

a first cam that is mounted in the first spiral groove and is configured slide with respect to the fifth rotating portion in the first spiral groove; and a second cam that is mounted in the second spiral groove and is configured to slide with respect to the sixth rotating portion in the second spiral groove.

15. The foldable terminal of claim 3, wherein the second pressing plate comprises:

a second support portion having a second bottom surface; and a second auxiliary portion fixedly connected to the second bottom surface of, wherein either a) the second auxiliary portion is provided with a second sliding hole, or b) the second auxiliary portion and the second support portion form a second sliding hole by together enclosing the second sliding hole, and wherein the second sliding portion penetrates through the second sliding hole and is configured to slide with respect to the second pressing plate in the second sliding hole.

16. The foldable terminal of claim 4, further comprising a display screen including a foldable part, wherein the top surface of the flexible support plate, the top surface of the first pressing plate, and the top surface of the second pressing plate jointly form a support surface that is configured to support the foldable part of the display screen.

17. The foldable terminal of claim 16, wherein the flexible support plate does not include a hole.

18. The foldable terminal of claim 16, wherein the top surface of the flexible support plate is a planar surface.

* * * * *